(12) United States Patent
Nakashima et al.

(10) Patent No.: US 8,762,648 B2
(45) Date of Patent: Jun. 24, 2014

(54) STORAGE SYSTEM, CONTROL APPARATUS AND CONTROL METHOD THEREFOR

(75) Inventors: Kazuo Nakashima, Kawasaki (JP);
Minoru Muramatsu, Kawasaki (JP);
Hidefumi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 458 days.

(21) Appl. No.: 13/137,446

(22) Filed: Aug. 16, 2011

(65) Prior Publication Data

US 2012/0054441 A1  Mar. 1, 2012

(30) Foreign Application Priority Data

Aug. 30, 2010  (JP) ................................ 2010-192070

(51) Int. Cl.
*G06F 12/00* (2006.01)
*G06F 13/00* (2006.01)

(52) U.S. Cl.
USPC ............ 711/124; 711/100; 711/141; 711/154

(58) Field of Classification Search
CPC .................... G06F 12/0615; G06F 12/0806
USPC .................. 711/100, 117, 118, 124, 141, 154
See application file for complete search history.

(56) References Cited

U.S. PATENT DOCUMENTS 5,644,701 A * 7/1997 Takewaki ........................ 714/20
5,761,705 A   6/1998 DeKoning et al.
6,145,057 A * 11/2000 Arimilli et al. ............... 711/133
7,015,921 B1 * 3/2006 Trivedi et al. ................. 345/557
7,254,746 B1 * 8/2007 Kaushik et al. ................. 714/27

FOREIGN PATENT DOCUMENTS

| JP | 10-105467 | 4/1998 |
| JP | 2004-206239 | 7/2004 |
| JP | 2008-047029 | 2/2008 |

OTHER PUBLICATIONS

Patent Abstracts of Japan, Publication No. 10-105467, Published Apr. 24, 1998.
Patent Abstracts of Japan, Publication No. 2004-206239, Published Jul. 22, 2004.
Patent Abstracts of Japan, Publication No. 2008-047029, Published Feb. 28, 2008.

* cited by examiner

*Primary Examiner* — Tuan Thai
(74) *Attorney, Agent, or Firm* — Staas & Halsey LLP

(57) ABSTRACT

In a storage system, a first reboot controller in a first control apparatus causes a second control apparatus to reboot, when it is detected that a second control apparatus has stopped access operations. The first reboot controller also places a boot event record in a non-volatile storage device of the second control apparatus to indicate that the rebooting of the second control apparatus has been caused by the first control apparatus. After that, a second reboot controller in the second control apparatus causes at least the first control apparatus to reboot while keeping intact the cache data stored in a cache memory of the first control apparatus, when the access controller of the first control apparatus is stopped while the second control apparatus is rebooted, and when a boot event record is found in the non-volatile storage device of the second control apparatus.

11 Claims, 30 Drawing Sheets

FIG. 2
STATE 1
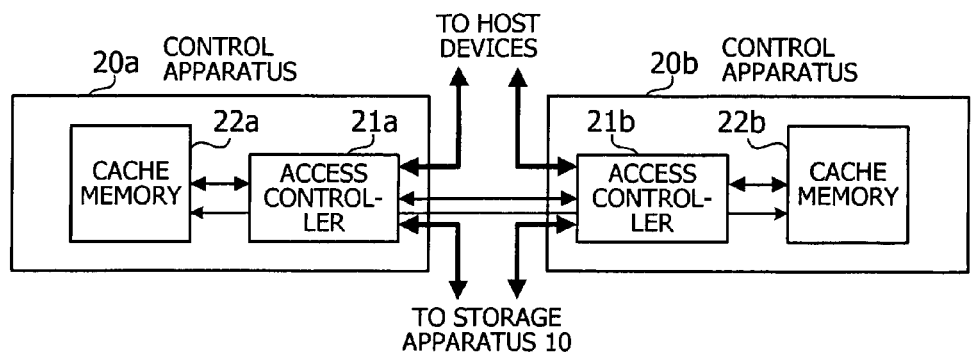
STATE 2
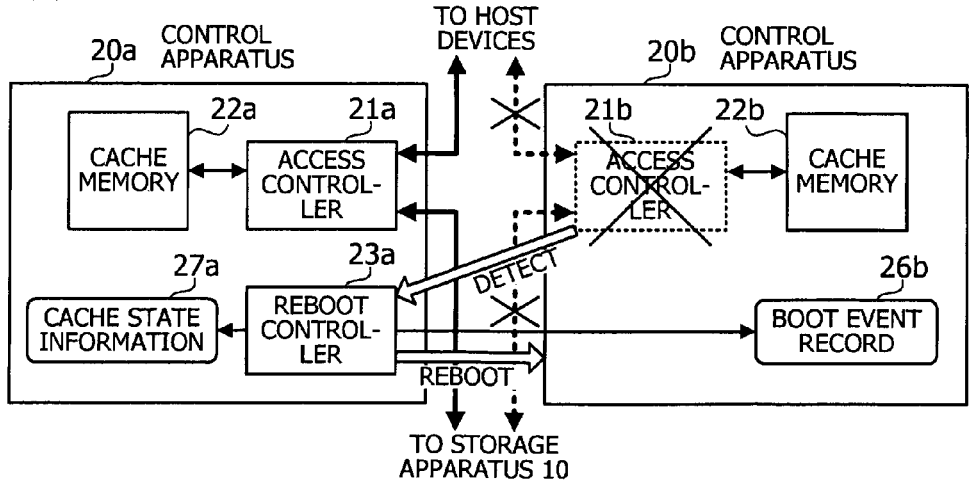
STATE 3

STORAGE SYSTEM, CONTROL APPARATUS AND CONTROL METHOD THEREFOR

CROSS-REFERENCE TO RELATED APPLICATION

This application is based upon and claims the benefit of priority of the prior Japanese Patent Application No. 2010-192070, filed on Aug. 30, 2010, the entire contents of which are incorporated herein by reference.

FIELD

The embodiments discussed herein relate to a storage system, as well as to a control apparatus and a control method therefor.

BACKGROUND

Data storage systems formed from a plurality of large-capacity storage devices such as hard disk drives (HDDs) have widely been used in recent years. Typical data storage systems incorporate a number of storage devices, combined with a control device to control access to those storage devices. Some of such storage systems employ two or more control devices to provide redundancy-protected access paths to the storage devices for more reliable operation.

The control devices may have a local cache memory to cache the data stored in storage devices so as to increase the speed of access to the storage devices. For example, a storage system may employ two control devices with individual cache memories, and those control devices may be configured to duplex their content by storing each other's cache data in addition to their own. (See, for example, Japanese Laid-open Patent Publication No. 10-105467.)

The above-exemplified storage system is duplexed, or dual-redundant, in terms of both control device functionality and cache data content. Suppose, for example, one of the two control devices has stopped due to some problem and is thus initialized. Because cache data is duplexed, the initialized control device can reload its local cache memory with a copy of valid cache data from the other control device. This valid cache data in the cache memory permits the initialized control apparatus to continue access operation to the storage devices without slowing down the access speed.

For another example, some storage systems further have a supervisory unit in addition to the duplexed control device functionality and cache data content. This supervisory unit operates independently of the control devices to supervise their activities. When it is detected that access controllers have stopped in both control devices, the supervisory unit causes the two control devices to reboot in "restoration mode." In this restoration mode, the cache memory in each control device is kept powered during the rebooting, not to lose the cache data stored therein. As a result of rebooting both control devices in restoration mode, their respective access controllers can resume access control operations on the storage devices by using the latest cache data. (See, for example, Japanese Laid-open Patent Publication No. 2004-206239.)

For yet another example of the multiple control device architecture, a proposed storage system performs exclusive control and space reservation of cache memories on an individual control device basis, by using configuration management data of each cache memory and information that indicates the association between cache memories and control devices. This method enables allocating storage spaces of a single cache memory to write cache data, its copy for redundancy, and read cache data in a desired way. (See, for example, Japanese Laid-open Patent Publication No. 2008-047029.)

The storage systems discussed above are protected by duplexing both control device functionality and cache data content. For this reason, even in the event that one of the two control devices is stopped and initialized due to some problem, the initialized control device can reload its local cache memory with valid cache data supplied from the other control device that is alive. However, it is still possible that the other control device may also encounter some anomalies and thus stop during the ongoing initialization process of the failed control device. If this happens, the initialized control apparatus cannot receive latest cache data from the other control apparatus that is in need of initialization. The first-initialized control apparatus may still be able to restart its access control operations without reloading cache entries, but this means that the control apparatus loses the benefit of having the latest cache data in its cache memory.

SUMMARY

According to an aspect of the invention, there is provided a storage system including a storage apparatus to store data and first and second control apparatuses to control access to the storage apparatus. Each of the first and second control apparatuses includes: a cache memory to cache the data in the storage apparatus, a non-volatile storage device, and an access controller to make access to the storage apparatus by using cache data in the cache memory in response to an access request from a host device, while managing the respective cache memories of the first and second control apparatuses such that each other's cache data is mirrored therein. Further, a first reboot controller is disposed in the first control apparatus, which causes, upon detection that the access controller in the second control apparatus is stopped, the second control apparatus to reboot and places a boot event record in the non-volatile storage device of the second control apparatus to indicate that the rebooting of the second control apparatus has been caused by the first control apparatus. A second reboot controller is disposed in the second control apparatus, which causes the first control apparatus to reboot while keeping intact the cache data stored in the cache memory of the first control apparatus, when the access controller of the first control apparatus is stopped while the second control apparatus is rebooted, and when the non-volatile storage device of the second control apparatus stores the boot event record indicating that the rebooting of the second control apparatus has been caused by the first control apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a first diagram illustrating how the system works when two control apparatuses have successively stopped their operation;

DESCRIPTION OF EMBODIMENTS

Figure 1:
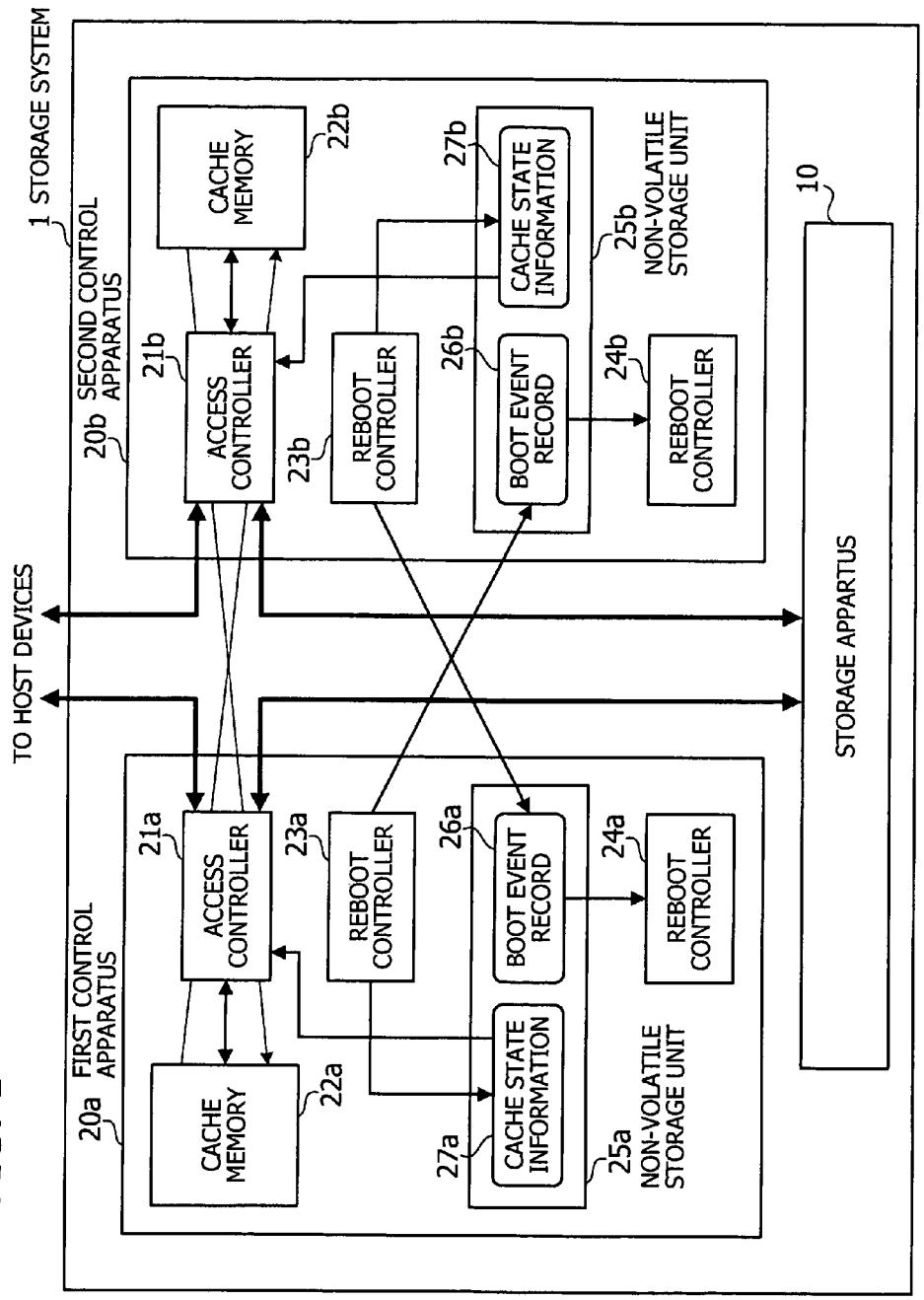
FIG. 1 illustrates an example of a storage system according to a first embodiment.

Several embodiments of the present invention will be described below with reference to the accompanying drawings, wherein like reference numerals refer to like elements throughout.

(a) First Embodiment

FIG. 1 illustrates an example of a storage system according to a first embodiment. The illustrated storage system 1 is formed from a storage apparatus 10 and a plurality of control apparatuses. While FIG. 1 depicts only two control apparatuses 20a and 20b for exemplary purposes, the storage system 1 may actually have three or more control apparatuses.

The storage apparatus 10 may include a plurality of storage media such as HDDs to store data. First and second control apparatuses 20a and 20b control access operations to this storage apparatus 10. For example, the first and second control apparatuses 20a and 20b make access to the storage apparatus 10 in response to access requests that host devices (not illustrated) issue to access the storage apparatus 10.

The two control apparatuses 20a and 20b in the storage system 1 have similar or the same structures. Specifically, the first control apparatus 20a includes an access controller 21a, a cache memory 22a, reboot controllers 23a and 24a, and a non-volatile storage unit 25a. Likewise, the second control apparatus 20b includes an access controller 21b, a cache memory 22b, reboot controllers 23b and 24b, and a non-volatile storage unit 25b. The two access controllers 21a and 21b provide the same functionalities. Likewise, the reboot controllers 23a and 23b provide the same functionalities, as do the reboot controllers 24a and 24b. Because of this similarity, the following description of processing functions will focus on the first control apparatus 20a and avoid repeating similar explanations for the second control apparatus 20b.

The access controller 21a makes access to the storage apparatus 10 in response to an access request from a host device, while managing the cache memory 22a in the first control apparatus 20a to hold a partial copy of data stored in the storage apparatus 10. For example, when a data read request to the storage apparatus 10 is received from a host device, the access controller 21a reads the requested data from the storage apparatus 10 and sends the read data back to the requesting host device. Here the requested data may happen to be stored in an entry of the cache memory 22a. If this is the case, the access controller 21a reads that data from the cache memory entry, instead of executing a read access to the storage apparatus 10. When, on the other hand, a data write request to the storage apparatus 10 is received from a host device, the access controller 21a writes the specified write data to both the cache memory 22a and storage apparatus 10.

The access controller 21a also causes the second control apparatus 20b to manage its cache memory 22b such that the two cache memories 22a and 22b further store a copy of each other's cache data. In other words, the two cache memories 22a and 22b are mirrored in each other. For example, the access controller 21a passes the data stored in its local cache memory 22a to its peer access controller 21b in the second control apparatus 20b, so that the same data is entered to the cache memory 22b. Similarly, the access controller 21b in the second control apparatus 20b also causes the first control apparatus 20a to make its cache memory 22a consistent with the peer cache memory 22b. This feature of mutual mirroring enables the two control apparatuses 20a and 20b to keep their cache data in a duplexed state.

The reboot controller 23a has a function of detecting that the access controller 21b is stopped in the second control apparatus 20b due to some anomalies or other event. For example, the reboot controller 23a may be designed to detect disruption of communication with the second control apparatus 20b, which indicates that the access controller 21b has stopped. Upon detection of such stop state of the access controller 21b, the reboot controller 23a makes the second control apparatus 20b reboot. The reboot controller 23a then places a boot event record 26b in its non-volatile storage unit 25b of the second control apparatus 20b to indicate that the rebooting of the second control apparatus 20b has been caused by a command from outside the second control apparatus itself (e.g., from the first control apparatus).

The above boot event record 26b may be implemented in the form of, for example, a flag that stays resident in the non-volatile storage unit 25b. In this case, the reboot controller 23a changes the state of the flag when rebooting the second control apparatus 20b, so that the flag indicates the fact that other control apparatus has commanded the second control apparatus 20b to reboot.

In addition to the boot event record, the reboot controller 23a may further record a piece of cache state information 27a in its local non-volatile storage unit 25a when rebooting the second control apparatus 20b in response to stop detection of the access controller 21b. The purpose of this cache state information 27a is to indicate that the cache memory 22a in the first control apparatus 20a contains the latest cache data.

The cache state information 27a may be implemented in the form of, for example, a flag that stays resident in the non-volatile storage unit 25b, similarly to the foregoing boot event record 26a. In this case, the reboot controller 23a changes the state of the flag when rebooting the second control apparatus 20b, so that the cache state information 27a indicates the fact that the cache memory 22a contains the latest cache data.

Another reboot controller 24a in the first control apparatus 20a has a function of determining, at the time of bootup of the first control apparatus 20a, whether the access controller 21b in the second control apparatus 20b is stopped. Upon bootup of the first control apparatus 20a, its reboot controller 24a causes at least the second control apparatus 20b to reboot while keeping intact the current data in its cache memory 22b, if the access controller 21b in the second control apparatus 20b is stopped at that time, and if the boot event record 26a in the non-volatile storage unit 25a indicates that the first control apparatus 20a has been commanded to reboot by other control apparatus.

Figure 3:
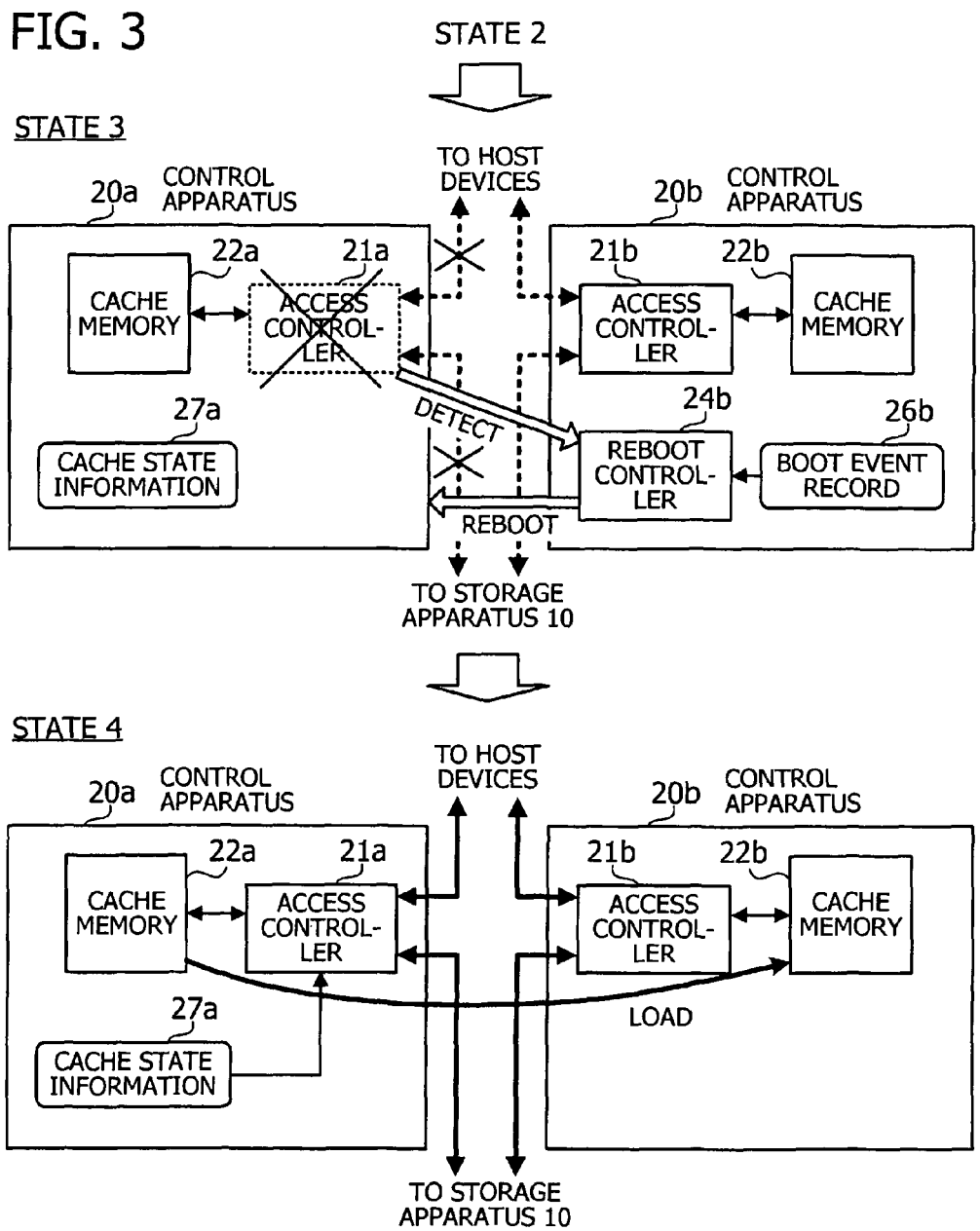
FIG. 3 is a second diagram illustrating how the system works when two control apparatuses have successively stopped their operation.

Suppose, for example, that the access controller 21a in the first control apparatus 20a and the access controller 21b in the second control apparatus 20b have stopped in that order. FIGS. 2 and 3 illustrate how the storage system 1 works when two control apparatuses have successively stopped their operation.

The upper half of FIG. 2 depicts State 1 of the storage system 1, in which the access controllers 21a and 21b in both control apparatuses 20a and 20b are working properly in controlling access operations to the storage apparatus 10. It is now assumed that one control apparatus 20b encounters a problem and thus stops its access controller 21b. This fault event is detected by the reboot controller 23a in the first control apparatus 20a as depicted as State 2 in the lower half of FIG. 2.

When it is detected that the access controller 21b has stopped, the reboot controller 23a makes the second control apparatus 20b reboot. The reboot controller 23a also places a boot event record 26b in the non-volatile storage unit 25b in the second control apparatus 20b, thereby indicating that the rebooting of the second control apparatus 20b has been caused by a command from other control apparatus than the second control apparatus 20b itself (e.g., from the first control apparatus 20a). The reboot controller 23a may further record a piece of cache state information 27a in the non-volatile storage unit 25a of the first control apparatus 20a to indicate that the cache memory 22a contains the latest cache data.

The second control apparatus 20b reboots according to the command from the reboot controller 23a. The second control apparatus 20b now flushes its cache memory 22b, assuming that the cache memory 22a in the first control apparatus 20a maintains the latest cache data. More specifically, the cache memory 22a in the first control apparatus 20a is supposed to contain the same data as what the access controller 21b has accumulated in its local cache memory 22b until the rebooting of the second control apparatus 20b occurs. The validity of this "mirrored cache data" in the first control apparatus 20a is ensured as long as the second control apparatus 20b is operational at the time of rebooting the second control apparatus 20b. Accordingly, the access controller 21b in the second control apparatus 20b can restart access control operations after reloading its local cache memory 22b with the mirrored cache data read out of the cache memory 22a in the first control apparatus 20a.

It may happen, however, that the access controller 21a in the first control apparatus 20a stops before the rebooted second control apparatus 20b becomes ready to start access control operations. If this is the case, the access controller 21b in the second control apparatus 20b cannot read the mirrored cache data from the cache memory 22a in the first control apparatus 20a.

To overcome the above-described situation, the reboot controller 24b causes at least the first control apparatus 20a to reboot while maintaining the data in its cache memory 22a, as depicted as State 3 in the upper half of FIG. 3. The reboot controller 24b performs this control if the access controller 21a in the first control apparatus 20a stops when the second control apparatus 20b is in the rebooting process, and if the non-volatile storage unit 25b in the second control apparatus 20b has a boot event record 26b. Then as depicted as State 4 in the lower half of FIG. 3, the first control apparatus 20a reboots in response to the command from the reboot controller 24b, maintaining the data in its cache memory 22a as originally stored before the rebooting. The access controller 21b in the second control apparatus 20b can therefore restart access control operations by loading its local cache memory 22b with the mirrored cache data that is read out of the cache memory 22a of the first control apparatus 20a. Or alternatively, the access controller 21a in the first control apparatus 20a may solely restart access control operations to the storage apparatus 10 by using the mirrored cache data in its local cache memory 22a.

When the access controller 21b in the second control apparatus 20b is stopped, the above-described processing prevents the first control apparatus 20a from losing the latest mirrored cache data in its cache memory 22a, even if the access controller 21a stops before the second control apparatus 20b reboots and becomes ready to restart the stopped access controller 21b.

The first control apparatus 20a reboots as seen in the lower half of FIG. 3. In this State 4, the access controller 21a, and the access controller 21b as well, can recognize that the latest cache data is retained in, for example, the cache memory 22a, by testing whether the rebooted first control apparatus 20a has cache state information 27a in its non-volatile storage unit 25a.

As a variation of the above embodiment, the two control apparatuses 20a and 20b may further be designed to reboot together, maintaining their respective cache memory data as is, in the case where their access controllers are both found stopped. This simultaneous reboot function is referred to herein as a "dual restoration function." When this dual restoration function is implemented, State 3 in the upper half of FIG. 3 is modified such that the reboot controller 24b in the second control apparatus 20b initiates rebooting of the two control apparatuses 20a and 20b in the following way.

During the reboot process of the second control apparatus 20b, the reboot controller 24b tests whether the access controller 21a in the first control apparatus 20a is stopped, and whether the local non-volatile storage unit 25b contains a boot event record 26b. If the result is positive on both tests, the reboot controller 24b causes the second control apparatus 20b to stop its local access controller 21b. By stopping the access controller 21b in the second control apparatus 20b, the reboot controller 24b produces an environment where the first control apparatus 20a can reboot with the current cache data in its cache memory 22a.

When the access controller 21b stops, the dual restoration function in the first control apparatus 20a or second control apparatus 20b detects that both access controllers 21a and 21b have stopped and causes the first and second control apparatuses 20a and 20b to reboot while keeping intact the data in their respective cache memories 22a and 22b. The dual restoration function thus prevents the first control apparatus 20a from losing the latest mirrored cache data in its cache memory 22a.

The above-described first embodiment allows the second control apparatus 20b to reboot without maintaining data in its cache memory 22b in the case where the access controller 21a still operates properly when the access controller 21b stops. While it may be possible to maintain the data in the cache memory 22b when rebooting the second control apparatus 20b, some of the cache data could lose its up-to-dateness before the second control apparatus 20b reboots, depending on what the access controller 21a does during that time. For example, the access controller 21a may succeed what the peer access controller 21b has been doing until the second control apparatus 20b is commanded to reboot. In this case, the access controller 21a performs access control operations by itself, using the mirrored cache data stored in its cache memory 22a, which renders, on the other hand, the cache data in the cache memory 22b obsolete.

The next section will describe a storage system according to a second embodiment which enables one control apparatus to continue access control operations by itself when another control apparatus becomes inoperable.

(b) Second Embodiment

Figure 4:
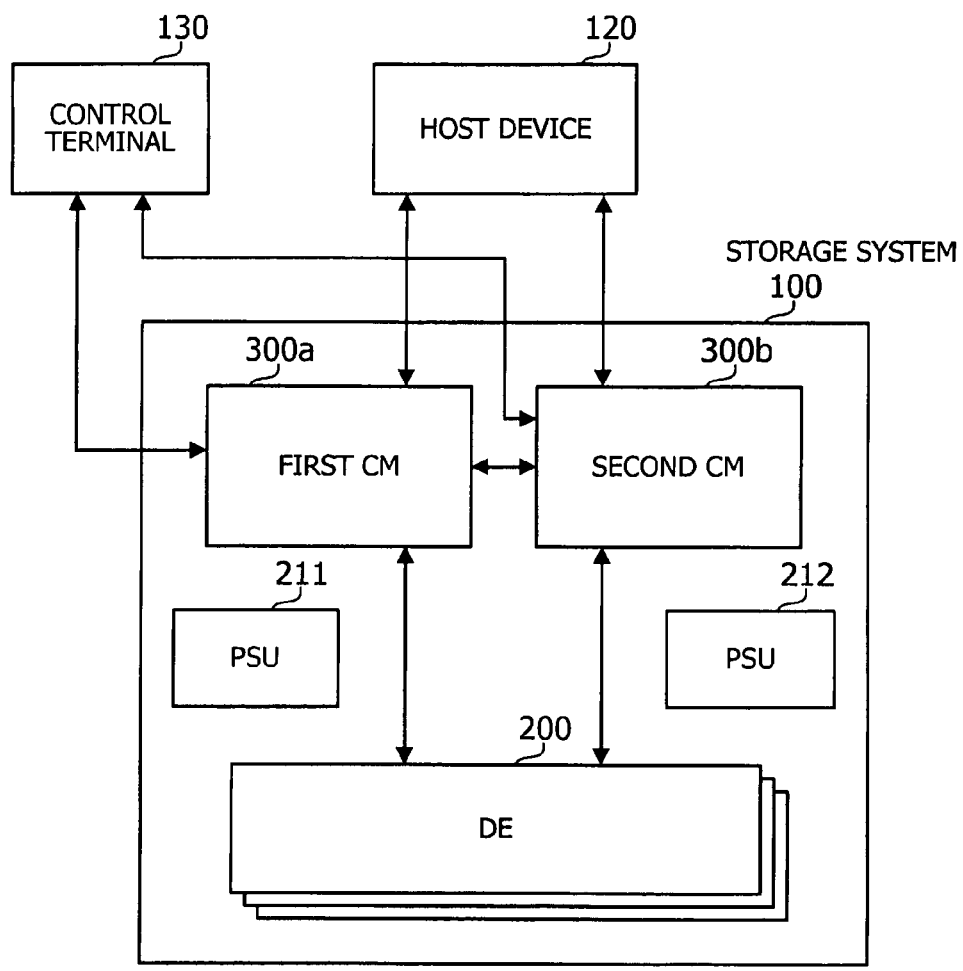
FIG. 4 illustrates an example of an overall structure of a storage system according to a second embodiment.

FIG. 4 illustrates an example of an overall structure of a storage system according to a second embodiment. The illustrated storage system 100 has a plurality of HDDs as its constituent storage devices. The storage system 100 encloses those HDDs in drive enclosures (DEs) 200. The storage system 100 also includes first and second controller modules (CMs) 300a and 300b to control access to HDDs constituting DEs 200. Further the storage system 100 has two power supply units (PSUs) 211 and 212 to provide electric power to the DEs 200, first CM 300a, and second CM 300b. The DEs 200, as well as the PSUs 211 and 212, may be located outside the storage system 100. Storage devices for the storage system 100 are not limited to HDDs, but may be other devices such as solid state drives (SSDs).

The storage system 100 is connected to a host device 120 and a control terminal 130. The host device 120 sends access requests to either the first CM 300a or the second CM 300b in the storage system 100 according to user inputs initiating access to HDDs in the DEs 200. For example, Fibre Channel links are used to connect the host device 120 with the first CM 300a and second CM 300b.

The control terminal 130 is used by a system administrator of the storage system 100 to manage its operation. For example, the system administrator configures the first and second CMs 300a and 300b by using the control terminal 130. The control terminal 130 is linked to those CMs 300a and 300b via, for example, a local area network (LAN) cable.

The first and second CMs 300a and 300b individually control access to HDDs in DEs 200 in response to access requests from the host device 120. For example, the host device 120 may issue a request for reading data in an HDD. In response, the first CM 300a reads the requested data out of the HDD and sends it back to the host device 120. The host device 120 may also issue a request for writing data to an HDD. In response, the first CM 300a writes the specified data to the HDD. When requested, the second CM 300b also reads and writes data in a similar way.

In addition to the above, the first and second CMs 300a and 300b have a function of caching data in HDDs of the DEs 200. To this end, the two CMs 300a and 300b are designed to exchange information and mirror each other's cache data. The first and second CMs 300a and 300b also monitor each other's activities and can reboot each other as necessary.

Figure 5:
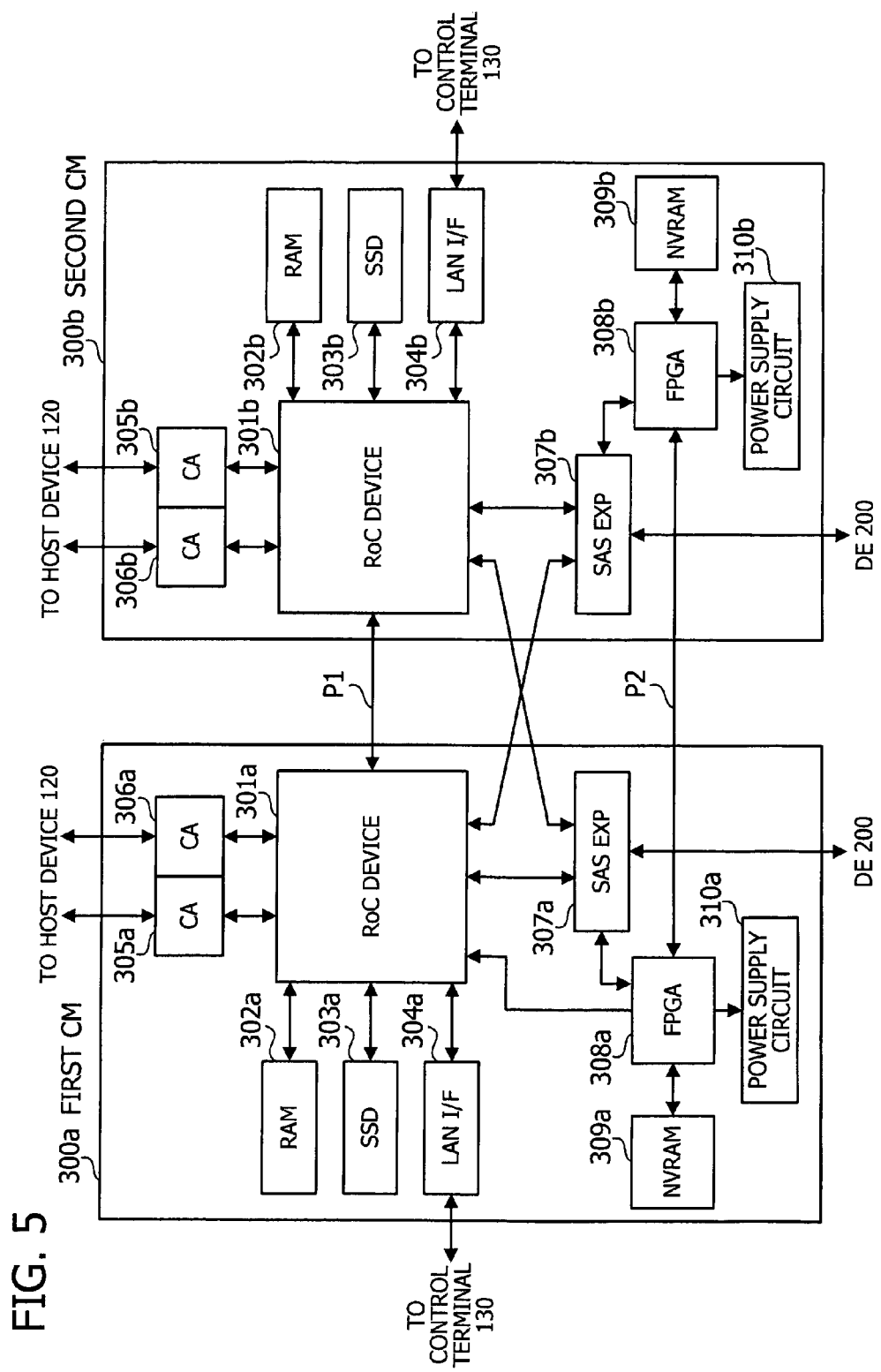
FIG. 5 illustrates an example hardware configuration of controller modules (CMs) in the storage system.

FIG. 5 illustrates an example hardware configuration of CMs in the storage system. The illustrated first CM 300a is formed from a RAID-on-Chip (RoC) device 301a, a random access memory (RAM) 302a, a solid state drive (SSD) 303a, a LAN interface (LAN I/F) 304a, channel adapters (CA) 305a and 306a, a Serial Attached SCSI expander (SAS EXP) 307a, a field programmable gate array (FPGA) 308a, a non-volatile RAM (NVRAM) 309a, and a power supply circuit 310a. Here, RAID means "Redundant Arrays of Inexpensive Disks," and SCSI stands for "Small Computer System Interface."

The second CM 300b also has a similar hardware configuration. That is, the second CM 300b is formed from an RoC device 301b, a RAM 302b, an SSD 303b, a LAN interface 304b, CAs 305b and 306b, a SAS expander 307b, an FPGA 308b, a NVRAM 309b, and a power supply circuit 310b. These components are the counterparts of the RoC device 301a, RAM 302a, SSD 303a, LAN interface 304a, CA 305a, 306a, SAS expander 307a, FPGA 308a, NVRAM 309a, and power supply circuit 310a in the first CM 300a. The following description of hardware configuration focuses on the first CM 300a. The same description also applies to the second CM 300b.

While not explicitly depicted, the RoC device 301a includes a central processing unit (CPU) to control the entire CM 300a, and a SAS controller for the CPU to interface with SAS expanders 307a and 307b. The CPU in the RoC device 301a also has a function to communicate with its peer CPU in the RoC device 301b of the second CM 300b. The communication path between those two CPUs is designated by the symbol "P1."

The RAM 302a serves as temporary storage for at least part of the software programs that the CPU in the RoC device 301a executes, as well as for various data that the CPU 101 needs to execute the programs. The RAM 302a also provides an area for caching data of HDDs in DEs 200.

The SSD 303a serves as secondary storage of the first CM 300a to store programs that the RoC device 301a executes, as well as for various data that it needs to execute the programs. As an alternative, HDDs or other non-volatile storage devices may also serve the same purpose.

The LAN interface 304a is connected to the control terminal 130 via a LAN cable, allowing the RoC device 301a to communicate data with the control terminal 130.

The CAs 305a and 306a serve as an interface through which the host device 120 and the first CM 300a can exchange data. Separate fiber optic cables are used to connect those CAs 305a and 306a to the host device 120 to provide redundant communication paths between the first CM 300a and host device 120. This configuration makes their communication more reliable.

The SAS expander 307a plays intermediary roles in communication between the aforementioned SAS controller in the RoC device 301a and SAS devices. To this end, the SAS expander 307a contains a CPU (not illustrated) and a non-volatile memory (not illustrated) to store firmware programs for the CPU. The CPU in the SAS expander 307a executes firmware programs to achieve, for example, "dual CM restoration," i.e., rebooting RoC devices 301a and 301b in both CMs 300a and 300b, keeping intact their cache data in the RAM 302a. It is noted that the CPU in the SAS expander 307a operates independently of the one in the RoC device 301a. Even if the RoC device 301a stops due to some anomalies, this CPU can continue to operate as long as the SAS expander 307a is powered.

In the example of FIG. 5, the RoC device 301a in the first CM 300a has a connection to DEs 200, not only via its local SAS expander 307a, but also via another SAS expander 307b in the second CM 300b. The RoC device 301a is thus coupled to DEs 200 through two SAS expanders 307a and 307b. In other words, its access path to the DEs 200 is duplexed.

Similarly, the RoC device 301b in the second CM 300b has a connection to DEs 200, not only via its local SAS expander 307b, but also via another SAS expander 307a in the first CM 300a. The RoC device 301b is thus coupled to DEs 200 through two SAS expanders 307a and 307b. In other words, its access path to the DEs 200 is duplexed.

The FPGA 308a in the first CM 300a offers the function of monitoring whether its local RoC device 301a is operating properly. Similarly, the FPGA 308b in the second CM 300b offers the function of monitoring whether its local RoC device 301b is operating properly. The two FPGAs 308a and 308b may communicate to mutually supervise the health of two CMs.

When it is detected that RoC devices 301a and 301b have stopped in both the first and second CMs 300a and 300b, the FPGA 308a so notifies the SAS expander 307a. In response to this notification from the FPGA 308a, the CPU in the SAS expander 307a initiates "dual CM restoration" mentioned above.

The FPGA 308a also provides the function of rebooting its local RoC device 301a in the first CM 300a when there is a request from the RoC device 301a itself, SAS expander 307a, or FPGA 308b in the second CM 300b. More specifically, the FPGA 308a reboots the RoC device 301a in either "normal mode" or "restoration mode." In normal mode, the FPGA 308a clears data in the RAM 302a when rebooting the RoC device 301a, by temporarily cutting power supply from the power supply circuit 310a to the RoC device 301a and RAM 302a. In restoration mode, the FPGA 308a permits the power supply circuit 310a to keep supplying power to the RAM 302a so as to maintain the current data in the RAM 302a, while temporarily cutting power supply to the RoC device 301a when rebooting it. This restoration mode may be modified to maintain, not all data in the RAM 302a, but only cache data when rebooting the RoC device 301a.

As a variation of the above, the FPGA 308a may request its peer FPGA 308b in the second CM 300b to reboot the RoC device 301b in normal mode or restoration mode. When making this boot request, the FPGA 308a specifies which mode to use.

Further, the FPGA 308a has a function of writing data to and reading data out of the NVRAM 309a in response to a request from the RoC device 301a, SAS expander 307a, or the FPGA 308b in the second CM 300b. It is noted that the FPGA 308a operates independently of the CPU in the RoC device 301a, just as the CPU in the SAS expander 307a does. This means, for example, that the FPGA 308a can continue its operation even if the RoC device 301a becomes inoperable due to some anomalies.

The NVRAM 309a is a non-volatile memory for storing various data objects used by the FPGA 308a and RoC device 301a. The power supply circuit 310a provides electric power to the components of the first CM 300a under the control of the FPGA 308a.

Figure 6:
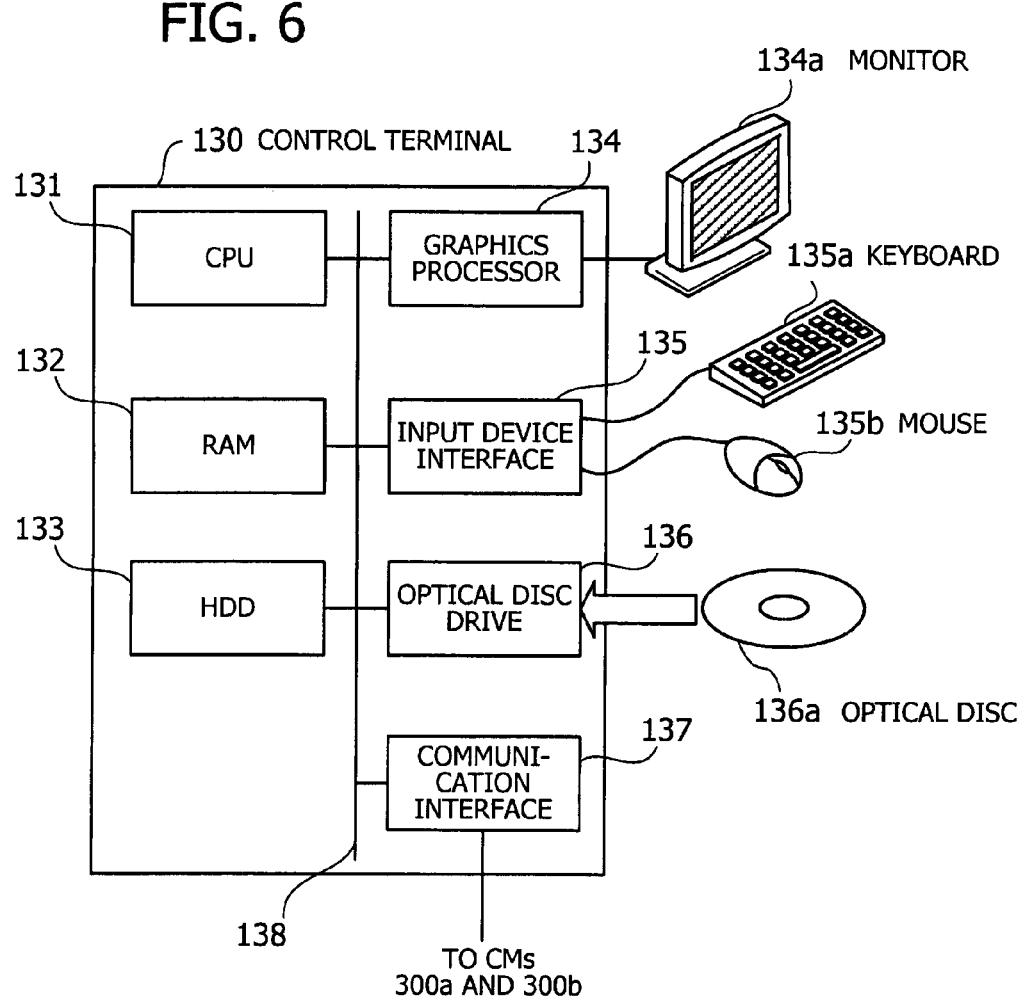
FIG. 6 illustrates an example hardware configuration of a control terminal.

FIG. 6 illustrates an example hardware configuration of a control terminal. The foregoing control terminal 130 is implemented as a computer seen in FIG. 6. This computer includes a CPU 131 to control its entire system. The CPU 131 is connected to a RAM 132 and other various peripheral devices on a bus 138.

The RAM 132 serves as primary storage of the computer. Specifically, the RAM 132 is used to temporarily store the whole or part of software programs that the CPU 131 executes, in addition to other various data objects that it manipulates at runtime.

Peripheral devices on the bus 138 include, for example, an HDD 133, a graphics processor 134, an input device interface 135, an optical disc drive 136, and a communication interface 137. The HDD 133 serves as secondary storage of the computer. Specifically, the HDD 133 stores programs that the CPU 131 executes, together with various data files. Flash memory and other semiconductor memory devices may also be used as secondary storage, similarly to the HDD 133.

The graphics processor 134, coupled to a monitor 134a, produces video images in accordance with drawing commands from the CPU 131 and displays them on a screen of the monitor 134a. The monitor 134a may be, for example, a cathode ray tube (CRT) display or a liquid crystal display.

The input device interface 135 is connected to input devices such as a keyboard 135a and a mouse 135b and supplies signals from those devices to the CPU 131. The mouse 135b is a pointing device, which may be replaced with other kinds of pointing devices such as touchscreen, tablet, touchpad, and trackball.

The optical disc drive 136 reads out data encoded on an optical disc 136a, by using a laser light. The optical disc 136a is a portable data storage medium, the data recorded on which can be read as a reflection of light or the lack of same. The optical disc 136a may be a digital versatile disc (DVD), DVD-RAM, compact disc read-only memory (CD-ROM), CD-Recordable (CD-R), or CD-Rewritable (CD-RW), for example.

The communication interface 137 is connected to the first and second CMs 300a and 300b via LAN cables to communicate data with them.

The hardware configuration of FIG. 6 may also be applied to the host device 120. In that case, however, the host device 120 has a communication interface that links to the first and second CMs 300a and 300b via fiber optic cables.

Figure 7:
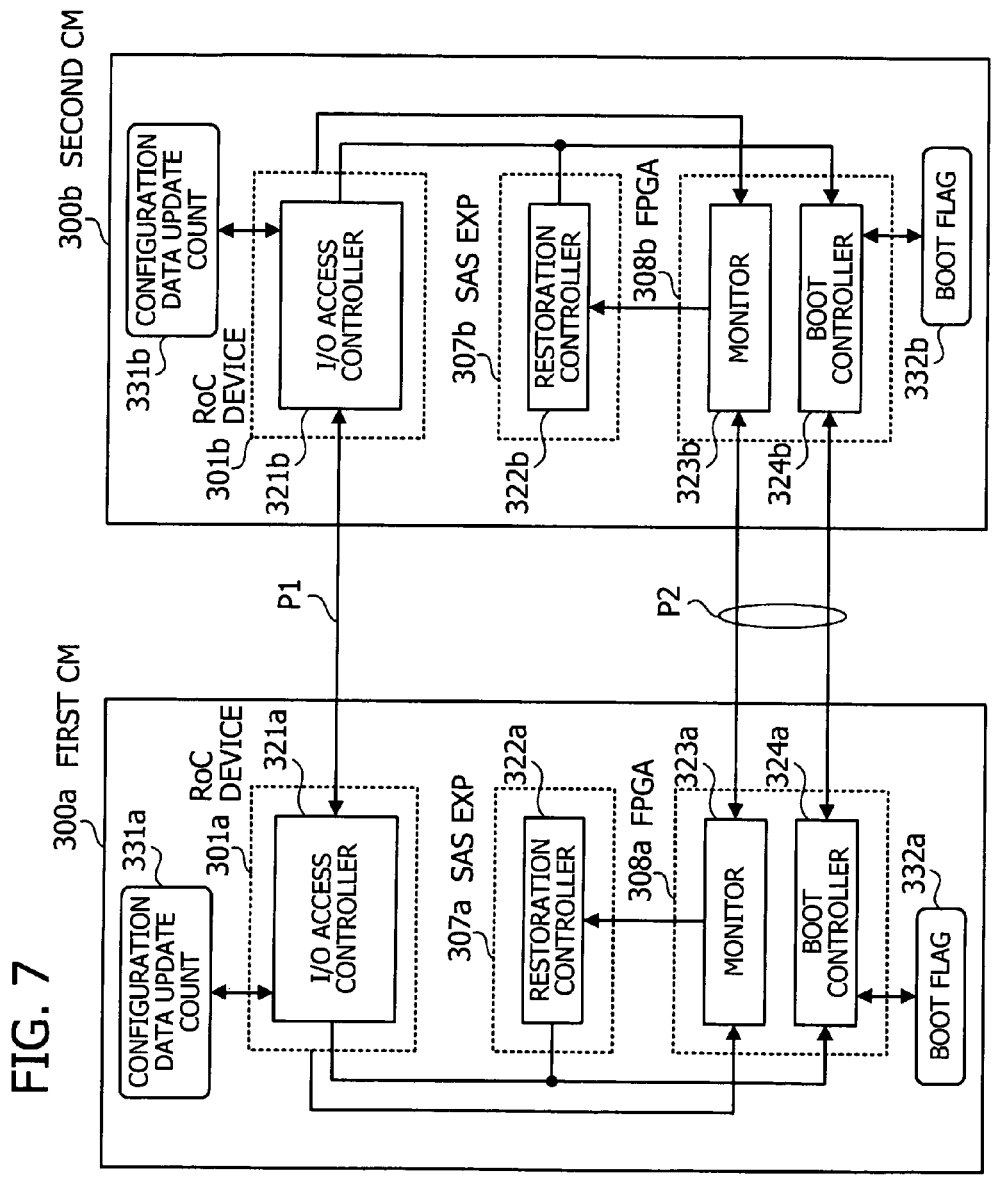
FIG. 7 is a block diagram illustrating an example of processing functions provided by CMs.

FIG. 7 is a block diagram illustrating an example of processing functions provided by CMs. The illustrated first CM 300a includes an In/Out (I/O) access controller 321a, a restoration controller 322a, a monitor 323a, and a boot controller 324a. Processing functions of the I/O access controller 321a are implemented as a software program executed by a CPU in the RoC device 301a. Processing functions of the restoration controller 322a are implemented as a software program executed by a CPU in the SAS expander 307a. Processing functions of the monitor 323a and boot controller 324a are implemented as part of the FPGA 308a.

The second CM 300b has processing functions similar to those of the first CM 300a. That is, the second CM 300b includes an I/O access controller 321b, a restoration controller 322b, a monitor 323b, and a boot controller 324b, respectively corresponding to the I/O access controller 321a, restoration controller 322a, monitor 323a, and boot controller 324a of the first CM 300a. Because of this similarity, the following description of processing functions will focus on the first CM 300a, instead of repeating explanations for two CMs 300a and 300b.

The processing functions of the second CM 300b are implemented as software programs similarly to those of the first CM 300a. Specifically, the I/O access controller 321b of the second CM 300b is implemented as a software program executed by a CPU in the RoC device 301b, and the restoration controller 322b is implemented as a software program executed by a CPU in the SAS expander 307b. Processing functions of the monitor 323b and boot controller 324b are implemented as part of the FPGA 308b.

The I/O access controller 321a manages the storage space of HDDs in DEs 200, besides controlling access to those HDDs. Specifically, the host device 120 sends access requests to HDDs in the DEs 200. The I/O access controller 321a receives such a request via a CA 305a or 306a and executes the requested access via the SAS expander 307a or 307b.

The I/O access controller 321a controls access to data stored in HDDs in the DEs 200, while caching the data in its local RAM 302a. The I/O access controller 321a further mirrors the cached data from its local RAM 302a to the peer RAM 302b in the second CM 300b.

The I/O access controller 321a also has a function of detecting, through the aforementioned communication path P1 to the second CM 300b, a stop state of the RoC device 301b resulting from some anomalies. Upon detection, the I/O access controller 321a requests the second CM 300b to reboot its RoC device 301b in restoration mode. The I/O access controller 321a makes this request via its local boot controller 324a. The RoC device 301b in the second CM 300b thus reboots in restoration mode. If there is no change in the cache data of the first CM 300a before the RoC device 301b becomes operational, the RoC device 301b is allowed to resume its I/O access control without the need for loading the latest cache data from the first CM 300a.

The second CM 300b stores a boot flag 332b in its NVRAM 309b. This boot flag 332b, when set to one, indicates that the CM has rebooted upon request from other CM. Along with the request to the second CM 300b to reboot its RoC device 301b in restoration mode, the I/O access controller 321a also requests the second CM 300b via the boot controller 324a to change the boot flag 332b in the NVRAM 309b from zero to one. The boot flag 332b is referenced by the I/O access controller 321b when it begins access control operations of HDDs after the RoC device 301b is rebooted in the second CM 300b.

Also along with the request to the second CM 300b to reboot its RoC device 301b in restoration mode, the I/O access controller 321a increments a configuration data update count 331a stored in the NVRAM 309a in the first CM 300a. As will be discussed later, the I/O access controller 321a consults control data in a configuration data table during its control operation, and the configuration data update count 331a is supposed to be incremented each time the configuration data table is changed. The second CM 300b also has its own configuration data update count 331b in its NVRAM 309b. When the I/O access controller 321a increments the configuration data update count 331a, the configuration data update count 331b in the second CM 300b is incremented synchronously. The two configuration data update counts 331a and 331b thus indicate the same value in normal situations.

The exception is when the second CM 300b is requested to reboot its RoC device 301a in restoration mode. While the first CM 300a increments its configuration data update count 331a, the second CM 300b is unable to do so for its own configuration data update count 331b since the second CM 300b is right in the process of rebooting. Accordingly the two configuration data update counts 331a and 331b exhibit different values when the foregoing dual CM restoration process is executed to reboot RoC devices 301a and 301b in both the first and second CMs 300a and 300b. In this situation, the I/O access controllers 321a and 321b determine which of the two configuration data update counts 331a and 331b has a larger value. Since the former configuration data update count 331a is larger than the latter configuration data update count 331b, the I/O access controllers 321a and 321b recognize that a newer cache data resides in the first CM 300a corresponding to the former configuration data update count 331a.

While not mentioned above, it is through the FPGA 308a that the I/O access controller 321a writes and reads the configuration data update count 331b and boot flag 332a in the NVRAM 309a.

When the monitor 323a finds that RoC devices 301a and 301b in both the first and second CMs 300a and 300b have stopped because of some anomalies or other reasons, the restoration controller 322a executes a dual CM restoration process to reboot the two RoC devices 301a and 301b in restoration mode. Specifically, the restoration controller 322a requests its local boot controller 324a in the first CM 300a to reboot the local RoC device 301a in restoration mode. The restoration controller 322a also requests the boot controller 324a to interact with its peer boot controller 324b in the second CM 300b so as to make the RoC device 301b reboot in restoration mode.

The monitor 323a keeps track of whether the RoC device 301a is working properly in the first CM 300a. The monitor 323a also keeps track of whether the RoC device 301b is working properly in the second CM 300b, through its peer monitor 323b in the second CM 300b. The monitor 323a may find that the RoC devices 301a and 301b have both stopped working in the first and second CMs 300a and 300b due to some anomalies. If this happens, the monitor 323a so notifies the restoration controller 322a.

The boot controller 324a makes the RoC device 301a reboot in normal mode or restoration mode, in response to a request from the I/O access controller 321a in the first CM 300a, or the restoration controller 322a in the first CM 300a, or the boot controller 324b in the second CM 300b. In normal mode, the boot controller 324a clears data in the RAM 302a when rebooting the RoC device 301a, by temporarily cutting power supply from the power supply circuit 310a to the RoC device 301a and RAM 302a. In restoration mode, on the other hand, the boot controller 324a permits the power supply circuit 310a to keep supplying power to the RAM 302a so as to maintain the current data stored in the RAM 302a, while temporarily cutting power supply to the RoC device 301a when rebooting it. This restoration mode may be modified to maintain, not all data in the RAM 302a, but only cache data when rebooting the RoC device 301a.

The boot controller 324a may also be configured to request the boot controller 324b in the second CM 300b to make the RoC device 301b reboot in normal mode or restoration mode, in response to a request from the I/O access controller 321a or restoration controller 322a. Also, the boot controller 324a has a function of requesting its peer boot controller 324b in the second CM 300b to change the boot flag 332b in NVRAM 309b, when so requested by the I/O access controller 321a. In addition, the boot controller 324a has a function of changing the boot flag 332a in NVRAM 309a, when so requested by the peer boot controller 324b in the second CM 300b.

The following section will now describe in greater detail the processing operation of the first and second CMs 300a and 300b. The first thing to discuss is how the I/O access controllers 321a and 321b control access operations to HDDs in DEs 200. The access control operation may be performed in either "redundant operation mode" or "solitary operation mode." In redundant operation mode, both I/O access controllers 321a and 321b execute access control tasks. In solitary operation mode, only one of the two I/O access controllers 321a and 321b undertakes the tasks.

Figure 8:
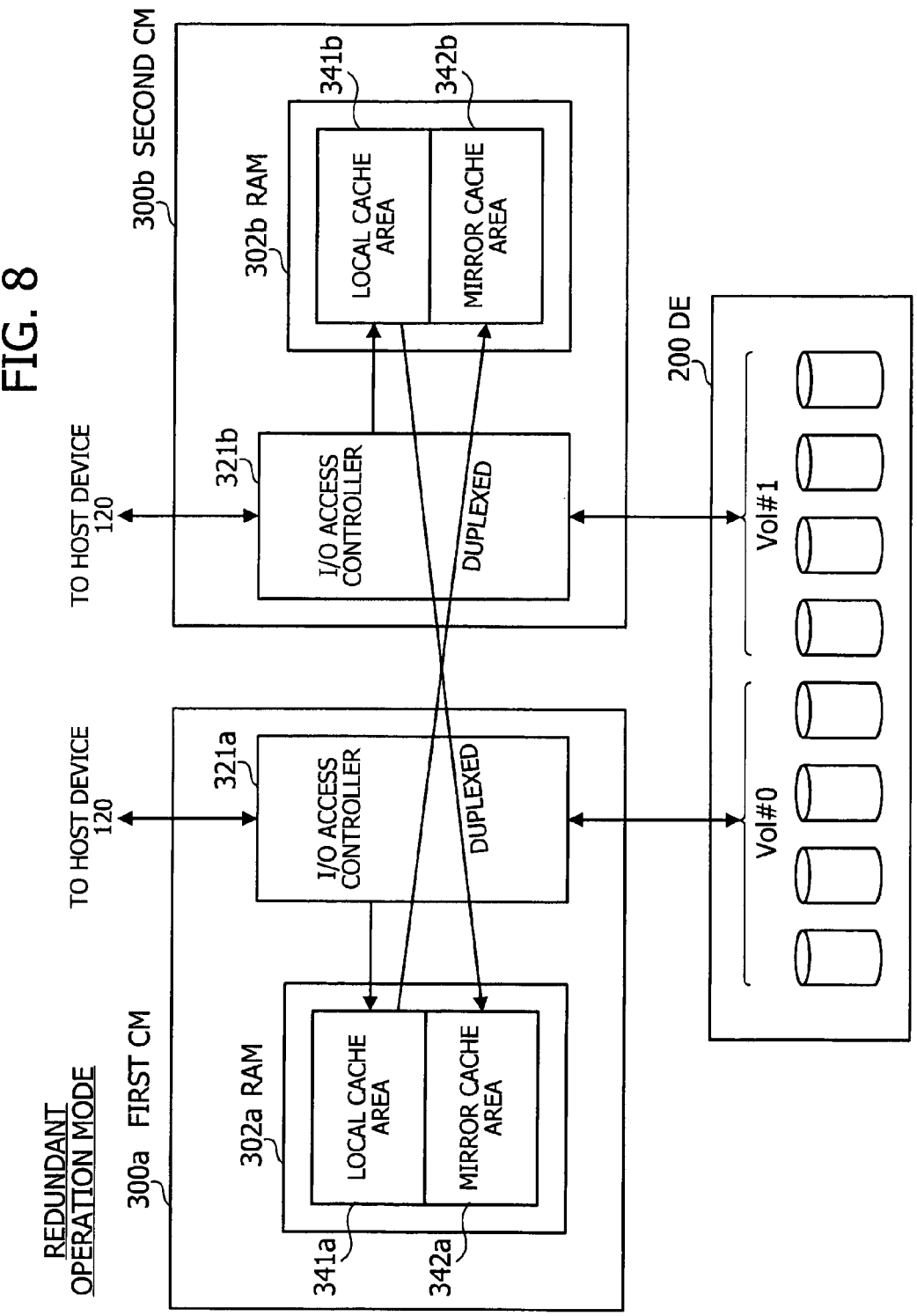
FIG. 8 illustrates access control in redundant operation mode.

FIG. 8 illustrates access control in redundant operation mode. When both I/O access controllers 321a and 321b operate properly, each of them undertakes different volumes (storage spaces) in HDDs of a DE 200. In the example of FIG. 8, the I/O access controller 321a in the first CM 300a controls access to volume Vol#0, while the I/O access controller 321b in the second CM 300b controls access to volume Vol#1. Here, the volumes Vol#0 and Vol#1 are different portions of the HDD storage spaces in the DE 200.

In redundant operation mode, the I/O access controller 321a uses a local cache area 341a in the RAM 302a to cache data stored in volume Vol#0. Likewise, the I/O access controller 321b uses a local cache area 341b in the RAM 302b to cache data stored in volume Vol#1. For example, the I/O access controller 321a may receive a request from the host device 120 to read data in volume Vol#0. If the local cache area 341a contains a cache entry corresponding to the requested data, the I/O access controller 321a reads data of that entry from the local cache area 341a and sends it to the host device 120. The I/O access controller 321a may also receive a request from the host device 120 to write specific data. If the local cache area 341a has an existing entry for the write address, the I/O access controller 321a first updates that cache entry with write data specified by the host device 120. Afterwards the I/O access controller 321a updates data in a relevant HDD in the DE 200 with the same write data.

Further, the data in the local cache area of one CM is duplexed in RAM of the other CM. In the example illustrated in FIG. 8, the second CM 300b has a mirror cache area 342b allocated in its RAM 302b to store a copy of the data in the local cache area 341a of the first CM 300a. The first CM 300a also has a mirror cache area 342a allocated in its RAM 302a to store a copy of the data in the local cache area 341b of the second CM 300b.

Each time the local cache area 341a is changed with new data, the I/O access controller 321a requests the I/O access controller 321b in the second CM 300b to apply the same change to its mirror cache area 342b. Similarly, each time the local cache area 341b is changed with new data, the I/O access controller 321b requests the I/O access controller 321a in the first CM 300a to apply the same change to its mirror cache area 342a.

Figure 9:
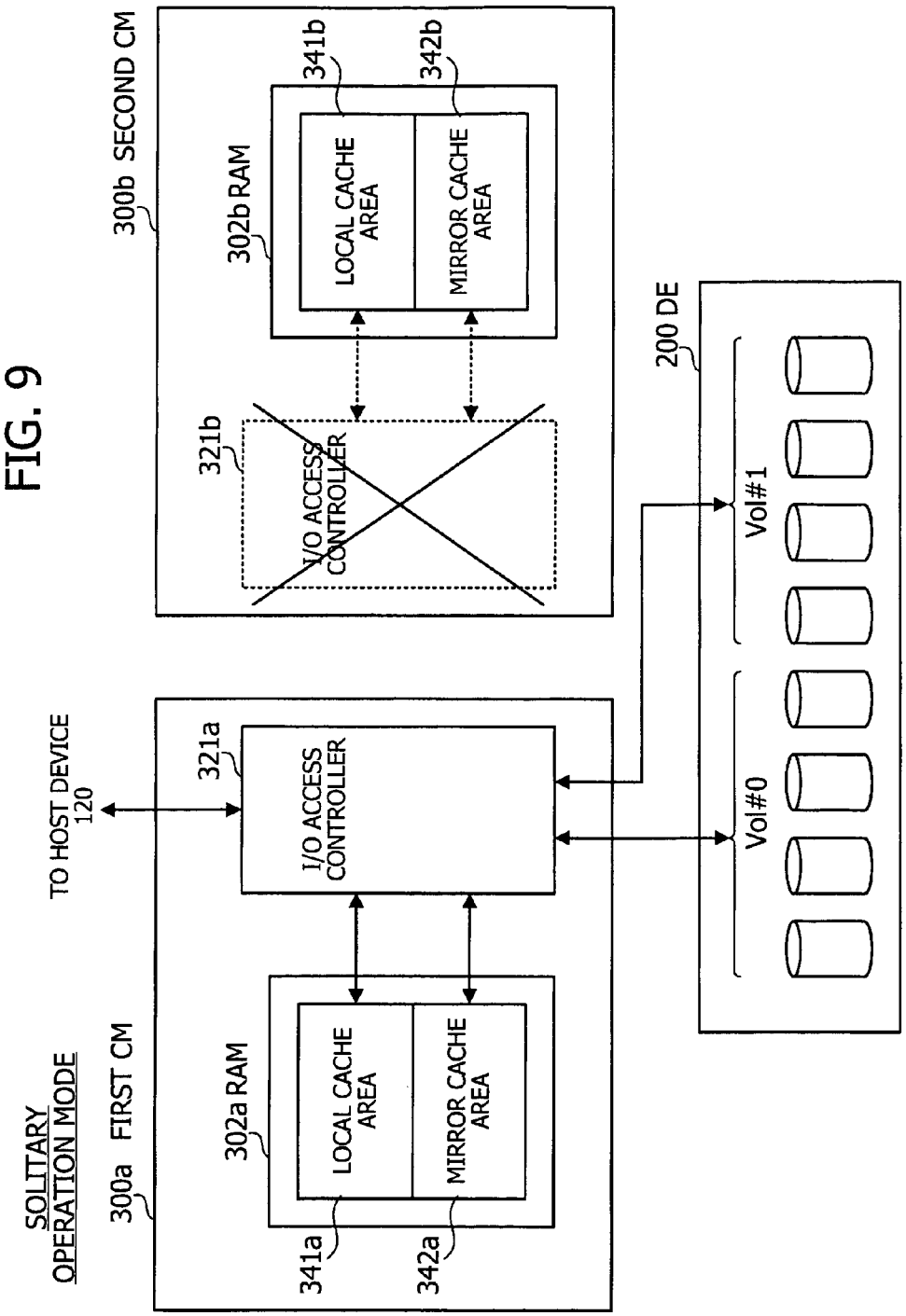
FIG. 9 illustrates access control in solitary operation mode.

FIG. 9 illustrates access control in solitary operation mode. When the I/O access controller in one CM finds that the RoC device in the other CM has stopped due to some anomalies, the I/O access controller causes the failed RoC device to reboot, and for the time being until the reboot is done, the I/O access controller takes over the task of access control from its peer I/O access controller in the other CM by using the data stored its own mirror cache area.

It is assumed in the example seen in FIG. 9 that the RoC device 301b in the second CM 300b has stopped its operation. In the illustrated case, the I/O access controller 321a in the first CM 300a causes the boot controller 324a to send a request to its peer boot controller 324b in the second CM 300b so as to make the RoC device 301b reboot in restoration mode. The I/O access controller 321a subsequently migrates to solitary operation mode, in which the I/O access controller 321a controls access operations, not only to volume Vol#0, but also to volume Vol#1. Specifically, the I/O access controller 321a uses cache data in the mirror cache area 342a of the RAM 302a to take over the access control tasks for volume Vol#1.

Suppose that the RoC device 301b in the second CM 300b reboots properly. The I/O access controller 321a is now allowed to resume communication with its peer I/O access controller 321b in the second CM 300b. Via the peer I/O access controller 321b, the I/O access controller 321a duplexes cache data between the local cache area 341a and the mirror cache area 342b in the second CM 300b, as well as between the mirror cache area 342a and the local cache area 341b in the second CM 300b. The two I/O access controllers 321a and 321b then begin their respective tasks of access control in redundant operation mode. However, the local cache area 341a and mirror cache area 342a of the first CM 300a may not experience any changes in their data content during the period of solitary operation mode. When this is the case, the I/O access controller 321b in the second CM 300b can restart access control operation to volume Vol#1 without updating the local cache area 341b or mirror cache area 342b.

Figure 10:
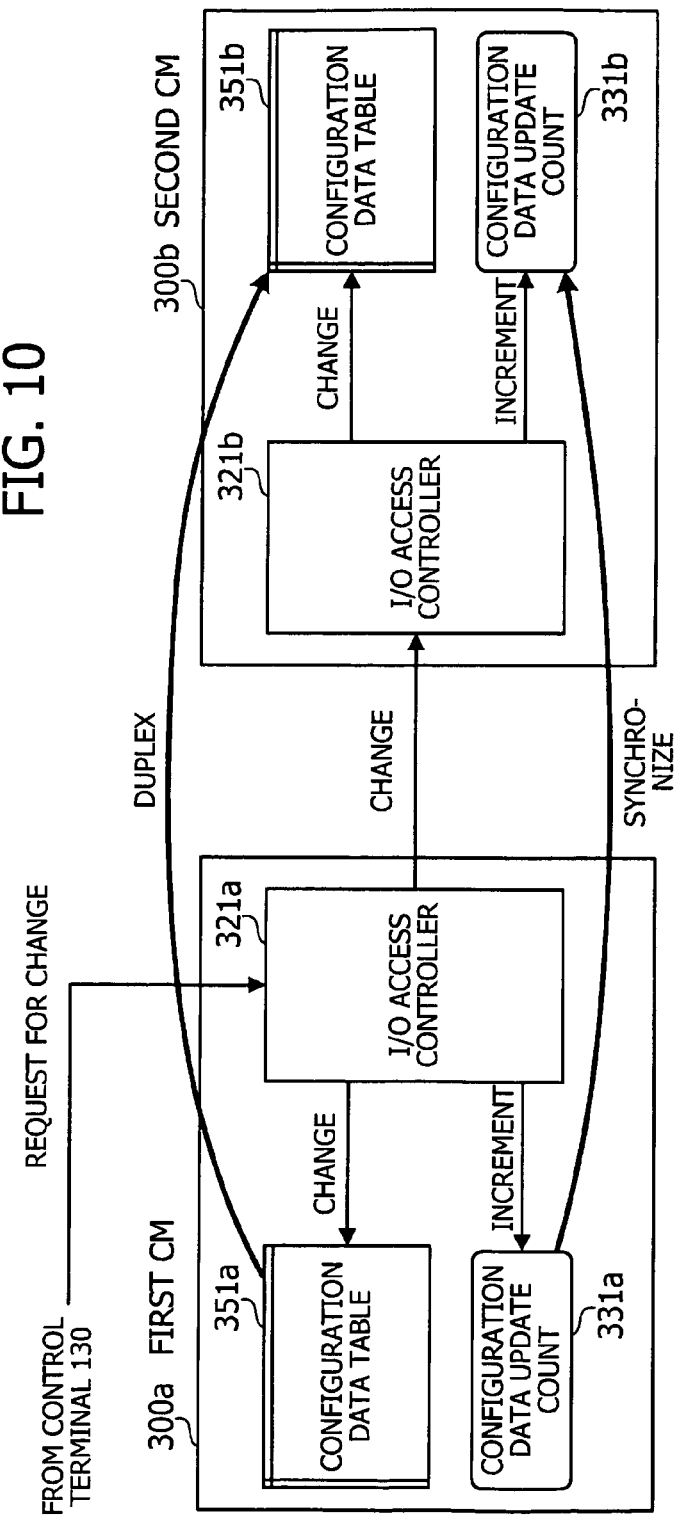
FIG. 10 illustrates how configuration data tables and configuration data update counts are updated.

The I/O access controllers execute access control on the basis of control data defined in a configuration data table as will be discussed in FIG. 10. Each time a change is made to control data in the configuration data table, the configuration data update count is incremented. FIG. 10 illustrates how configuration data tables and configuration data update counts are updated.

For example, the first CM 300a has a configuration data table 351a in its SSD 303a, and the second CM 300b has a configuration data table 351b in its SSD 303b. These configuration data tables 351a and 351b contain control data for use by the I/O access controllers 321a and 321b to control access to HDDs in the DE 200. For example, the configuration data tables 351a and 351b contain information that describes RAID levels and defines physical volumes constituting a RAID group. The I/O access controller 321a executes access control on the basis of such control data defined in the configuration data table 351a. Likewise, the I/O access controller 321b executes access control on the basis of control data defined in the configuration data table 351b.

The I/O access controllers 321a and 321b also manage the configuration data tables 351a and 351b in the first and second CMs 300a and 300b, respectively, so as to keep their contents identical. Suppose, for example, a control terminal 130 issues a request to the first CM 300a to make a change to its configuration data table 351a as illustrated in FIG. 10. In response, the I/O access controller 321a in the first CM 300a changes the configuration data table 351a as requested by the control terminal 130. Subsequently the I/O access controller 321a increments the configuration data update count 331a stored in the NVRAM 309a.

The I/O access controller 321a further interacts with its peer I/O access controller 321b in the second CM 300b to update the configuration data table 351b in the second CM 300b with the same change made to the configuration data table 351a, thereby duplexing the table content. In response, the I/O access controller 321b in the second CM 300b changes its local configuration data table 351b as requested, and then increments the configuration data update count 331b stored in the NVRAM 309b similarly. The configuration data update counts 331a and 331b in the two CMs 300a and 300b are thus synchronized with each other.

As can be seen from the above description, the configuration data tables 351a and 351b in two CMs 300a and 300b are controlled such that their contents are identical. This feature enables, for example, one of the two CMs to move from redundant operation mode to solitary operation mode and immediately start access control of HDDs by using control data stored in that CM's configuration data table.

Figure 11:
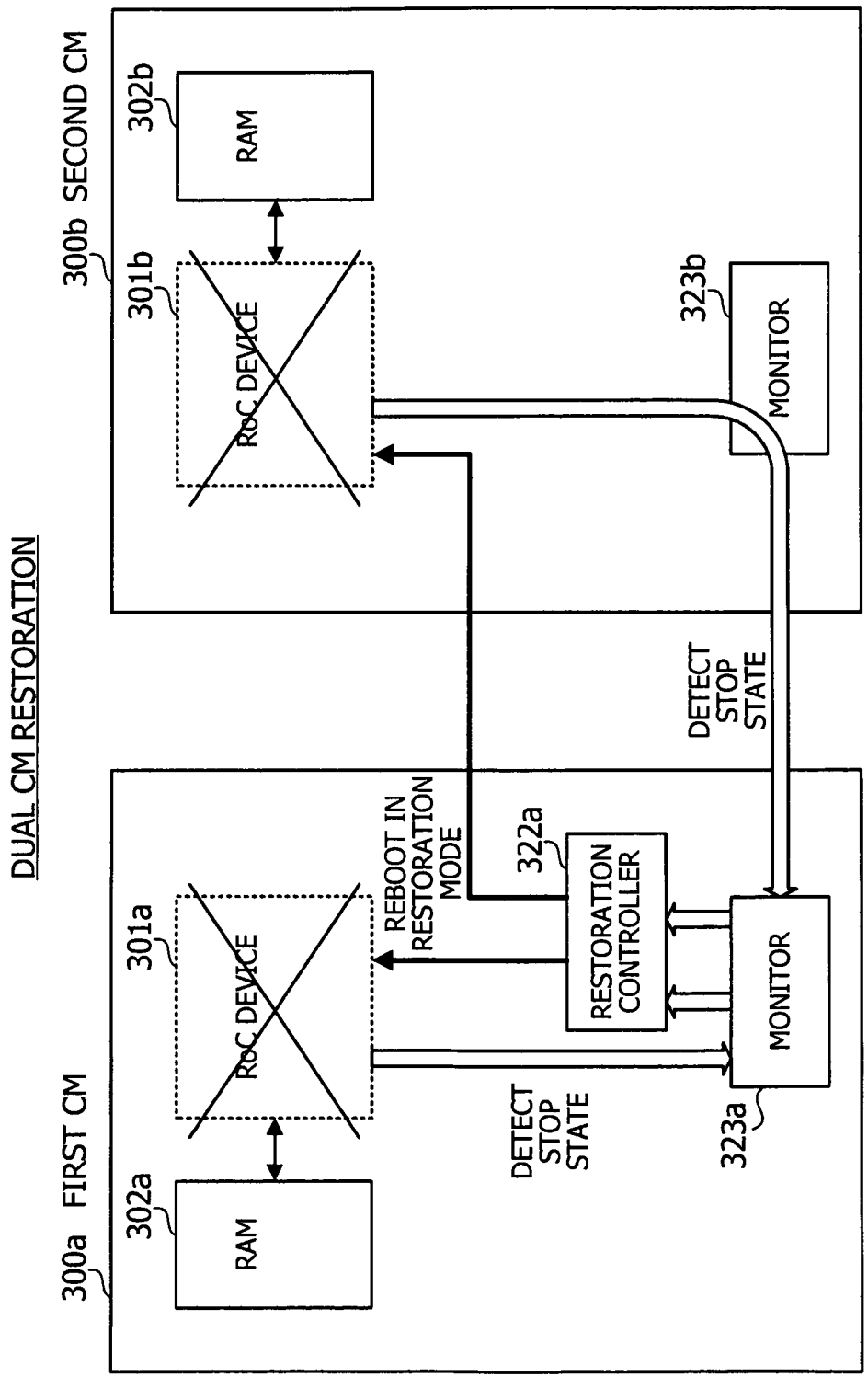
FIG. 11 illustrates dual CM restoration.

FIG. 11 illustrates a process of dual CM restoration. When both RoC devices 301a and 301b in the first and second CMs 300a and 300b stop their operation at the same time, a dual CM restoration process is invoked to enable each CM 300a and 300b to quickly restart the task of access control of HDDs, without losing cache data in the first and second CMs 300a and 300b. Specifically, the restoration controller of each CM invokes a dual CM restoration process when it is found that the RoC devices in both CMs have stopped working.

In the example of FIG. 11, the dual CM restoration process is controlled by the restoration controller 322a in the first CM 300a. Specifically, the monitor 323a keeps track of whether the RoC device 301a in the first CM 300a is working properly. When the RoC device 301a stops, the monitor 323a so notifies the restoration controller 322a. The monitor 323b in the second CM 300b, on the other hand, keeps track of whether its local RoC device 301b is working properly. Through this monitor 323b, the monitor 323a in the first CM 300a can also see whether the RoC device 301b in the second CM 300b is working properly. When the RoC device 301b stops, the monitor 323a so notifies the restoration controller 322a.

Based on the notification from the monitor 323a, the restoration controller 322a finds that both the two RoC devices 301a and 301b have stopped. The restoration controller 322a then executes a dual CM restoration process to reboot the RoC devices 301a and 301b in restoration mode. Specifically, the restoration controller 322a requests the boot controller 324a in the first CM 300a to reboot its local RoC device 301a in restoration mode. The restoration controller 322a also causes the boot controller 324a to communicate with its peer boot controller 324b in the second CM 300b to request rebooting of its local RoC device 301b in restoration mode.

In response to the request from the restoration controller 322a, the RoC devices 301a and 301b reboot together and restart their communication. At the time of this rebooting, the RAM 302a in the first CM 300a contains cache data that has not changed since the RoC device 301a stopped its operation. Likewise, the RAM 302b in the second CM 300b contains cache data that has not changed since the RoC device 301b stopped its operation. Accordingly the I/O access controller 321a can restart access control operations of volume Vol#0 immediately after the RoC device 301a reboots, by using the cache data maintained in the RAM 302a. The I/O access controller 321b can similarly restart access control operations of volume Vol#1 immediately after the RoC device 301b reboots, by using the cache data maintained in the RAM 302b.

The above-described dual CM restoration process restores the access control function for HDDs without losing cache data when two RoC devices 301a and 301b stop together. This restoration process, however, may not work in the case where the two RoC devices stop successively with a time interval in between, because their latest cache data would be lost as will be discussed in FIG. 12.

Figure 12:
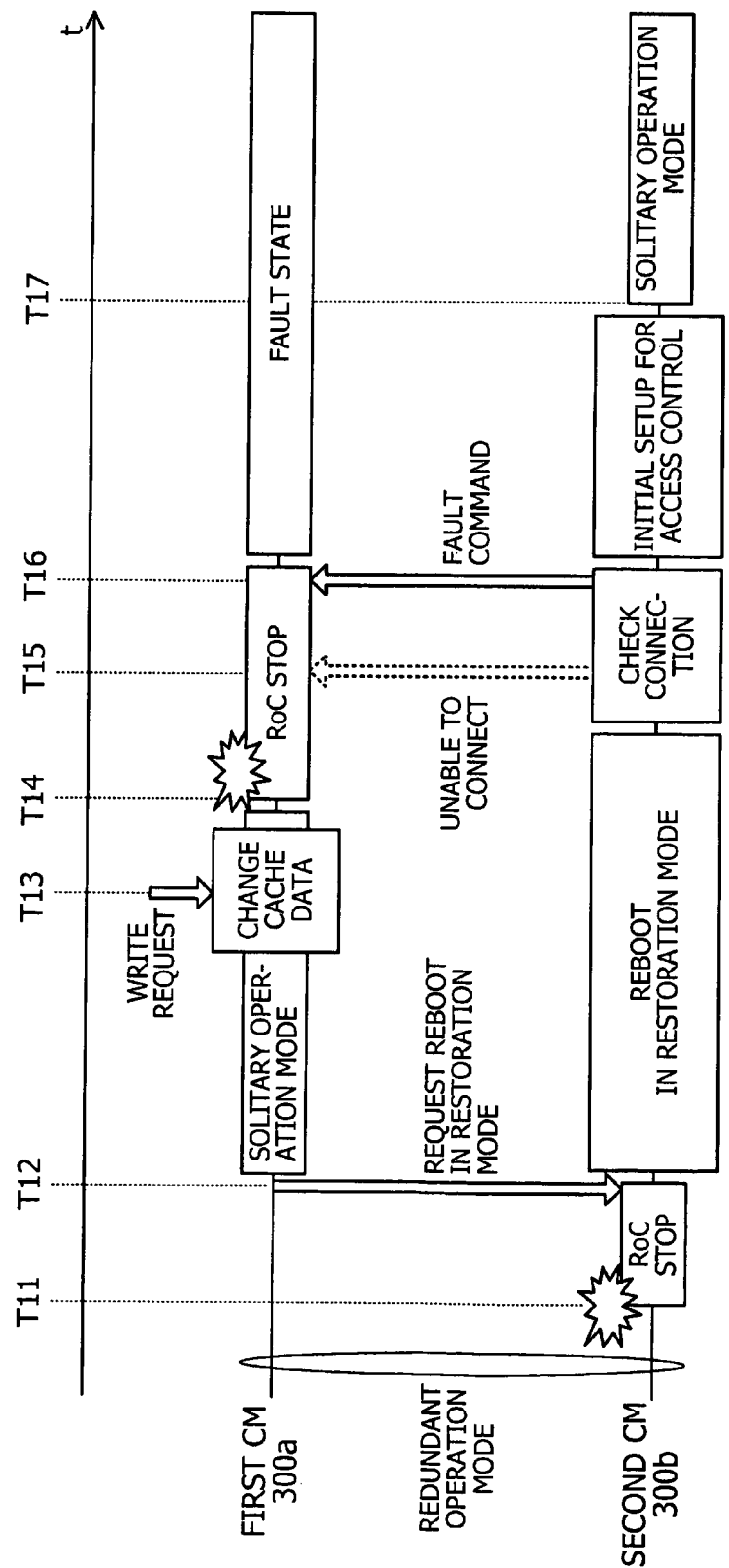
FIG. 12 is a timing diagram illustrating, for reference purposes, an example where two RoC devices stop successively with a certain time interval.

FIG. 12 is a timing diagram illustrating, for reference purposes, an example where two RoC devices stop successively with a certain time interval. Specifically, this example assumes that the RoC device 301b in the second CM 300b stops first, and then the RoC device 301a in the first CM 300a follows.

Referring to the initial state seen in FIG. 12, the RoC device 301a in the first CM 300a is working together with the RoC device 301b in the second CM 300b in redundant operation mode. The latter RoC device 301b then stops working due to some anomalies (at time T11), and this event is detected by the I/O access controller 321a in the first CM 300a. Upon detection, the I/O access controller 321a requests the boot controller 324b in the second CM 300b to reboot the RoC device 301b in restoration mode (at time T12).

The RoC device 301b in the second CM 300b initiates a reboot process in restoration mode. While the RoC device 301b itself is initialized during this reboot process, the RAM 302b is allowed to retain the current data in its local cache area 341b and mirror cache area 342b.

In the first CM 300a, on the other hand, the I/O access controller 321a makes its way to solitary operation mode, in which the I/O access controller 321a uses the local cache area 341a and mirror cache area 342a to continue access control operations for both volumes Vol#0 and Vol#1. The I/O access controller 321a receives and executes a write request from a host device 120 to volume Vol#0 or volume Vol#1 and changes its cache data in the RAM 302a accordingly (at time T13). Since the cache data in the RAM 302a is changed, its counterpart in the RAM 302b of the second CM 300b becomes obsolete and unusable.

Suppose here that the RoC device 301a in the first CM 300a also stops due to some anomalies (at time T14) before the RoC device 301b in the second CM 300b finishes its reboot. When the RoC device 301b in the second CM 300b reboots completely, the I/O access controller 321b in the second CM 300b checks its connection with the RoC device 301a in the first CM 300a (at time T15). Since the RoC device 301a is in a stop state, the I/O access controller 321b finds it not possible to reach the RoC device 301b.

The I/O access controller 321b determines that the access control should be performed in single operation mode since it is unable to connect with the RoC device 301a in the first CM 300a. The I/O access controller 321b thus requests the boot controller 324a in the first CM 300a to put the first CM 300a into a fault state (power down state). The I/O access controller 321b also invokes an initial setup process in preparation for access control in solitary operation mode (at time T16). For example, the initial setup process is performed such that a mirror cache area 342b in the second CM 300b can be used together with a local cache area 341b. The initial setup process also configures the I/O access controller 321b so as to control both volumes Vol#0 and Vol#1. Upon completion of this initial setup process, the I/O access controller 321b starts access control in solitary operation mode (at time T17).

Suppose, for example, that there were no changes to cache data in the RAM 302a of the first CM 300a during the period from T12 to T14 in the above process of FIG. 12. In that case, the cache data in the RAM 302b of the second CM 300b could stay up-to-date even after the rebooting of the RoC device 301b. Accordingly, the RoC device 301b in the second CM 300b would be able to execute access control properly in solitary operation mode by using the cache data in the local cache area 341b and mirror cache area 342b of the RAM 302b at time T17.

However, the cache data in the RAM 302b of the second CM 300b loses its up-to-dateness because a change is made to cache data in the first CM 300a during the period of T12 to T14 as depicted in FIG. 12. If the RoC device 301a in the first CM 300a stops in this condition (at time T14), the I/O access controller 321b in the second CM 300b then starts access control in solitary operation mode (at time T17). The latest cache data in the RAM 302a in the first CM 300a is lost because the RoC device 301a is not operational.

In another hypothetical case, a write request to HDDs in the DE 200 arrives during the period between T12 and T14, but the RoC device 301a in the first CM 300a stops working before the I/O access controller 321a executes the write request. In this case, the specified write data would be lost. The failed data write operation necessitates extra work to be done by a system administrator before resuming the access control. More specifically, the system administrator has to search the event log of each CM 300a and 300b to track down the failed events and recover the lost write data. It thus takes a long time to restart access control operation.

To overcome the problems discussed above, the storage system 100 according to the second embodiment is designed such that a first CM causes a second CM to reboot in restoration mode, not to lose the latest cache data in the second CM, in the case where the first CM's RoC device rebooted on request from the second CM finds itself unable to connect with the second CM.

Figure 13:
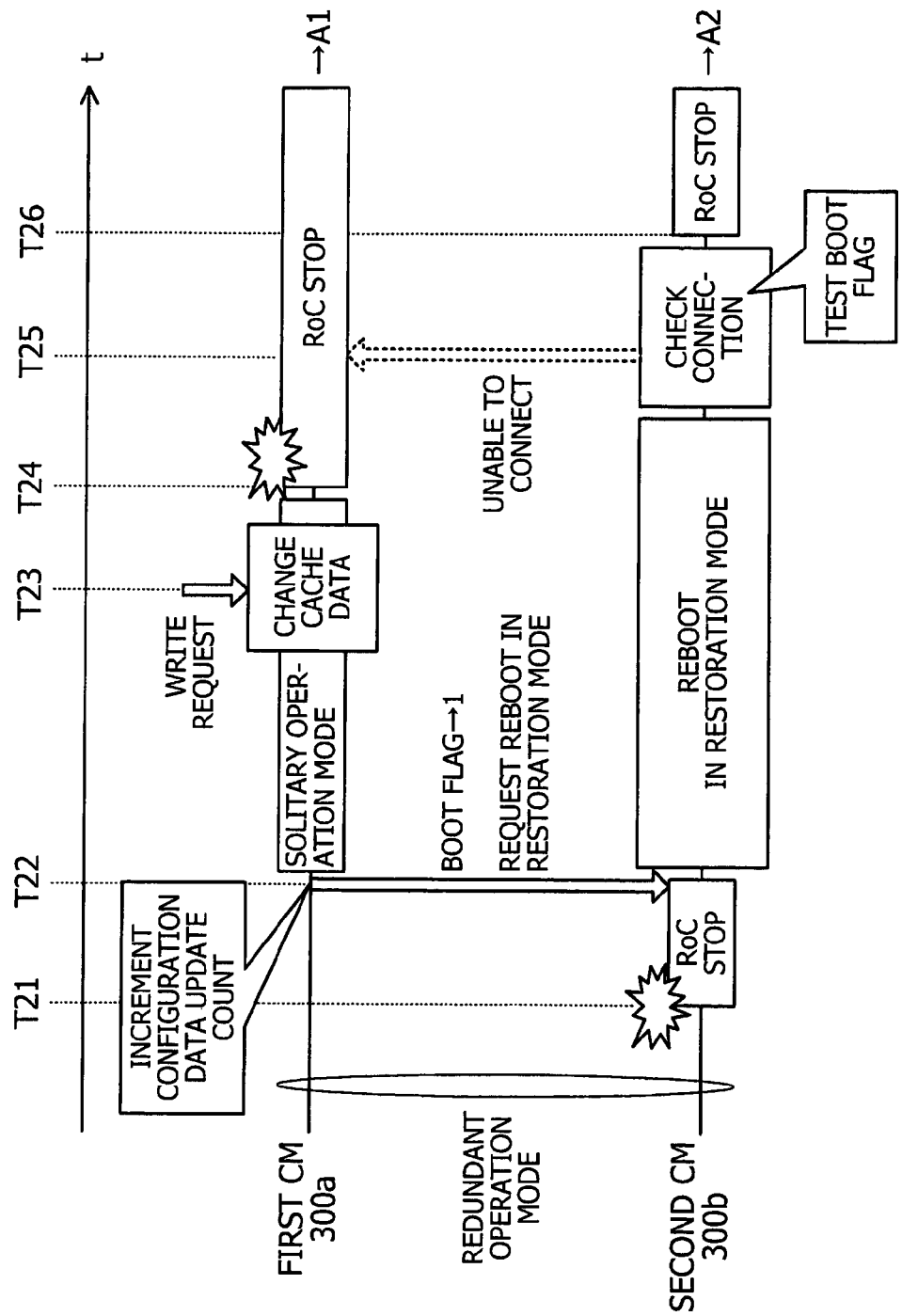
FIG. 13 is a first part of a timing diagram illustrating how the second embodiment works when two RoC devices stop successively with a certain time interval.
Figure 14:
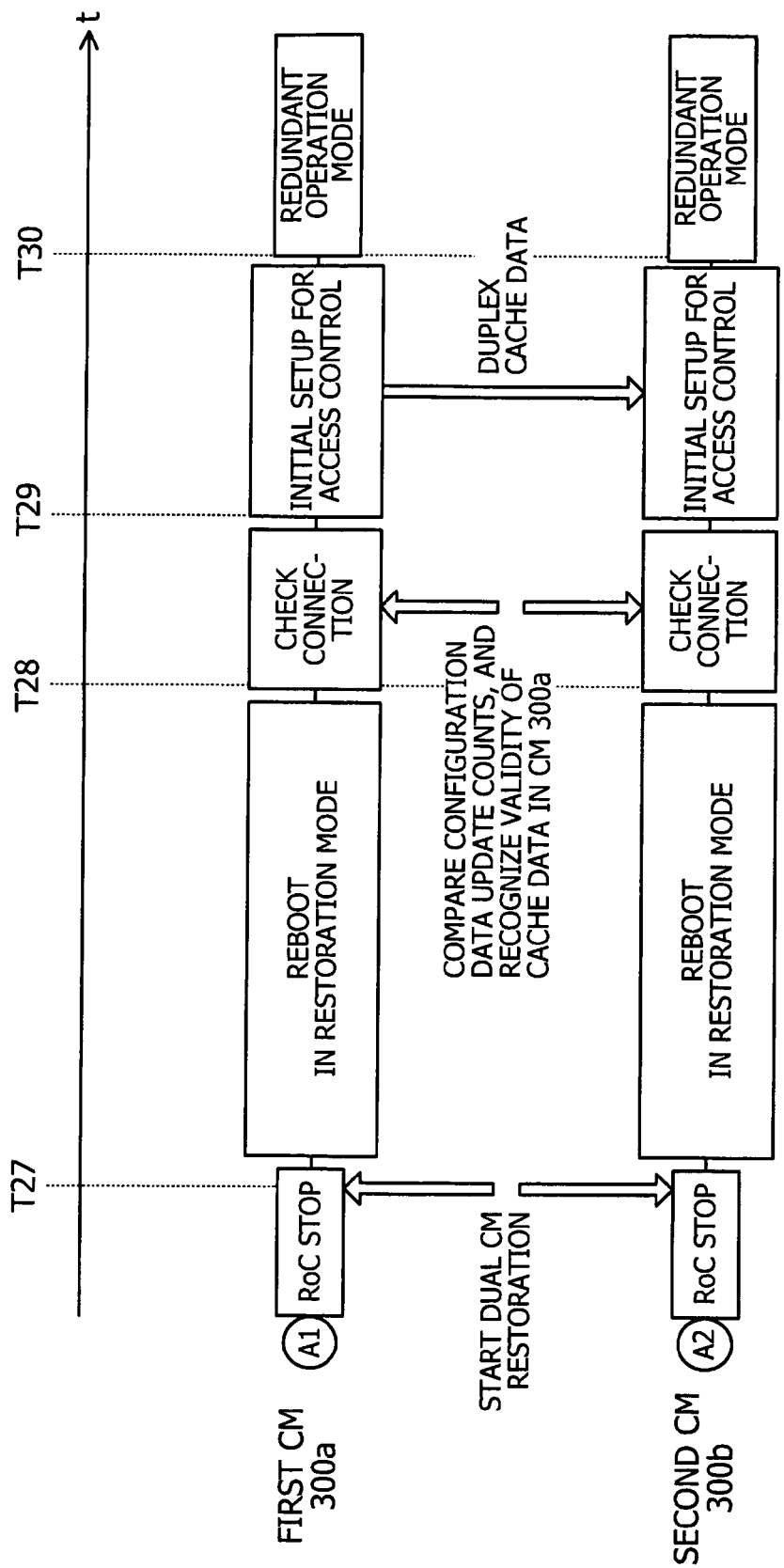
FIG. 14 is a second part of the timing diagram illustrating how the second embodiment works when two RoC devices stop successively with a certain interval.

FIGS. 13 and 14 are a timing diagram illustrating how the second embodiment works when two RoC devices stop successively with a certain interval. Specifically, this example assumes that the RoC device 301b in the second CM 300b stops first, and then the RoC device 301a in the first CM 300a follows.

Referring to the initial state seen in FIG. 13, the RoC device 301a in the first CM 300a is working together with the RoC device 301b in the second CM 300b in redundant operation mode. The latter RoC device 301b then stops working due to some anomalies (at time T21), and this event is detected by the I/O access controller 321a in the first CM 300a (at time T22). Upon detection, the I/O access controller 321a requests the second CM 300b via the boot controller 324a to change its boot flag 332b in the NVRAM 309b from zero to one. In addition, the I/O access controller 321a requests the boot controller 324b in the second CM 300b to reboot the stopped RoC device 301b in restoration mode.

The I/O access controller 321a further increments the configuration data update count 331a stored in the NVRAM 309a of the first CM 300a. As discussed in FIG. 10, the configuration data update count 331a in the first CM 300a has the same value as the configuration data update count 331b in the second CM 300b, as long as both RoC devices 301a and 301b are operating properly. At the time point T22, however, the RoC device 301b in the second CM 300b is in a stop state, being unable to increment its configuration data update count 331b. Only the configuration data update count 331a in the first CM 300a is incremented in this situation.

In response to the request from the I/O access controller 321a in the first CM 300a, the RoC device 301b in the second CM 300b starts rebooting in restoration mode. In this rebooting process, the power supply circuit 310b temporarily stops supplying power to the RoC device 301b so as to reset its circuits. After that, the RoC device 301b loads necessary programs from the SSD 303a and runs them to get ready to execute a connection check as the first step to do. The current data in the local cache area 341b and mirror cache area 342b of RAM 302b is kept intact during this period of rebooting the RoC device 301b.

In the first CM 300a, on the other hand, the I/O access controller 321a makes its way to solitary operation mode, in which the I/O access controller 321a uses the local cache area 341a and mirror cache area 342a to continue access control operations for both volumes Vol#0 and Vol#1. The I/O access controller 321a now receives and executes a write request from a host device 120 to volume Vol#0 or volume Vol#1 and changes its cache data in the RAM 302a accordingly (at time T23).

Suppose here that the RoC device 301a in the first CM 300a stops due to some anomalies (at time T24) before the RoC device 301b in the second CM 300b finishes its reboot. When the RoC device 301b in the second CM 300b reboots completely, the I/O access controller 321b in the second CM 300b checks its connection with the RoC device 301a in the first CM 300a (at time T25). Since the RoC device 301a is stopped, the I/O access controller 321b finds it not possible to reach the RoC device 301a.

Since the peer RoC device 301a cannot be reached, the I/O access controller 321b chooses and executes an appropriate process depending on the boot flag 332b, which is stored in the NVRAM 309b of the second CM 300b. Specifically, when the boot flag 332b is set to one, the I/O access controller 321b stops the RoC device 301b in the second CM 300b (at time T26).

While not illustrated in FIG. 13, the I/O access controller 321b is supposed to execute an initial setup process for access control in solitary operation mode if the peer RoC device 301a cannot be reached at time T25, and if the boot flag 332b is zero. After this initial setup process, the I/O access controller 321b controls access to volumes Vol#0 and Vol#1 by itself.

Referring again to FIG. 13, the RoC device 301b in the second CM 300b stops its operation at time T26. The restoration controller 322a in the first CM 300a detects that both RoC devices 301a and 301b have stopped, as illustrated in FIG. 14. The restoration controller 322b in the second CM 300b may also detect the event. In the former case, for example, the restoration controller 322a executes a dual CM restoration process to reboot both RoC devices 301a and 301b in restoration mode (at time T27 in FIG. 14). Specifically, the restoration controller 322a requests the boot controller 324a in the first CM 300a to reboot its local RoC device 301a in restoration mode. The restoration controller 322a also causes the boot controller 324a to request its peer boot controller 324b in the second CM 300b to reboot the RoC device 301b in restoration mode.

In response to the request from the restoration controller 322a, the RoC device 301a in the first CM 300a reboots while keeping its own cache data intact, as does the RoC device 301b in the second CM 300b. When both RoC devices 301a and 301b complete their respective reboot processes, the I/O access controllers 321a and 321b check their connection over communication path P1 (at time T28). Here the I/O access controllers 321a and 321b also compare the configuration data update count 331a in NVRAM 309a of the first CM 300a with the configuration data update count 331b in NVRAM 309b of the second CM 300b. Because the configuration data update count 331a of the first CM 300a is greater than the configuration data update count 331b of the second CM 300b, the I/O access controllers 321a and 321b recognize the validity (i.e., up-to-dateness) of cache data stored in the first CM 300a and execute an initial setup process in preparation for access control in redundant operation mode (at time T29). The configuration data update count 331b in the second CM 300b is incremented at the start of this initial setup process, which renders the two configuration data update counts 331a and 331b in a synchronized state.

During the course of the initial setup process started at time T29, the I/O access controllers 321a and 321b execute a task of duplexing cache data held in the first CM 300a. More specifically, the I/O access controller 321a sends data from its own local cache area 341a and mirror cache area 342a in the RAM 302a to the peer I/O access controller 321b in the second CM 300b. The I/O access controller 321b discards data in the local cache area 341b and mirror cache area 342b of the RAM 302b, and loads the mirror cache area 342b with new data sent from the local cache area 341a, as well as the local cache area 341b with new data sent from the mirror cache area 342a. The I/O access controllers 321a and 321b start, upon completion of their respective initial setup processes, access control operations in redundant operation mode (at time T30).

According to the above-described process of FIGS. and 14, the boot flag 332b enables the I/O access controller 321b in the second CM 300b to determine, at the time of its rebooting, whether the rebooting has been initiated by the first CM 300a. When it is determined that the rebooting has been initiated by the first CM 300a, and if the RoC device 301a in that first CM 300a is then in a stop state, the RoC device 301b in the second CM 300b stops itself to intentionally create a situation that necessitates a dual CM restoration process. By so doing, the RoC device 301b makes the peer RoC device 301a reboot with valid cache data maintained therein. This action enables the RoC devices 301a and 301b to restart access control over HDDs in the DE 200 by using the valid cache data maintained in the RoC device 301a.

The above-described processing makes it possible to restart the task of access control without losing the latest cache data even in the case where the RoC devices 301a and 301b in the first and second CMs 300a and 300b successively stop working with a certain time interval. The above-described processing also enables quick and automated restoration of access control functions without intervention of the system administrator even in the noted case.

The I/O access controllers 321a and 321b in the first and second CMs 300a and 300b check their connection at time T28 as a result of the dual CM restoration process, and at that point, the I/O access controllers 321a and 321b determine which of the first and second CMs 300a and 300b has valid cache data. It is noted that the I/O access controllers 321a and 321b do not require any additional information for this determination, but can achieve it by comparing their configuration data update counts 331a and 331b, which are originally used for other purposes.

The configuration data tables 351a and 351b may contain log records of anomalous events, such as a stop state of RoC devices 301a and 301b. In this case, the I/O access controller 321a in the first CM 300a may take care of such error event records in the configuration data table 351a. For example, when the RoC device 301b in the second CM 300b stops at time T22 of FIG. 13, the I/O access controller 321a updates its configuration data table 351a to record that event. The I/O access controller 321a also increments its configuration data update count 331a when such an update takes place in the configuration data table 351a. After that, the I/O access controller 321a duplexes the configuration data table 351a by reflecting new content in the configuration data table 351b of the second CM 300b when the RoC device 301a in the first CM 300a reboots and starts an initial setup for access control (as in time T29 of FIG. 14, or as in step S35 of FIG. 17 to be described later).

The operation of CMs according to the second embodiment will now be described with reference to some flowcharts for the first CM 300a. The described operation may also be executed in a similar way by the second CM 300b.

Figure 15:
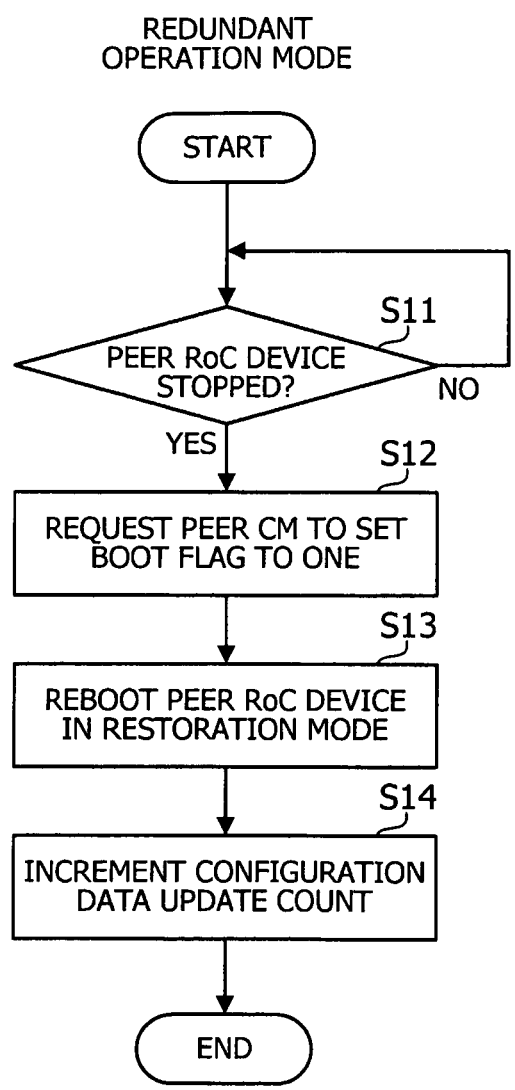
FIG. 15 is a flowchart of a process executed by an I/O access controller to supervise the activity of its peer RoC device.

FIG. 15 is a flowchart of a process executed by an I/O access controller to supervise the activity of its peer RoC device. Specifically, the illustrated process of FIG. 15 is executed by the I/O access controller 321a in the first CM 300a when it performs access control in redundant operation mode.

(Step S11) The I/O access controller 321a monitors whether the RoC device 301b in the second CM 300b is running or stopped. For example, the I/O access controller 321a achieves this by communicating health-check signals with the RoC device 301b in the second CM 300b over communication path P1 at regular intervals. The I/O access controller 321a moves to step S12 when it is determined that the RoC device 301b is stopped (Yes at step S11).

(Step S12) Through the boot controller 324a, the I/O access controller 321a requests the boot controller 324b in the second CM 300b to change its boot flag 332b from zero to one. In response to this request, the boot controller 324b in the second CM 300b changes its boot flag 332b in the NVRAM 309b to one.

(Step S13) Through the boot controller 324a, the I/O access controller 321a requests the boot controller 324b in the second CM 300b to reboot the RoC device 301b in restoration mode. In response to this request, the boot controller 324b makes the RoC device 301b reboot by interrupting its power supply for a short time to reset the RoC device 301b while keeping the RAM 302b powered.

(Step S14) The I/O access controller 321a increments the configuration data update count 331a in NVRAM 309a of the first CM 300a.

Figure 16:
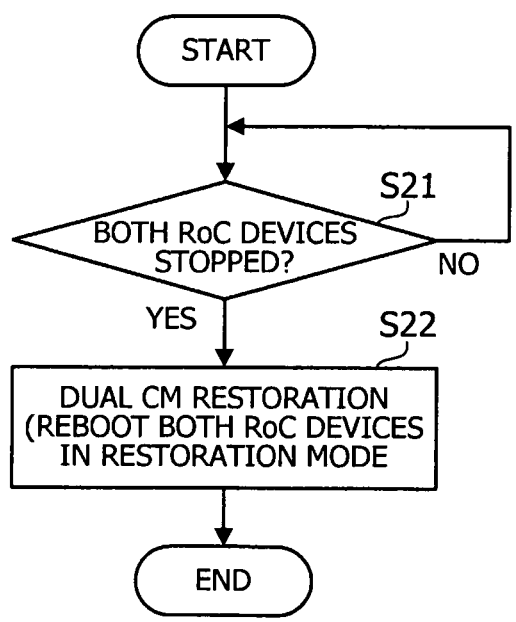
FIG. 16 is a flowchart of a process executed by a restoration controller.

FIG. 16 is a flowchart of a process executed by the restoration controller.

(Step S21) In the first CM 300a, the monitor 323a keeps track of whether the RoC device 301a is working properly. When the RoC device 301a stops, the monitor 323a so notifies the restoration controller 322a. The monitor 323b in the second CM 300b, on the other hand, keeps track of whether the RoC device 301b is working properly. Through this monitor 323b, the monitor 323a in the first CM 300a can see whether the RoC device 301b in the second CM 300b is working properly. When the RoC device 301b stops, the monitor 323a so notifies the restoration controller 322a.

The restoration controller 322a checks whether there is a notification from the monitor 323a which indicates a stop state of each RoC device 301a and 301b. When the monitor 323a indicates that both RoC devices 301a and 301b have stopped (Yes at step S21), the restoration controller 322a proceeds to step S22.

(Step S22) The restoration controller 322a executes a dual CM restoration process. Specifically, the restoration controller 322a requests the boot controller 324a to reboot its local RoC device 301a in restoration mode. The restoration controller 322a also requests, via the boot controller 324a, the boot controller 324b in the second CM 300b to reboot its local RoC device 301b in restoration mode. The two RoC devices 301a and 301b thus reboot together in response to the request from the restoration controller 322a, while keeping their respective cache data intact.

Figure 17:
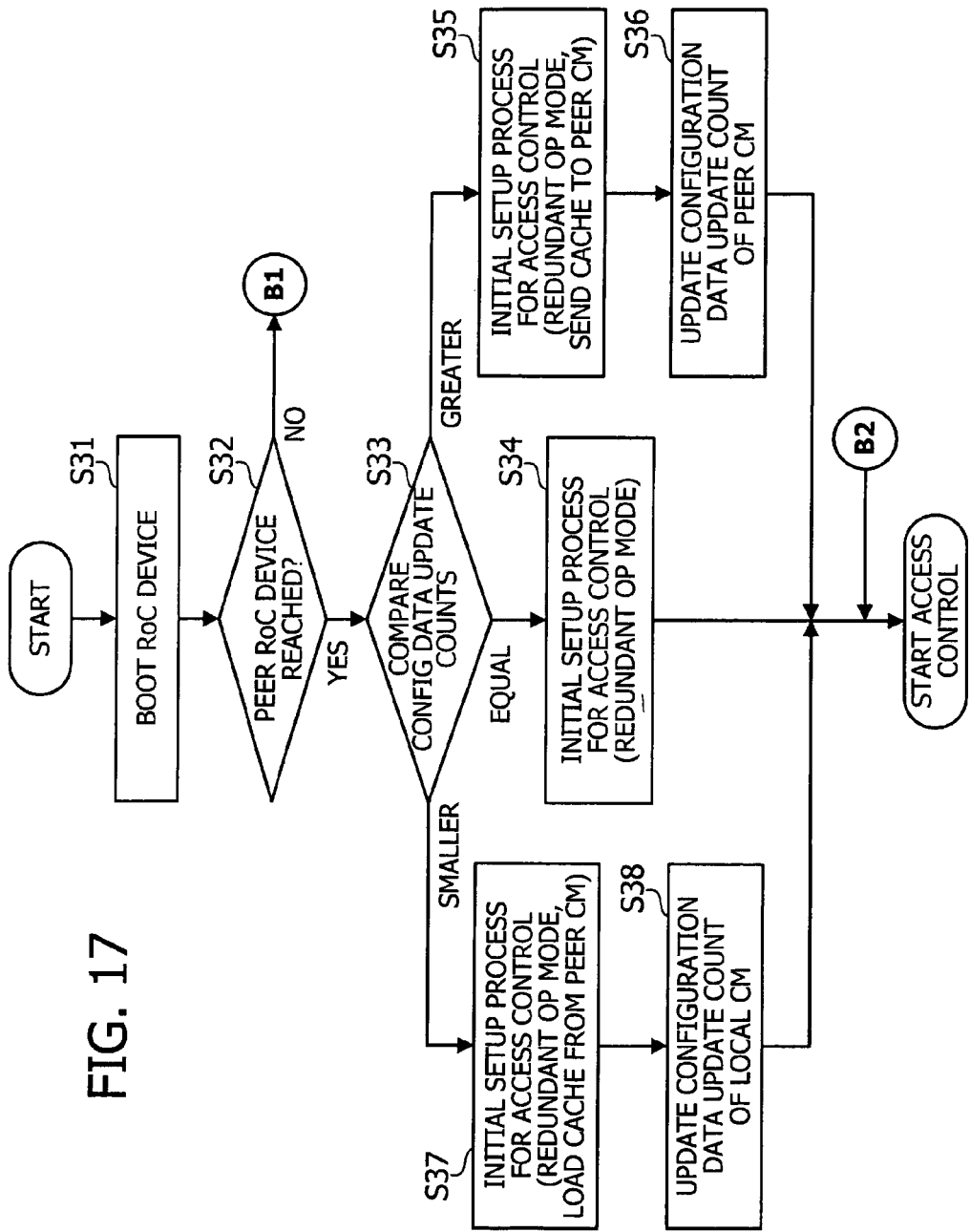
FIG. 17 is a first part of a flowchart illustrating what is executed when an RoC device starts up.
Figure 18:
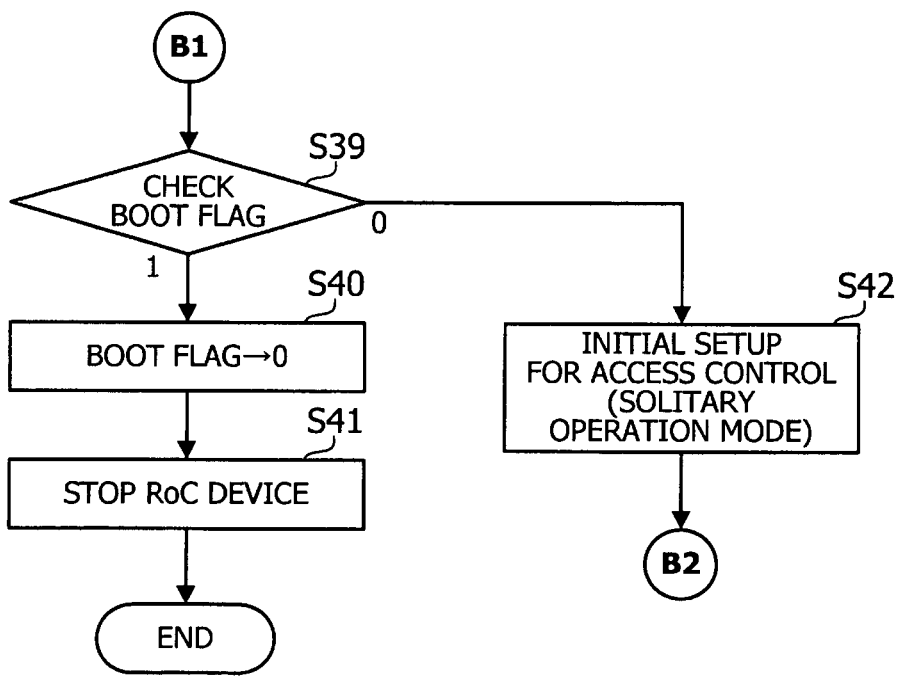
FIG. 18 is a second part of the flowchart illustrating what is executed when an RoC device starts up.

FIGS. 17 and 18 give a flowchart illustrating what is executed when an RoC device starts up. The illustrated process of FIGS. 17 and 18 is executed when the first CM 300a starts upon power up, as well as when the first CM 300a reboots at its own discretion or upon request from the second CM 300b.

(Step S31) The RoC device 301a runs a boot process. During this course, the hardware of the RoC device 301a is initialized, access control programs are loaded from the SSD 303a into the RoC device 301a, and other necessary processing is done. The CPU in the RoC device 301a then begins executing the access control programs, thereby launching an I/O access controller 321a.

(Step S32) The I/O access controller 321a tests its connection with the peer RoC device 301b via communication path P1. When the RoC device 301b can be reached (Yes at step S32), the I/O access controller 321a proceeds to step S33. When the RoC device 301b cannot be reached (No at step S32), the I/O access controller 321a proceeds to step S39.

(Step S33) Through the boot controller 324a, the I/O access controller 321a reads a configuration data update count 331a out of the NVRAM 309a. In addition, the I/O access controller 321a interacts with its peer I/O access controller 321b in the second CM 300b to read a configuration data update count 331b stored in the NVRAM 309b of the second CM 300b.

The I/O access controller 321a compares the read values of configuration data update counts 331a and 331b. If the two values match with each other, the I/O access controller 321a proceeds to step S34. If the configuration data update count 331a in the first CM 300a is greater than the configuration data update count 331b read out of the second CM 300b, the I/O access controller 321a proceeds to step S35. If the configuration data update count 331a in the first CM 300a is smaller than the configuration data update count 331b read out of the second CM 300b, the I/O access controller 321a proceeds to step S37.

(Step S34) The I/O access controller 321a executes an initial setup process in preparation for access control in redundant operation mode. It is noted that this initial setup process involves no data transfer or update concerning the local cache area 341a and mirror cache area 342a of the RAM 302a. Upon completion of the initial setup process, the I/O access controller 321a starts access control operations in redundant operation mode.

This step S34 is executed in the case where, for example, the RoC device 301a reboots as a result of a dual CM restoration process that is initiated because of simultaneous stop of RoC devices 301a and 301b during access control operations by the I/O access controllers 321a and 321b in redundant operation mode. In this particular case, both CMs 300a and 300b have the latest cache data, which permits the I/O access controller 321a to resume access control operations in redundant operation mode without the need for reestablishing the duplexed state of cache data.

(Step S35) Now that the configuration data update count 331a in the first CM 300a is greater than the configuration data update count 331b in the second CM 300b, the I/O access controller 321a executes an initial setup process in preparation for access control in redundant operation mode. During the course of this initial setup process, the I/O access controller 321a requests the I/O access controller 321b in the second CM 300b to update its local cache data, sending the current content of the local cache area 341a and mirror cache area 342a. In response, the I/O access controller 321b in the second CM 300b discards its cache data in the RAM 302b and then loads the mirror cache area 342b of the second CM 300b with the data from the local cache area 341a, as well as the local cache area 341b of the second CM 300b with the data from the mirror cache area 342a.

(Step S36) During the course of the above initial setup process, the I/O access controller 321a requests the I/O access controller 321b in the second CM 300b to equalize its configuration data update count 331b to the configuration data update count 331a in the first CM 300a. In response, the I/O access controller 321b executes the request by, for example, incrementing the configuration data update count 331b in the NVRAM 309b.

Upon completion of the above initial setup process, the I/O access controller 321a starts access control operations in redundant operation mode. The above-described series of steps S31 to S33, S35, and S36 may correspond to, for example, the foregoing process that the first CM 300a executes after rebooting at time T27 in FIG. 14.

(Step S37) The I/O access controller 321a executes an initial setup process in preparation for access control in redundant operation mode. During the course of this initial setup process, the I/O access controller 321a flushes its cache data in the RAM 302a and then receives replacement data from the peer I/O access controller 321b in the second CM 300b. This data is what is stored in of the local cache area 341b and mirror cache area 342b of the second CM 300b. The I/O access controller 321a stores the received data of the local cache area 341b and mirror cache area 342b in the mirror cache area 342a and local cache area 341a, respectively.

(Step S38) During the course of the above initial setup process, the I/O access controller 321a receives a request from its peer I/O access controller 321b in the second CM 300b for updating the configuration data update count 331a in the first CM 300a. In response, the I/O access controller 321a executes the request by, for example, incrementing the configuration data update count 331a in the NVRAM 309a so as to equalize it to the configuration data update count 331b in the second CM 300b.

Upon completion of the above initial setup process, the I/O access controller 321a starts access control operations in redundant operation mode. The above-described series of steps S31 to S33, S37, and S38 may correspond to, for example, the foregoing process that the second CM 300b executes after rebooting at time T27 in FIG. 14.

(Step S39) Since the peer RoC device 301b cannot be reached, the I/O access controller 321a consults its own boot flag 332a in the NVRAM 309a. If the boot flag 332a is set to one, I/O access controller 321a proceeds to step S40. If the boot flag 332a is zero, the I/O access controller 321a proceeds to step S42.

(Step S40) The I/O access controller 321a clears the boot flag 332a to zero.

(Step S41) The I/O access controller 321a forces the RoC device 301a to stop its operation, thus intentionally creating a situation as if the RoC device 301a had stopped due to some anomalies.

The above-described series of steps S31, S32, S39 to S41 may correspond to, for example, the foregoing process that the second CM 300b starts after rebooting at time T22 in FIG. 13 and continues until the RoC device 301b is stopped at time T26. Accordingly, the a dual CM restoration process is supposed to be invoked after step S41, which causes the RoC device 301a to reboot in restoration mode.

(Step S42) Now that the boot flag 332a is found to be zero, the I/O access controller 321a executes an initial setup process in preparation for access control in solitary operation mode. For example, this initial setup process is performed such that the current data in the local cache area 341a and mirror cache area 342a in the second CM 300b can be used as cache data. The initial setup process also configures the I/O access controller 321a so as to control both volumes Vol#0 and Vol#1. Upon completion of the initial setup process, the I/O access controller 321a starts access control operations for both volumes Vol#0 and Vol#1 in solitary operation mode.

The above-described series of steps S31, S32, S39, and S42 may correspond to, for example, the process executed in the case where the RoC device 301a in the first CM 300a cannot reboot properly, while the RoC device 301b in the second CM 300b can, in the dual CM restoration process initiated at time T27 in FIG. 14. In this case, the I/O access controller 321b in the second CM 300b is unable to reach the RoC device 301a in the first CM 300a (No at step S32), and the boot flag 332b is zero (step S39). Accordingly, the I/O access controller 321b begins access control in solitary operation mode upon completion of an initial setup process therefor (step S42).

In the foregoing procedure of FIG. 14, two RoC devices 301a and 301b confirm their connection at time T28, and the RoC device 301b in the second CM 300b is caused to start an initial setup process at time T29 because of its lack of valid cache data. As an alternative procedure, the I/O access controller 321a in the first CM 300a may be configured to cause its peer RoC device 301b to reboot in normal mode at time T29. In this case, the RoC device 301b discards cache data in the RAM 302b when it reboots. The I/O access controller 321a may control access to volume Vol#0 and Vol#1 in solitary operation mode until the RoC device 301b reboots completely and becomes reachable again. After confirming its connection with the rebooted RoC device 301b, the I/O access controller 321a provides a copy of cache data in its local RAM 302a to the RAM 302b in the second CM 300b during the course of an initial setup process of the I/O access controller 321b, thereby establishing a duplexed state of cache data. When the I/O access controller 321b completes its initial setup process, the two I/O access controllers 321a and 321b start access control together in redundant operation mode.

As another alternative procedure, the I/O access controller 321a in the first CM 300a may be configured to execute access control of volumes Vol#0 and Vol#1 in solitary operation mode, while bringing the second CM 300b to, for example, a fault state (power down state) at time T29. In this case, the flowchart of FIG. 17 is to be modified such that the I/O access controller renders its peer RoC device into a fault state at step S35, instead of duplexing cache data, when step S33 finds that the local CM's configuration data update count is greater than the peer CM's configuration data update count. Step S36 may be omitted. Also, when step S33 finds that the local CM's configuration data update count is smaller than the peer CM's configuration data update count, the I/O access controller does not execute steps S37 and S38, but waits the peer CM to request transition to the fault state.

It is noted that, in the case of the second alternative (i.e., where the second CM 300b is rendered into a fault state at time T29 in FIG. 14 because of its smaller configuration data update count), the I/O access controller 321a in the first CM 300a is allowed to skip the step of duplexing cache data during its initial setup process at time T29. This means that the first CM 300a can resume access control operations in a shorter time.

According to the second embodiment described above, the I/O access controller in a CM causes the RoC device in its peer CM to reboot in restoration mode when that RoC device is found stopped. The I/O access controller may, however, be configured to make the RoC device reboot in normal mode without retaining its cache data. This alternative can be applied to the I/O access controller 321a in the first CM 300a at time T22 in the process of FIG. 13. In this case, the RoC device 301b in the second CM 300b is rebooted in normal mode, during which the cache data is lost from the RAM 302b in the second CM 300b. In other words, the cache data in the second CM 300b is invalidated, no matter whether its counterpart in the first CM 300a is changed during the period from T22 to T24. Accordingly the two CMs 300a and 300b can execute subsequent processing after T24 similarly to the sequence of FIG. 13, thereby resuming their access control operations with the latest cache data in the first CM 300a.

(c) Third Embodiment

This section will describe a storage system according to a third embodiment. The third embodiment is different from the foregoing second embodiment in that the first and second CMs 300a and 300b have a function of counting changes made to cache data. According to the third embodiment, the I/O access controllers 321a and 321b in the first and second CMs 300a and 300b compare their respective cache change counts when they are rebooted in a dual CM restoration process. Depending on the comparison result, the I/O access controllers 321a and 321b determine whether to duplex cache data or to keep their current cache data intact, before they start access control.

Figure 19:
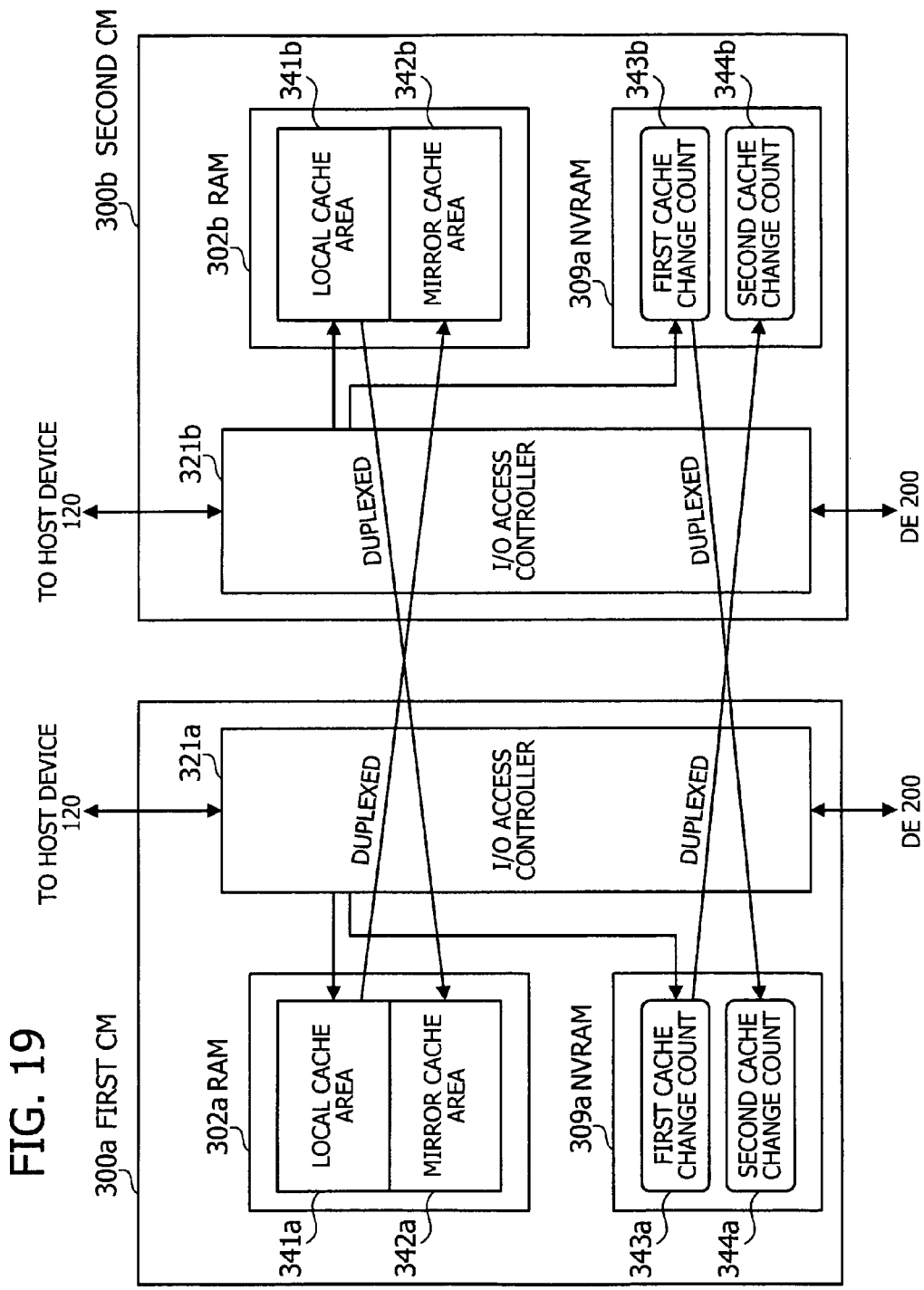
FIG. 19 illustrates how cache change counts are incremented.

FIG. 19 illustrates how cache change counts are incremented. Specifically, a first cache change count 343a and a second cache change count 344a are located in the NVRAM 309a of the first CM 300a. The first cache change count 343a indicates the number of changes made to cache data in the local cache area 341a, and the second cache change count 344a indicates the same for the mirror cache area 342a. Similarly, the NVRAM 309b in the second CM 300b stores a first cache change count 343b and a second cache change count 344b. The first cache change count 343b indicates the number of changes made to cache data in the local cache area 341b, and the second cache change count 344b indicates the same for the mirror cache area 342b.

When they execute access control in redundant operation mode, the two I/O access controllers 321a and 321b in the first and second CMs 300a and 300b control their cache data and associated cache change counts such that a pair of cache change counts 343a and 343b have equal values, and so do another pair of cache change counts 344a and 344b.

More specifically, the I/O access controller 321a in the first CM 300a increments its first cache change count 343a when cache data in the local cache area 341a is changed by, for example, a data write operation. Each time a change is made to the local cache area 341a, the I/O access controller 321a sends the changed data to its peer I/O access controller 321b in the second CM 300b, so that the same change is applied to the mirror cache area 342b in the second CM 300b. The I/O access controller 321a also requests, each time the first cache change count 343a is incremented, the I/O access controller 321b in the second CM 300b to equalize its second cache change count 344b to the first cache change count 343a. The requested I/O access controller 321b synchronizes the cache change counts by, for example, incrementing the second cache change count 344b, or overwriting the second cache change count 344b with the value of first cache change count 343a supplied from the peer I/O access controller 321a.

In response to the above request from the peer I/O access controller 321a in the first CM 300a, the I/O access controller 321b updates its own mirror cache area 342b with cache data received from the I/O access controller 321a. The I/O access controller 321b then increments the second cache change count 344b, thereby equalizing it to the first cache change count 343a.

Similarly to the above, the I/O access controller 321b in the second CM 300b increments its first cache change count 343b when cache data in the local cache area 341b is changed by, for example, a data write operation. Each time a change is made to the local cache area 341b, I/O access controller 321b sends the changed data to its peer I/O access controller 321a in the first CM 300a, so that the same change is applied to the mirror cache area 342a in the first CM 300a. The I/O access controller 321b also requests, each time the first cache change count 343b is incremented, the I/O access controller 321a in the first CM 300a to equalize its second cache change count 344a to the first cache change count 343b.

In response to the above request from the peer I/O access controller 321b in the second CM 300b, the I/O access controller 321a updates its own mirror cache area 342a with cache data received from the I/O access controller 321b. The I/O access controller 321a then increments the second cache change count 344a, thereby equalizing it to the first cache change count 343b.

Figure 20:
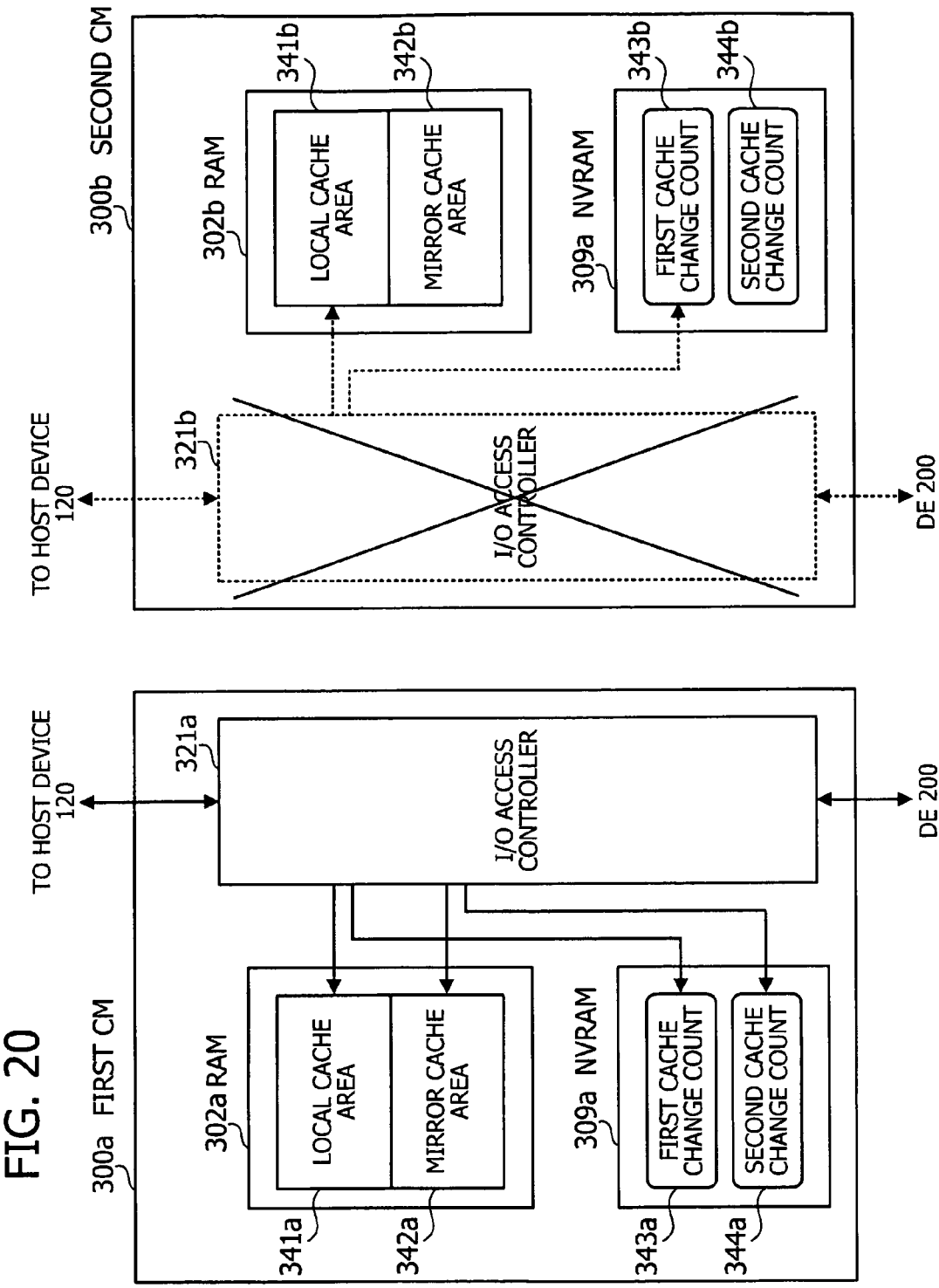
FIG. 20 illustrates how cache change counts are incremented in solitary operation mode.

FIG. 20 illustrates how cache change counts are incremented in solitary operation mode. As described above, the I/O access controller in one CM makes the RoC device in the other CM in restoration mode when that RoC device stops due to some anomalies. By using cache data stored in the mirror cache area of the CM, the I/O access controller then takes over the access control tasks that have been done by its counterpart in the other CM. This is continued until the RoC device recovers in the other CM.

Specifically, FIG. 20 illustrates an example case where the RoC device 301b in the second CM 300b is stopped. In the illustrated case, the I/O access controller 321a in the first CM 300a migrates to solitary operation mode, while making the RoC device 301b in the second CM 300b reboot in restoration mode. In solitary operation mode, the I/O access controller 321a is supposed to control access operations, not only to volume Vol#0, but also to volume Vol#1. For the latter purpose, the I/O access controller 321a uses cache data in the mirror cache area 342a of the RAM 302a.

In solitary operation mode, the I/O access controller 321a increments its first cache change count 343a each time a change is made to cache data in the local cache area 341a. The I/O access controller 321a also increments its second cache change count 344a each time a change is made to cache data in the mirror cache area 342a.

Figure 21:
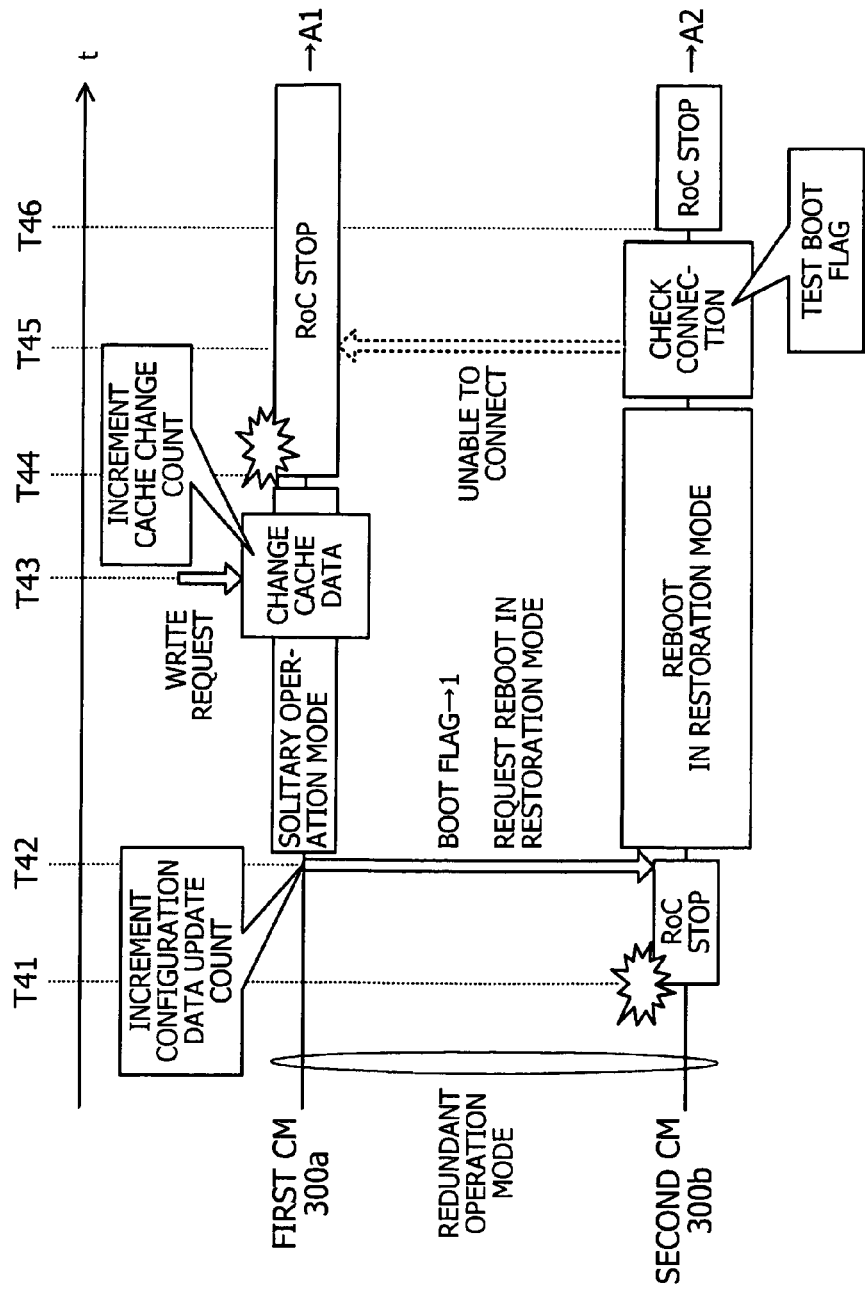
FIG. 21 is a first part of a timing diagram illustrating how a third embodiment works when two RoC devices stop successively with a certain interval.
Figure 22:
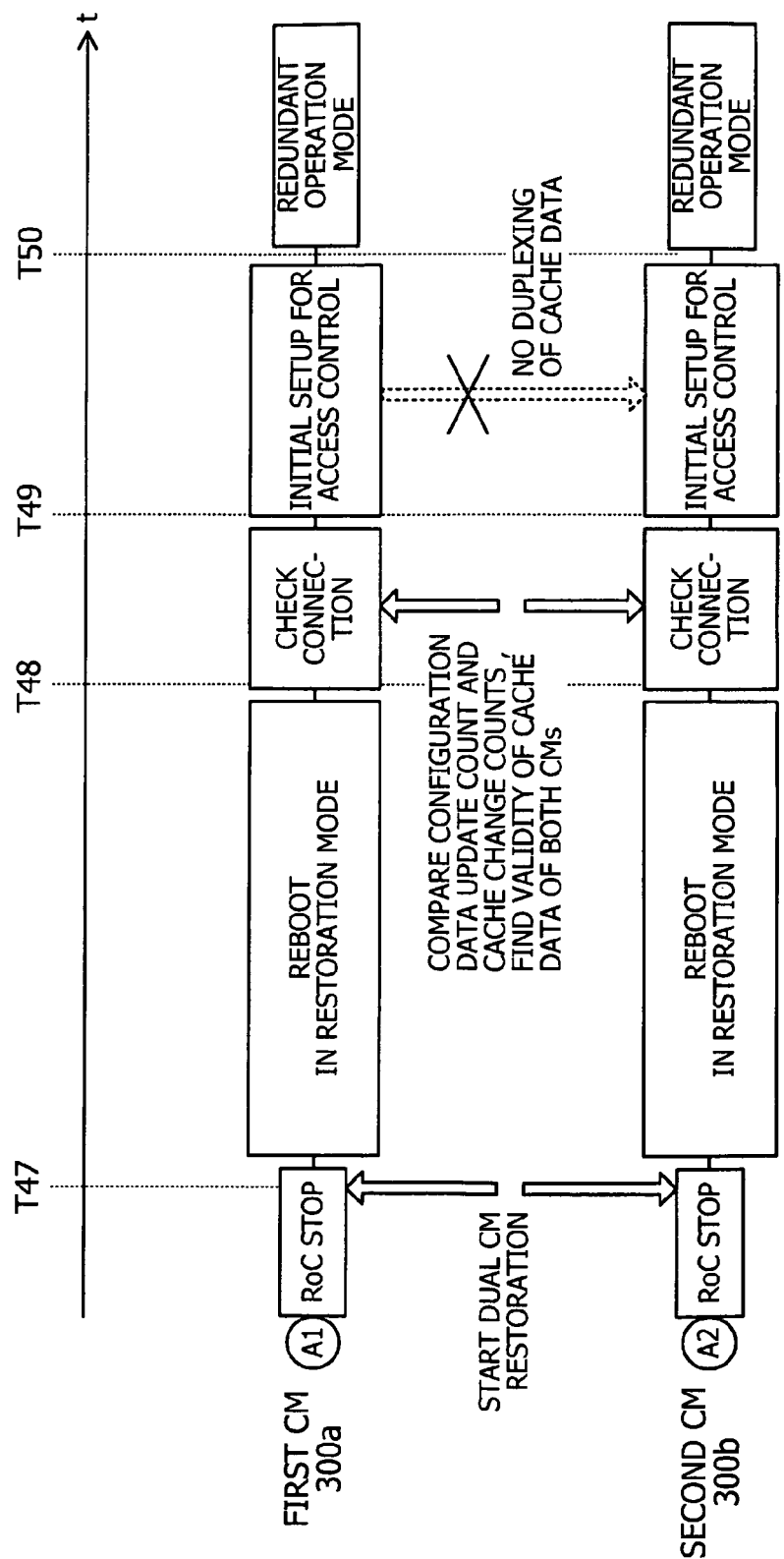
FIG. 22 is a second part of a timing diagram illustrating how the third embodiment works when two RoC devices stop successively with a certain interval.

FIGS. 21 and 22 give a timing diagram illustrating how the third embodiment works when two RoC devices stop successively with a certain interval. Specifically, this example assumes that the RoC device 301b in the second CM 300b stops first, and then the RoC device 301a in the first CM 300a follows.

Referring to the initial state seen in FIG. 21, the RoC device 301a in the first CM 300a is working together with the RoC device 301b in the second CM 300b in redundant operation mode. The latter RoC device 301b then stops working due to some anomalies (at time T41), and this event is detected by the I/O access controller 321a in the first CM 300a (at time T42). Upon detection, the I/O access controller 321a makes the RoC device 301b in the second CM 300b reboot in restoration mode. The I/O access controller 321a also causes the second CM 300b to change its boot flag 332b in the NVRAM 309b from zero to one, as well as incrementing the configuration data update count 331a stored in the NVRAM 309a of the first CM 300a.

In response to the above request from the I/O access controller 321a in the first CM 300a, the RoC device 301b in the second CM 300b starts rebooting in restoration mode. During this reboot process, the RAM 302b in the second CM 300b is allowed to retain the current data in its local cache area 341b and mirror cache area 342b.

In the first CM 300a, on the other hand, the I/O access controller 321a makes its way to solitary operation mode, in which the I/O access controller 321a uses the local cache area 341a and mirror cache area 342a to continue access control operations for both volumes Vol#0 and Vol#1. The I/O access controller 321a now receives a write request from a host device 120 to volume Vol#0 or volume Vol#1. In response, the I/O access controller 321a updates cache data in the RAM 302a and increments a cache change count that corresponds to the updated cache area accordingly (at time T43). At this moment, the I/O access controller 321a is unable to communicate with the RoC device 301b that is rebooting in the second CM 300b. Thus the I/O access controller 321a only increments its own cache change counts in the first CM 300a while leaving those in the second CM 300b as they are.

Suppose here that the RoC device 301a in the first CM 300a stops due to some anomalies (at time T44) before the RoC device 301b in the second CM 300b finishes its reboot. When the RoC device 301b in the second CM 300b reboots completely, the I/O access controller 321b in the second CM 300b checks its connection with the RoC device 301a in the first CM 300a (at time T45). Since the RoC device 301a is stopped, the I/O access controller 321b finds it not possible to reach the RoC device 301a.

The I/O access controller 321b operates similarly to the foregoing second embodiment when the peer RoC device 301a cannot be reached. Specifically, the I/O access controller 321b chooses and executes an appropriate process depending on the boot flag 332b in NVRAM 309b of the second CM 300b. If the boot flag 332b is one, the I/O access controller 321b stops the RoC device 301b in the second CM 300b (at time T46).

The RoC device 301b in the second CM 300b thus stops its operation at time T46. The restoration controller 322a in the first CM 300a detects that both RoC devices 301a and 301b have stopped, as illustrated in FIG. 22. The restoration controller 322b in the second CM 300b may also detect the event. In the former case, for example, the restoration controller 322a executes a dual CM restoration process to reboot both RoC devices 301a and 301b in restoration mode (at time T47). The restoration controller 322a makes its local RoC device 301a, as well as the RoC device 301b in the second CM 300b, reboot in restoration mode.

When both RoC devices 301a and 301b complete their respective reboot processes, the I/O access controllers 321a and 321b in the first and second CMs 300a and 300b successfully confirm their connection over communication path P1 (at time T48). Here the I/O access controllers 321a and 321b compares the configuration data update count 331a in NVRAM 309a of the first CM 300a with the configuration data update count 331b in NVRAM 309b of the second CM 300b, as in the foregoing second embodiment.

If the configuration data update count 331a of the first CM 300a is greater than the configuration data update count 331b of the second CM 300b, then the I/O access controllers 321a and 321b compare cache change counts stored in NVRAM 309a of the first CM 300a with those stored in NVRAM 309b of the second CM 300b. If the first cache change count 343a is greater than the second cache change count 344b, or if the second cache change count 344a is greater than the first cache change count 343b, or if both of those conditions are met, then the I/O access controllers 321a and 321b resume their access control in redundant operation mode after duplexing cache data as illustrated in FIG. 14. According to the present embodiment, the duplexing of cache data has only to operate on the cache areas whose cache change counts do not coincide.

Referring again to FIG. 21, when no changes are made to cache data in the first CM 300a during the period of T42 to T44, the cache change counts stored in the first CM 300a coincide with those stored in the second CM 300b at time T48. If the second cache change count 344b coincides with the first cache change count 343a, and if the first cache change count 343b coincides with the second cache change count 344a, the I/O access controllers 321a and 321b resume access control in redundant operation mode without duplexing cache data. This means that the two CMs 300a and 300b can resume their access control operations in a shorter time than in the second embodiment, in the case where no changes are made to cache data in the first CM 300a during the period of T42 to T44 in FIG. 21.

Figure 23:
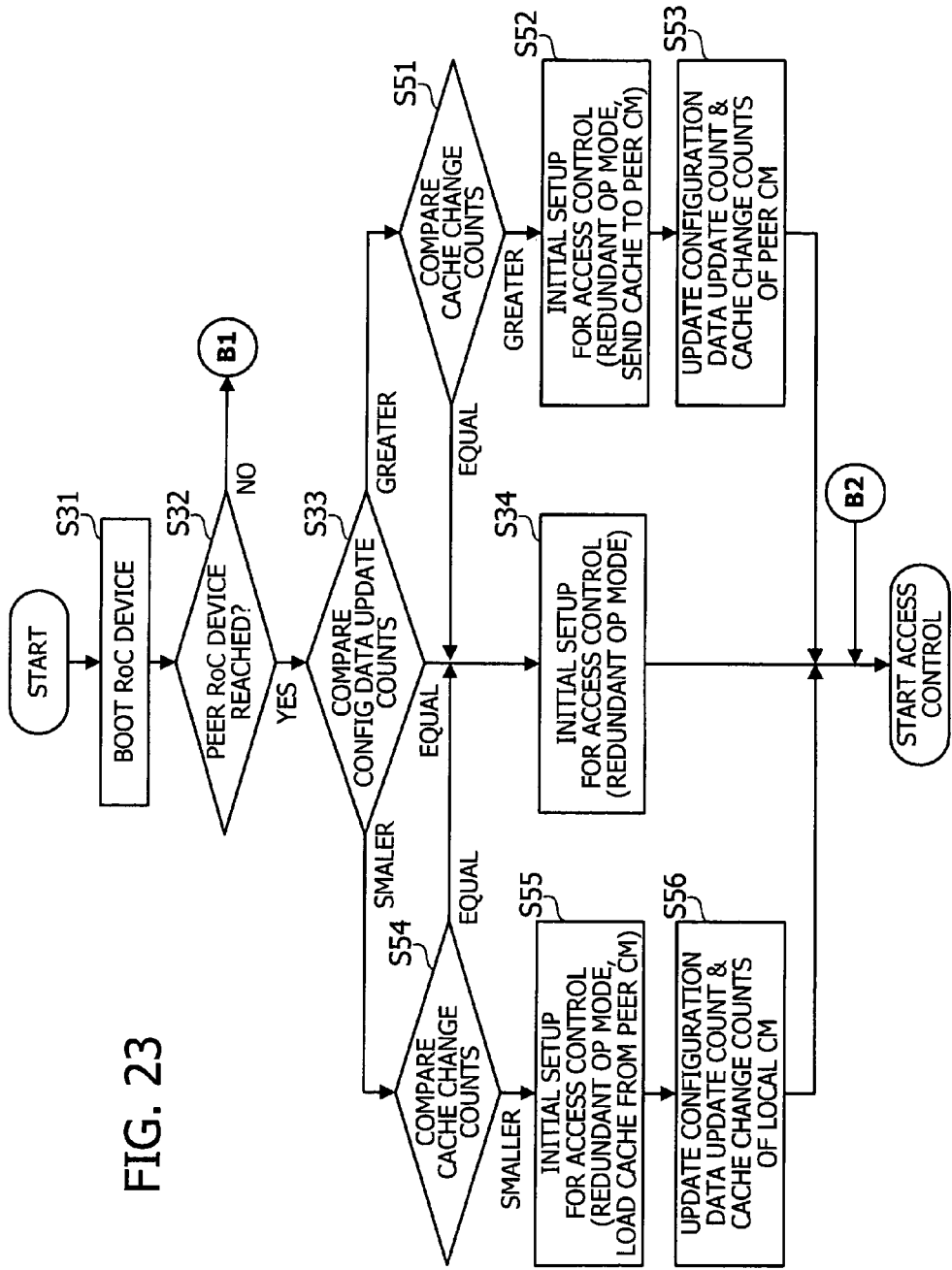
FIG. 23 is a flowchart illustrating what is executed when an RoC device starts up according to the third embodiment.

FIG. 23 is a flowchart illustrating what is executed when an RoC device starts up according to the third embodiment. The boot process of RoC devices in the third embodiment shares some steps with the process discussed in FIGS. 17 and 18 for the second embodiment, but is different from the following points. That is, steps S35 and S36 have been replaced with steps S51 to S53 in FIG. 23. Steps S37 and S38 have been replaced with steps S54 to S56 in FIG. 23. The following description of FIG. 23 will focus on these modified steps.

(Step S51) When the I/O access controller 321a in the first CM 300a can reach its peer RoC device 301b in the second CM 300b (Yes at step S32), and when the configuration data update count 331a of the first CM 300a is greater than the configuration data update count 331b of the second CM 300b (step S33), the I/O access controller 321a compares cache change counts stored in the first CM 300a with those stored in the second CM 300b.

Specifically, the I/O access controller 321a reads first and second cache change counts 343a and 344a out of the NVRAM 309a via the boot controller 324a. The I/O access controller 321a also interacts with its peer I/O access controller 321b in the second CM 300b to read first and second cache change counts 343b and 344b out of the NVRAM 309b in the second CM 300b. The I/O access controller 321a proceeds to step S52, if the first cache change count 343a is greater than the second cache change count 344b, or if the second cache change count 344a is greater than the first cache change count 343b, or if both of those conditions are met. The I/O access controller 321a proceeds to step S34, if the second cache change count 344b equals the first cache change count 343a, and if the first cache change count 343b equals the second cache change count 344a. At step S34, the I/O access controller 321a executes an initial setup process for access control, which does not include duplexing of cache data.

(Step S52) The I/O access controller 321a executes an initial setup process in preparation for access control in redundant operation mode. During the course of this initial setup process, the I/O access controller 321a updates cache data in the local cache area 341b and mirror cache area 342b of the second CM 300b with its own cache data stored in the mirror cache area 342a and local cache area 341a, respectively.

When the comparison at step S51 has revealed that the first cache change count 343a is greater than the second cache change count 344b, the I/O access controller 321a sends data from the local cache area 341a to the I/O access controller 321b in the second CM 300b and requests the I/O access controller 321b to update the mirror cache area 342b in the second CM 300b. In response, the I/O access controller 321b in the second CM 300b discards its cache data in the mirror cache area 342b and then stores the received cache data in the emptied mirror cache area 342b.

When the comparison at step S51 has revealed that the second cache change count 344a is greater than the first cache change count 343b, the I/O access controller 321a sends data from the mirror cache area 342a to the I/O access controller 321b in the second CM 300b and requests the I/O access controller 321b to update the local cache area 341b in the second CM 300b. In response, the I/O access controller 321b discards its cache data in the local cache area 341b and then stores the received cache data in the local cache area 341b.

(Step S53) During the course of the above initial setup process, the I/O access controller 321a requests the I/O access controller 321b in the second CM 300b to equalize its configuration data update count 331b to the configuration data update count 331a in the first CM 300a. In response, the I/O access controller 321b executes the request by, for example, incrementing the configuration data update count 331b in the NVRAM 309b.

The I/O access controller 321a further requests its peer I/O access controller 321b to update cache change counts in the second CM 300b. Specifically, when the comparison at step S51 has revealed that the first cache change count 343a is greater than the second cache change count 344b, the I/O access controller 321a sends that first cache change count 343a to its peer I/O access controller 321b in the second CM 300b, thus requesting update of the second cache change count 344b. In response, the I/O access controller 321b updates its second cache change count 344b with the received first cache change count 343a.

Similarly, when the comparison at step S51 has revealed that the second cache change count 344a is greater than the first cache change count 343b, the I/O access controller 321a sends that second cache change count 344a to its peer I/O access controller 321b in the second CM 300b, thus requesting update of the first cache change count 343b. In response, the I/O access controller 321b updates the first cache change count 343b with the received second cache change count 344a.

Upon completion of the above initial setup process, the I/O access controller 321a resumes access control operations in redundant operation mode. The above-described series of steps S31 to S33 and S51 to S53 may correspond to, for example, the foregoing process that the first CM 300a executes after it is rebooted at time T47 in FIG. 22 and finds that the RoC device 301b in the second CM 300b is reachable.

(Step S54) When the I/O access controller 321a in the first CM 300a can reach its peer RoC device 301b in the second CM 300b (Yes at step S32), and when the configuration data update count 331a of the first CM 300a is smaller than the configuration data update count 331b of the second CM 300b (step S33), the I/O access controller 321a compares cache change counts stored in the first CM 300a with those stored in the second CM 300b.

Specifically, the I/O access controller 321a reads first and second cache change counts 343a and 344a out of the NVRAM 309a via the boot controller 324a. The I/O access controller 321a also interacts with its peer I/O access controller 321b in the second CM 300b to read first and second cache change counts 343b and 344b out of the NVRAM 309b in the second CM 300b. The I/O access controller 321a proceeds to step S55, if the first cache change count 343a is smaller than the second cache change count 344b, or if the second cache change count 344a is smaller than the first cache change count 343b, or if both of those conditions are met.

The I/O access controller 321a, on the other hand, proceeds to step S34, if the second cache change count 344b equals the first cache change count 343a, and if the first cache change count 343b equals the second cache change count 344a. At step S34, the I/O access controller 321a executes an initial setup process for access control, which does not include duplexing of cache data.

(Step S55) The I/O access controller 321a executes an initial setup process in preparation for access control in redundant operation mode. During the course of this initial setup process, the I/O access controller 321a updates at least one of the local cache area 341a and mirror cache area 342a of the RAM 302a with cache data sent from the I/O access controller 321b in the second CM 300b.

Specifically, when the comparison at step S54 has revealed that the first cache change count 343a is smaller than the second cache change count 344b, the I/O access controller 321a discards its cache data in the local cache area 341a and then loads the emptied local cache area 341a with cache data of the mirror cache area 342b which is received from the peer I/O access controller 321b. Likewise, when the comparison at step S54 has revealed that the second cache change count 344a is smaller than the first cache change count 343b, the I/O access controller 321a discards its cache data in the mirror cache area 342a and then loads the emptied mirror cache area 342a with cache data of the local cache area 341b which is received from the peer I/O access controller 321b.

(Step S56) During the course of the above initial setup process, the I/O access controller 321a receives a request from its peer I/O access controller 321b in the second CM 300b for updating the configuration data update count 331a in the first CM 300a. In response, the I/O access controller 321a executes the request by, for example, incrementing the configuration data update count 331a in the NVRAM 309a so as to equalize it to the configuration data update count 331b.

The I/O access controller 321a further updates at least one of the first and second cache change counts 343a and 344a stored in the NVRAM 309a. Specifically, when the comparison at step S54 has revealed that the first cache change count 343a is smaller than the second cache change count 344b, the I/O access controller 321a updates the first cache change count 343a with the value of the second cache change count 344b received from its peer I/O access controller 321b in the second CM 300b. Likewise, when the comparison at step S54 has revealed that the second cache change count 344a is smaller than the first cache change count 343b, the I/O access controller 321a updates the second cache change count 344a with the value of the first cache change count 343b received from its peer I/O access controller 321b in the second CM 300b.

Upon completion of the above initial setup process, the I/O access controller 321a resumes access control operations in redundant operation mode. The above-described series of steps S31 to S33 and S54 to S56 may correspond to, for example, the foregoing process that the second CM 300b executes after it reboots at time T47 in FIG. 22 and finds that the RoC device 301a in the first CM 300a is reachable.

(d) Fourth Embodiment

The third embodiment described above relies on configuration data update counts in addition to cache change counts to determine what to do before starting access control operations. By contrast, according to the fourth embodiment described below, the I/O access controller in a booted CM determines the same by consulting cache change counts, but not configuration data update counts.

Figure 24:
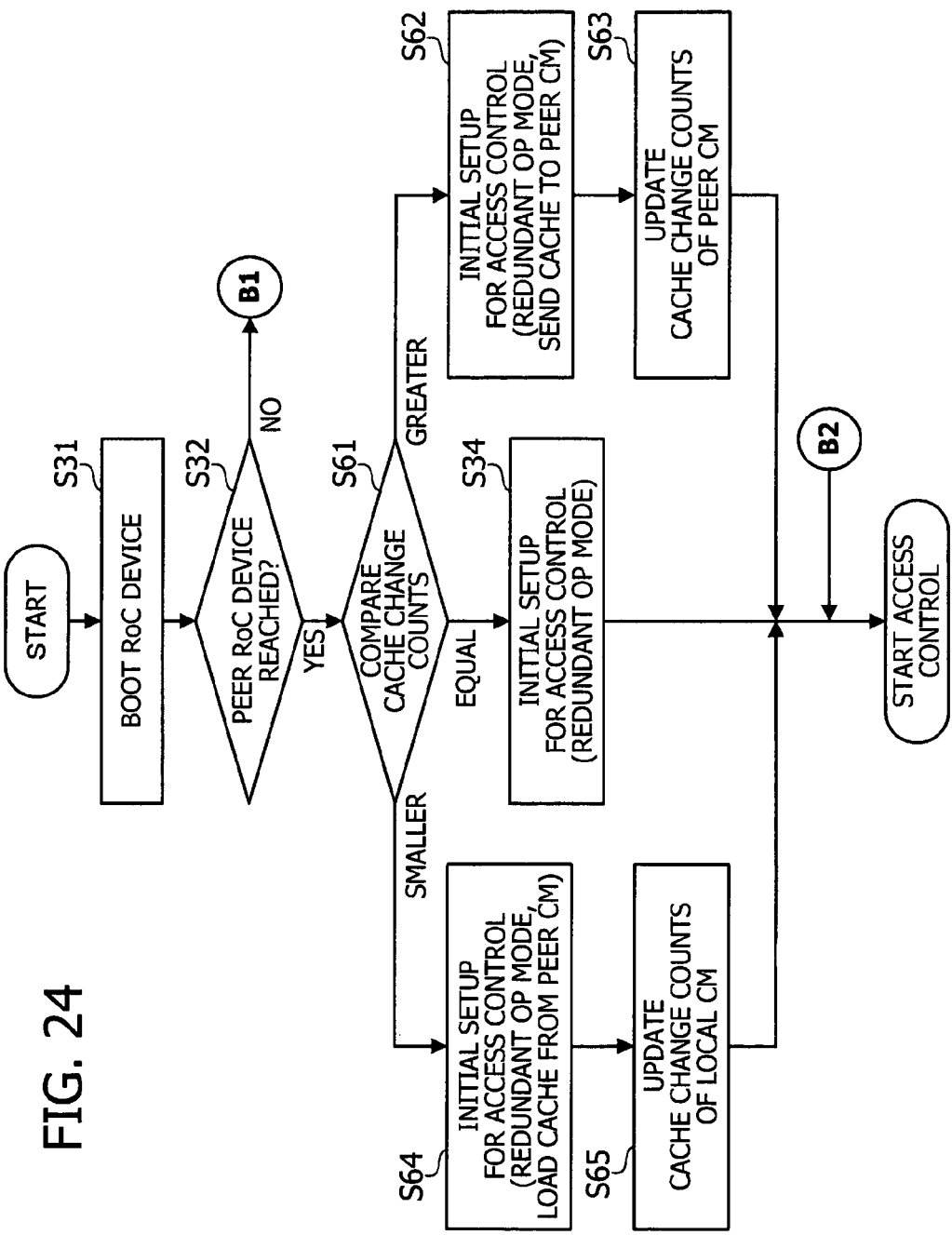
FIG. 24 is a flowchart illustrating what is executed when an RoC device starts up according to a fourth embodiment.

FIG. 24 is a flowchart illustrating what is executed when an RoC device starts up according to the fourth embodiment. The present embodiment executes, when an RoC device boots up, a process similar to that of FIGS. 17 and 18, except that steps S33, S35, S36, S37, and S38 are respectively replaced with steps S61, S62, S63, S64, and S65 as seen in FIG. 24. The following description of FIG. 24 will focus on these modified steps.

(Step S61) When the I/O access controller 321a in the first CM 300a can reach its peer RoC device 301b in the second CM 300b (Yes at step S32), the I/O access controller 321a compares cache change counts stored in the first CM 300a with those stored in the second CM 300b.

Specifically, the I/O access controller 321a reads first and second cache change counts 343a and 344a out of the NVRAM 309a via the boot controller 324a. The I/O access controller 321a also interacts with its peer I/O access controller 321b in the second CM 300b to read first and second cache change counts 343b and 344b out of the NVRAM 309b in the second CM 300b. The I/O access controller 321a proceeds to step S62 if the first cache change count 343a is greater than the second cache change count 344b, or if the second cache change count 344a is greater than the first cache change count 343b, or if both of those conditions are met. The I/O access controller 321a proceeds to step S64 if the first cache change count 343a is smaller than the second cache change count 344b, or if the second cache change count 344a is smaller than the first cache change count 343b, or if both of those conditions are met.

The I/O access controller 321a, on the other hand, proceeds to step S34, if the second cache change count 344b equals the first cache change count 343a, and if the first cache change count 343b equals the second cache change count 344a. At step S34, the I/O access controller 321a executes an initial setup process for access control, without duplexing cache data.

(Step S62) The I/O access controller 321a executes an initial setup process in preparation for access control in redundant operation mode. During the course of this initial setup process, the I/O access controller 321a updates cache data in the local cache area 341b and mirror cache area 342b of the second CM 300b with its own cache data stored in the mirror cache area 342a and local cache area 341a, respectively.

Specifically, when the comparison at step S61 has revealed that the first cache change count 343a is greater than the second cache change count 344b, the I/O access controller 321a sends data from the local cache area 341a to the I/O access controller 321b in the second CM 300b and requests the I/O access controller 321b to update the mirror cache area 342b in the second CM 300b. In response, the I/O access controller 321b in the second CM 300b discards its cache data in the mirror cache area 342b and then stores the received cache data in the emptied mirror cache area 342b.

When the comparison at step S61 has revealed that the second cache change count 344a is greater than the first cache change count 343b, the I/O access controller 321a sends data from the mirror cache area 342a to the I/O access controller 321b in the second CM 300b and requests the I/O access controller 321b to update the local cache area 341b in the second CM 300b. In response, the I/O access controller 321b discards its cache data in the local cache area 341b and then stores the received cache data in the emptied local cache area 341b.

(Step S63) During the course of the above initial setup process, the I/O access controller 321a requests the I/O access controller 321b in the second CM 300b to update its cache change counts. Specifically, when the comparison at step S61 has revealed that the first cache change count 343a is greater than the second cache change count 344b, the I/O access controller 321a sends that first cache change count 343a to its peer I/O access controller 321b in the second CM 300b, thus requesting update of the second cache change count 344b. In response, the I/O access controller 321b updates its second cache change count 344b with the received first cache change count 343a.

When the comparison at step S61 has revealed that the second cache change count 344a is greater than the first cache change count 343b, the I/O access controller 321a sends that second cache change count 344a to its peer I/O access controller 321b in the second CM 300b, thus requesting update of the first cache change count 343b. In response, the I/O access controller 321b updates the first cache change count 343b with the received second cache change count 344a.

Upon completion of the above initial setup process, the I/O access controller 321a resumes access control operations in redundant operation mode.

(Step S64) The I/O access controller 321a executes an initial setup process in preparation for access control in redundant operation mode. During the course of this initial setup process, the I/O access controller 321a updates at least one of the local cache area 341a and mirror cache area 342a of the RAM 302a with cache data sent from the I/O access controller 321b in the second CM 300b.

Specifically, when the comparison at step S61 has revealed that the first cache change count 343a is smaller than the second cache change count 344b, the I/O access controller 321a discards its cache data in the local cache area 341a and then loads the emptied local cache area 341a with cache data of the mirror cache area 342b which is received from to the peer I/O access controller 321b. Likewise, when the comparison at step S61 has revealed that the second cache change count 344a is smaller than the first cache change count 343b, the I/O access controller 321a discards its cache data in the mirror cache area 342a and then loads the emptied mirror cache area 342a with cache data of the local cache area 341b which is received from to the peer I/O access controller 321b.

(Step S65) The I/O access controller 321a further updates at least one of the first and second cache change counts 343a and 344a stored in the NVRAM 309a. Specifically, when the comparison at step S61 has revealed that the first cache change count 343a is smaller than the second cache change count 344b, the I/O access controller 321a updates the first cache change count 343a with the value of the second cache change count 344b received from its peer I/O access controller 321b in the second CM 300b. Likewise, when the comparison at step S61 has revealed that the second cache change count 344a is smaller than the first cache change count 343b, the I/O access controller 321a updates the second cache change count 344a with the value of the first cache change count 343b received from its peer I/O access controller 321b in the second CM 300b.

Upon completion of the above initial setup process, the I/O access controller 321a resumes access control operations in redundant operation mode.

According to the fourth embodiment described above, the I/O access controller in a booted CM determines what to do to start access control operations by consulting cache change counts, but not configuration data update counts. The procedure of the fourth embodiment is less complicated and thus more efficient than the third embodiment.

(e) Fifth Embodiment

The foregoing third and fourth embodiments select a necessary procedure for starting access control operations, depending on cache change counts. By contrast, the fourth embodiment described below uses cache change flags, instead of cache change counts, to determine the same. Cache change flags indicate whether cache data has been changed in solitary operation mode.

Figure 25:
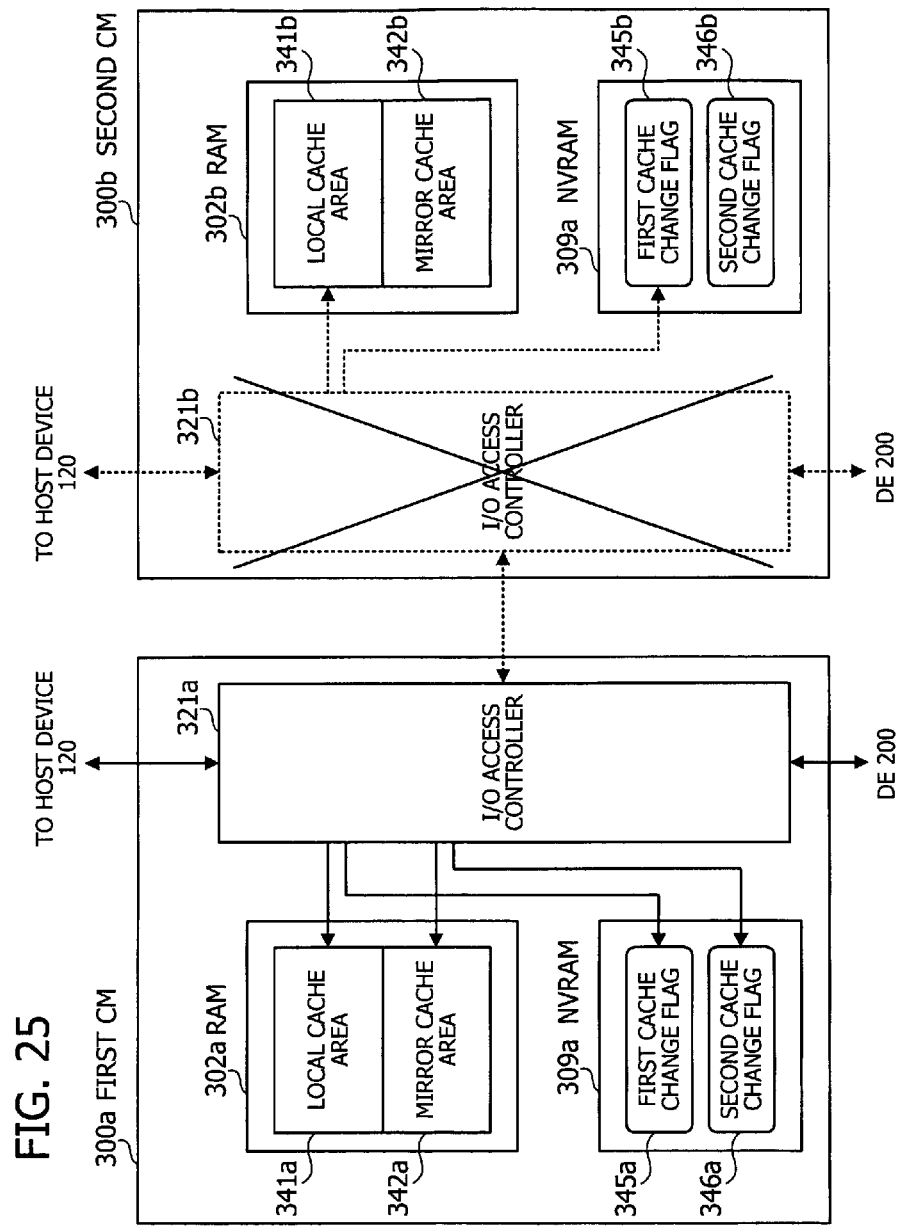
FIG. 25 illustrates how cache change flags are manipulated.

FIG. 25 illustrates how cache change flags are manipulated. Specifically, first and second cache change flags 345a and 346a are stored in the NVRAM 309a of the first CM 300a. The first cache change flag 345a indicates whether data in the local cache area 341a has been changed during a period when the I/O access controller 321a in the first CM 300a controls access in solitary operation mode. The second cache change flag 346a, on the other hand, indicates whether data in the mirror cache area 342a has been changed during that same period. Both cache change flags 345a and 346a are given an initial value of zero.

Stored in the NVRAM 309b of the second CM 300b is another set of first and second cache change flags 345b and 346b. The first cache change flag 345b indicates whether data in the local cache area 341b has been changed during a period when the I/O access controller 321b in the second CM 300b controls access in solitary operation mode. The second cache change flag 346b indicates whether data in the mirror cache area 342b has been changed during that same period. Both cache change flags 345b and 346b are given an initial value of zero.

Figure 26:
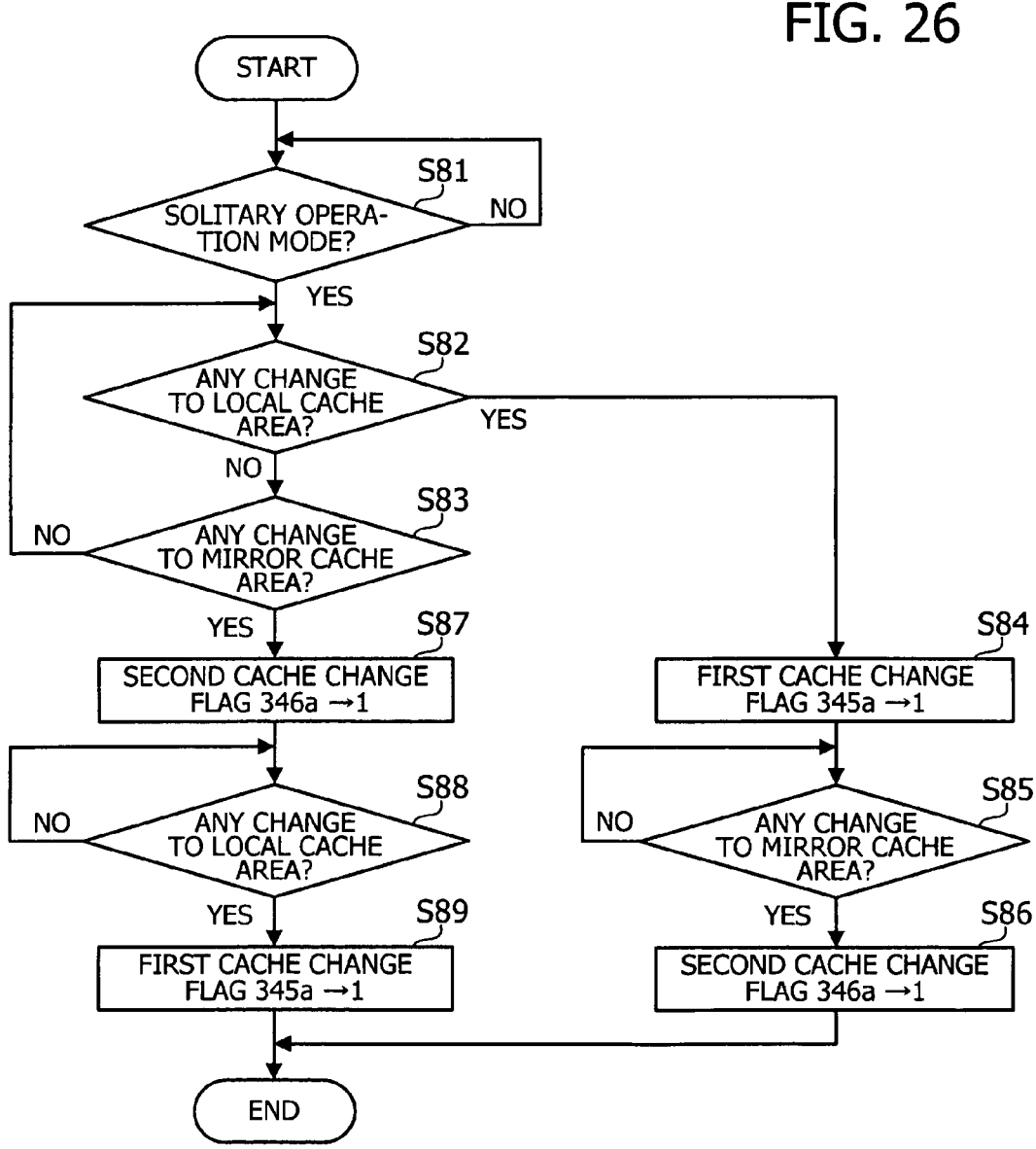
FIG. 26 is a flowchart of a process of setting cache change flags.

FIG. 26 is a flowchart illustrating a process of setting cache change flags. While this example of FIG. 26 assumes that the I/O access controller 321a in the first CM 300a executes the illustrated process, its peer I/O access controller 321b in the second CM 300b can also execute the process similarly.

(Step S81) In the initial state in FIG. 26, the first and second cache change flags 345a and 346a in the first CM 300a are both zero. The I/O access controller 321a proceeds to step S82 when it starts access control operations in solitary operation mode (Yes at step S81). More specifically, the I/O access controller 321a starts access control operations in solitary operation mode when it detects that the RoC device 301b in the second CM 300b has stopped (e.g., T22 in FIGS. 13 and T42 in FIG. 21).

(Step S82) The I/O access controller 321a determines, at regular intervals, whether any change has been made to the local cache area 341a by, for example, a write request to volume Vol#0. If it is determined that there has been a change to the local cache area 341a (Yes at step S82), the I/O access controller 321a proceeds to step S84. Otherwise (No at step S82), the I/O access controller 321a proceeds to step S83.

(Step S83) The I/O access controller 321a also determines, at regular intervals, whether any change has been made to the mirror cache area 342a by, for example, a write request to volume Vol#1. If it is determined that there has been a change in the mirror cache area 342a (Yes at step S83), the I/O access controller 321a proceeds to step S87. Otherwise (No at step S83), the I/O access controller 321a returns to step S82.

(Step S84) Now that a change to the local cache area 341a has been found at step S82, the I/O access controller 321a alters the first cache change flag 345a in NVRAM 309a from zero to one.

(Step S85) The I/O access controller 321a watches whether any change has been made to the mirror cache area 342a by, for example, a write request to volume Vol#1. If there has been a change to the mirror cache area 342a (Yes at step S85), the I/O access controller 321a proceeds to step S86.

(Step S86) The I/O access controller 321a alters the second cache change flag 346a in NVRAM 309a from zero to one.

(Step S87) Now that a change to the mirror cache area 342a has been found at step S83, the I/O access controller 321a alters the second cache change flag 346a in NVRAM 309a from zero to one.

(Step S88) The I/O access controller 321a watches whether any change has been made to the local cache area 341a by, for example, a write request to volume Vol#0. If there has been a change to the local cache area 341a (Yes at step S88), the I/O access controller 321a proceeds to step S89.

(Step S89) The I/O access controller 321a alters the first cache change flag 345a in NVRAM 309a from zero to one.

As can be seen from the above steps of FIG. 26, the first cache change flag 345a is set to one at the first change to the local cache area 341a after startup of the I/O access controller 321a in solitary operation mode. Similarly, the second cache change flag 346a is set to one at the first change to the mirror cache area 342a after startup of the I/O access controller 321a in solitary operation mode.

Figure 27:
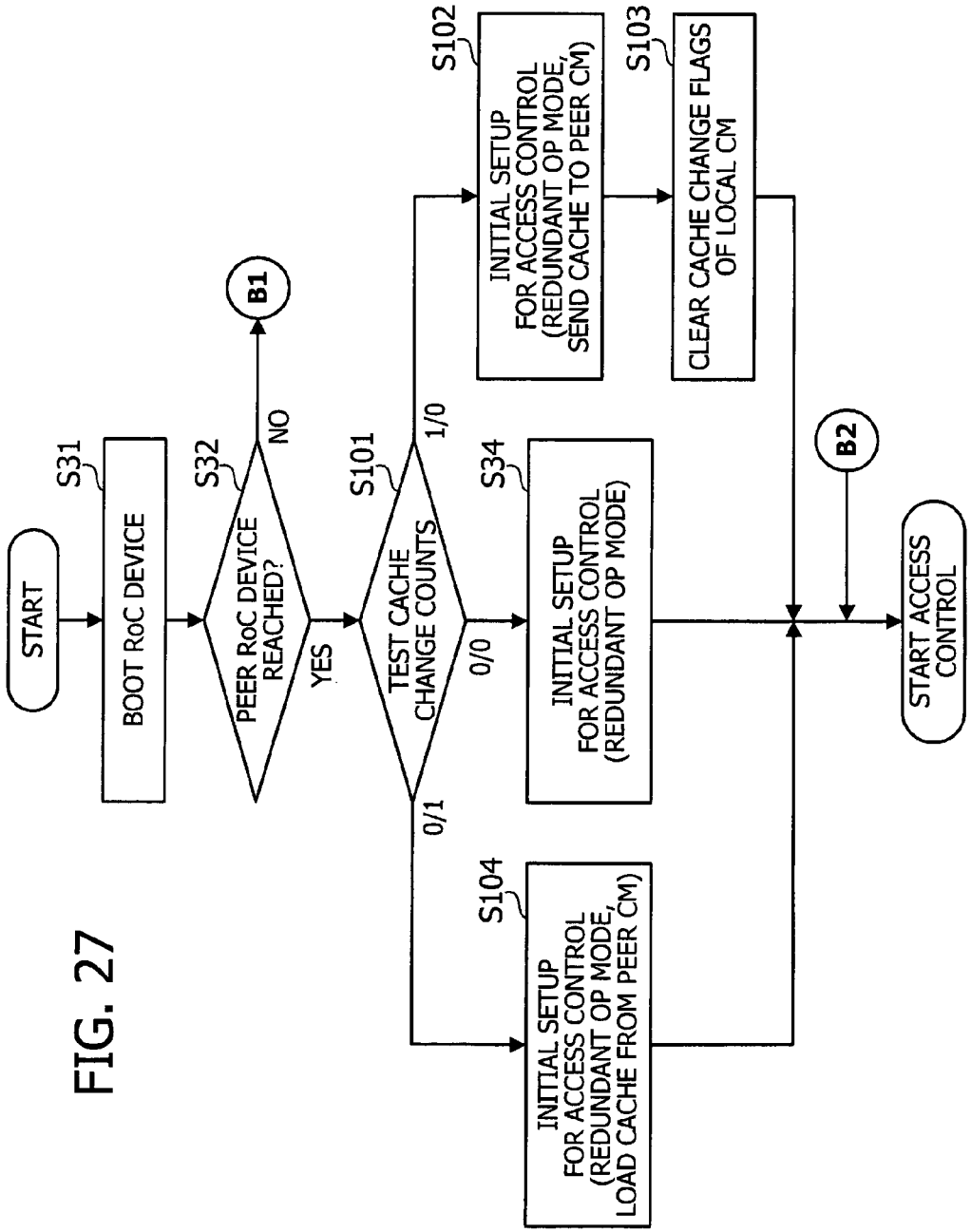
FIG. 27 is a flowchart illustrating what is executed when an RoC device starts up according to a fifth embodiment.

FIG. 27 is a flowchart illustrating what is executed when an RoC device starts up according to the fifth embodiment. The present embodiment executes, when an RoC device boots up, a process similar to that of FIG. 24, except that steps S61, S62, and S63 are respectively replaced with steps S101, S102, and S103 as seen in FIG. 27. The following description of FIG. 27 will focus on those modified steps.

(Step S101) When the I/O access controller 321a in the first CM 300a can reach its peer RoC device 301b in the second CM 300b (Yes at step S32), the I/O access controller 321a tests the values of cache change flags stored in the first CM 300a and those stored in the second CM 300b.

Specifically, the I/O access controller 321a reads first and second cache change flags 345a and 346a out of the NVRAM 309a via the boot controller 324a. The I/O access controller 321a also interacts with its peer I/O access controller 321b in the second CM 300b to read first and second cache change flags 345b and 346b out of the NVRAM 309b in the second CM 300b. The I/O access controller 321a proceeds to step S102 if both cache change flags 345b and 346b of the second CM 300b are zero, and if at least one of the first and second cache change flags 345a and 346a of the first CM 300a is one. The I/O access controller 321a proceeds to step S104 if both cache change flags 345a and 346a of the first CM 300a are zero, and if at least one of the first and second cache change flags 345b and 346b of the second CM 300b is one. The I/O access controller 321a proceeds to step S34 if all the four cache change flags 345a, 345b, 346a, and 346b are zero. At step S34, the I/O access controller 321a executes an initial setup process for access control, without duplexing cache data.

(Step S102) The I/O access controller 321a executes an initial setup process in preparation for access control in redundant operation mode. During the course of this initial setup process, the I/O access controller 321a updates cache data in the local cache area 341b and mirror cache area 342b of the second CM 300b with its own cache data stored in the mirror cache area 342a and local cache area 341a, respectively.

Specifically, when the test at step S101 has revealed that the first cache change flag 345a is one, the I/O access controller 321a sends data from the local cache area 341a to the I/O access controller 321b in the second CM 300b and requests the I/O access controller 321b to update the mirror cache area 342b in the second CM 300b. In response, the I/O access controller 321b in the second CM 300b discards its cache data in the mirror cache area 342b and then stores the received cache data in the emptied mirror cache area 342b.

When the test at step S101 has revealed that the second cache change flag 346a is one, the I/O access controller 321a sends data from the mirror cache area 342a to the I/O access controller 321b in the second CM 300b and requests the I/O access controller 321b to update the local cache area 341b in the second CM 300b. In response, the I/O access controller 321b discards its cache data in the local cache area 341b and then stores the received cache data in the emptied local cache area 341b.

(Step S103) During the course of the above initial setup process, the I/O access controller 321a clears the cache change flag(s) of the first CM 300a to zero if it or they were one at step S101. Upon completion of the above initial setup process, the I/O access controller 321a resumes access control operations in redundant operation mode.

(Step S104) The I/O access controller 321a executes an initial setup process in preparation for access control in redundant operation mode. During the course of this initial setup process, the I/O access controller 321a updates at least one of the local cache area 341a and mirror cache area 342a of the RAM 302a with cache data sent from the I/O access controller 321b in the second CM 300b.

Specifically, when the test at step S101 has revealed that the second cache change flag 346b is one, the I/O access controller 321a discards its cache data in the local cache area 341a and then loads the emptied local cache area 341a with cache data of the mirror cache area 342b which is received from to the peer I/O access controller 321b. When the test at step S101 has revealed that the first cache change flag 345b is one, the I/O access controller 321a discards its cache data in the mirror cache area 342a and then loads the emptied mirror cache area 342a with cache data of the local cache area 341b which is received from to the peer I/O access controller 321b. Upon completion of the above initial setup process, the I/O access controller 321a resumes access control operations in redundant operation mode.

As can be seen from the above description, the fifth embodiment relies on the cache change flags when the I/O access controller in a booted CM determines what to do to start access control operations. Each cache change flag only consumes a one-bit memory space to achieve the purpose of determining a procedure necessary for starting access control operations. Thus the fifth embodiment is more space-efficient than the fourth embodiment. Also it is obvious that the cache change flags are set or cleared less frequently than the cache change counts are incremented in the fourth embodiment. This is advantageous in terms of the total processing efficiency of CMs because changing cache change flags would impose little impact on the control operations even if those flags are located in a non-volatile memory device with a relatively slow access speed such as NVRAM.

(f) Sixth Embodiment

As discussed in the second embodiment, the RoC device 301a in the first CM 300a may stop for some reason when its peer RoC device 301b in the second CM 300b is in the process of rebooting after abort in redundant operation mode. In such a situation, the foregoing second embodiment initiates a dual CM restoration process of two RoC devices 301a and 301b by forcibly stopping the RoC device 301b. By contrast, the sixth embodiment described below is to cause the RoC device 301b in the second CM 300b to make the stopped RoC device 301a reboot in restoration mode, instead of initiating a dual CM restoration process.

Figure 28:
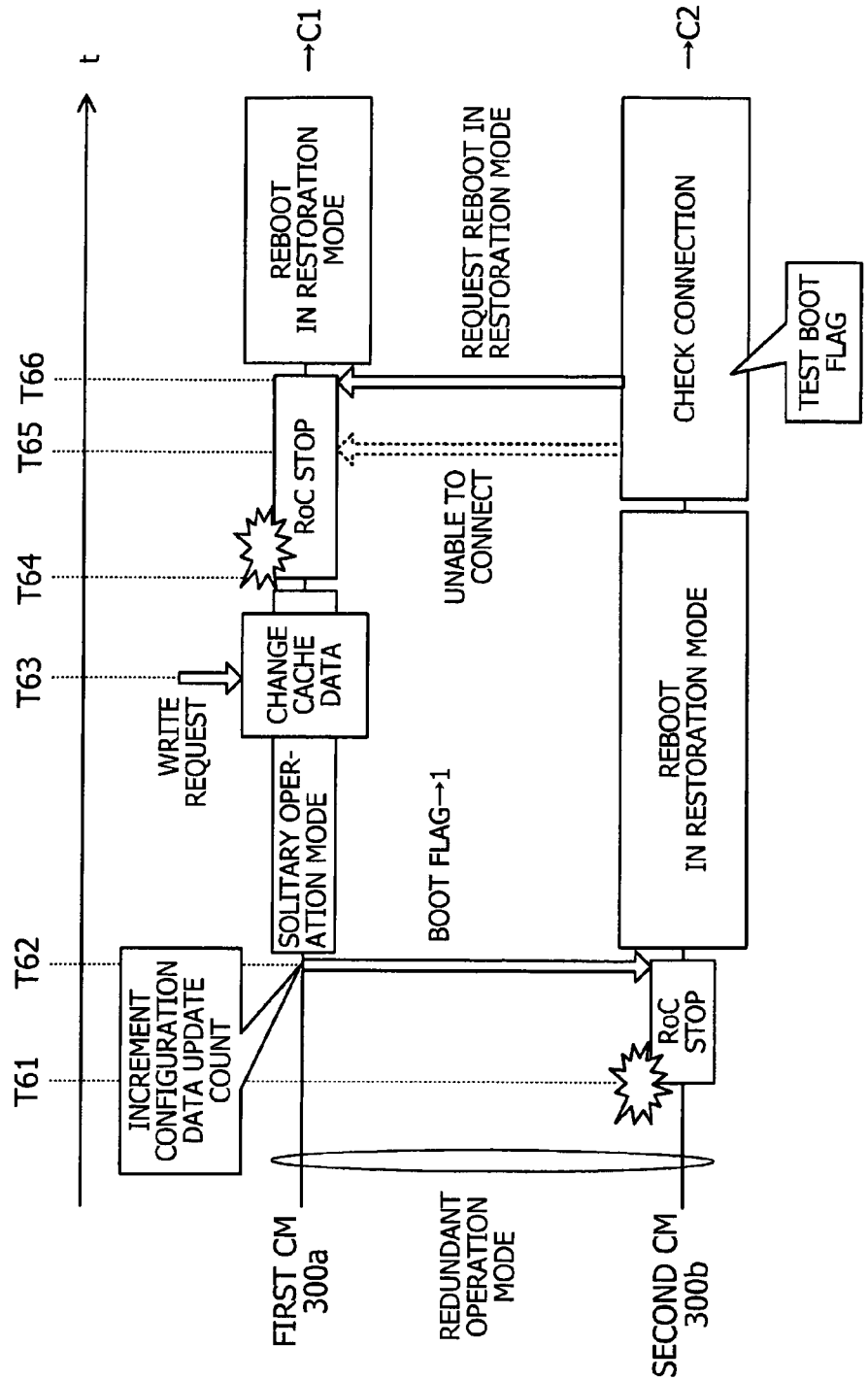
FIG. 28 is a first part of a timing diagram illustrating how a sixth embodiment works when two RoC devices stop successively with a certain interval.
Figure 29:
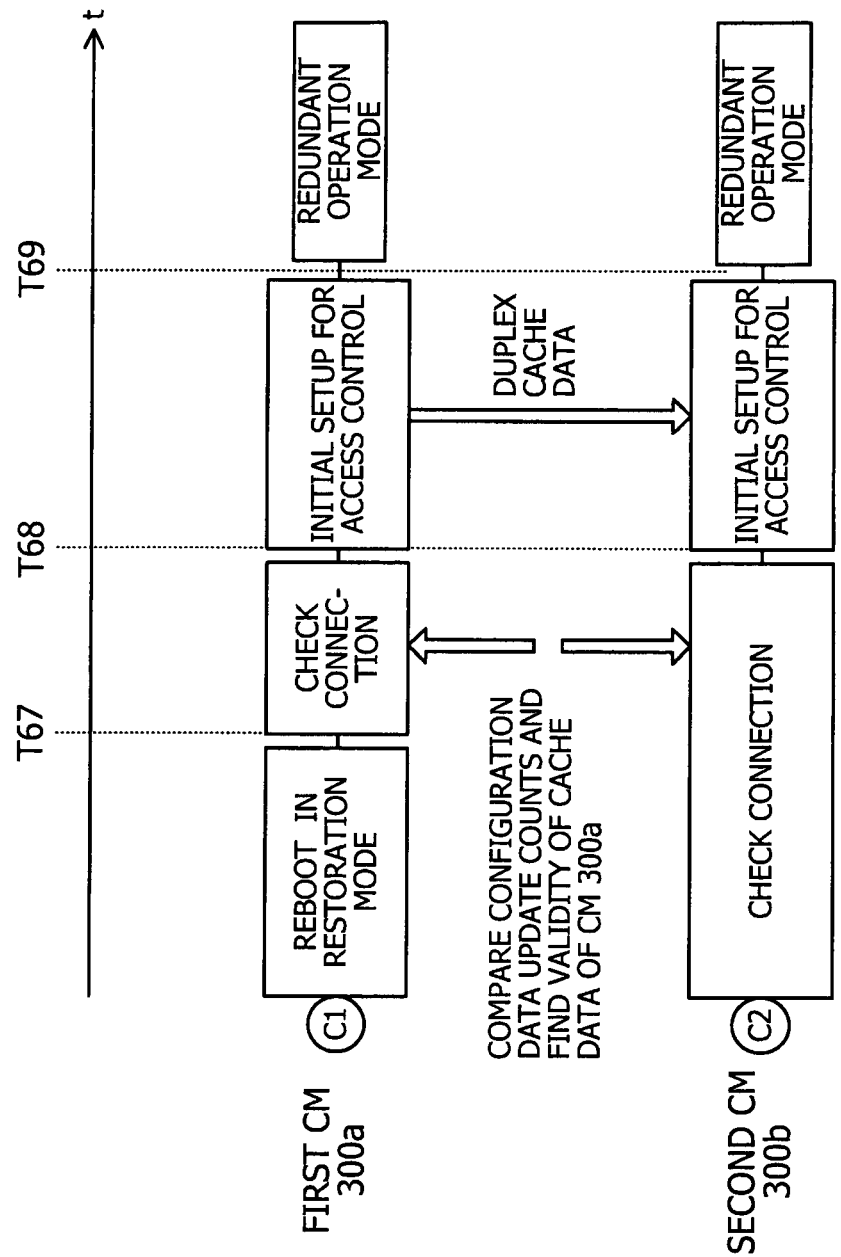
FIG. 29 is a second part of the timing diagram illustrating how the sixth embodiment works when two RoC devices stop successively with a certain interval.

FIGS. 28 and 29 give a timing diagram illustrating how the sixth embodiment works when two RoC devices stop successively with a certain interval.

Specifically, this example assumes that the RoC device 301b in the second CM 300b stops first, and then the RoC device 301a in the first CM 300a follows.

Referring to the initial state seen in FIG. 28, the RoC device 301a in the first CM 300a is working together with the RoC device 301b in the second CM 300b in redundant operation mode. The latter RoC device 301b then stops working due to some anomalies (at time T61), and this event is detected by the I/O access controller 321a in the first CM 300a (at time T62). Upon detection, the I/O access controller 321a makes the RoC device 301b in the second CM 300b reboot in restoration mode. The I/O access controller 321a also causes the second CM 300b to change its boot flag 332b in the NVRAM 309b from zero to one, as well as incrementing its configuration data update count 331a stored in the NVRAM 309a of the first CM 300a.

In response to the above request from the I/O access controller 321a in the first CM 300a, the RoC device 301b in the second CM 300b starts rebooting in restoration mode. During this reboot process, the RAM 302b in the second CM 300b is allowed to retain the current data in its local cache area 341b and mirror cache area 342b.

In the first CM 300a, on the other hand, the I/O access controller 321a makes its way to solitary operation mode, in which the I/O access controller 321a uses the local cache area 341a and mirror cache area 342a to continue access control operations for both volumes Vol#0 and Vol#1. The I/O access controller 321a now receives and executes a write request from a host device 120 to volume Vol#0 or volume Vol#1 and changes its cache data in the RAM 302a accordingly (at time T63).

Suppose here that the RoC device 301a in the first CM 300a stops due to some anomalies (at time T64) before the RoC device 301b in the second CM 300b finishes its reboot. When the RoC device 301b in the second CM 300b reboots completely, the I/O access controller 321b checks its connection with the RoC device 301a in the first CM 300a (at time T65). Since the RoC device 301a is stopped, the I/O access controller 321b finds it not possible to reach the RoC device 301a.

Since the peer RoC device 301a cannot be reached, the I/O access controller 321b chooses and executes an appropriate process depending on the boot flag 332b, which is stored in the NVRAM 309b of the second CM 300b. Specifically, the I/O access controller 321b causes the RoC device 301a in the first CM 300a to reboot in restoration mode (at time T66) when the boot flag 332b is one. The I/O access controller 321b then waits for its peer I/O access controller 321a in the first CM 300a to become reachable. When The RoC device 301a in the first CM 300a is completely rebooted as requested by its peer the RoC device 301b in the second CM 300b, the two I/O access controllers 321a and 321b successfully confirm their connection over communication path P1 (at time T67). Here the I/O access controllers 321a and 321b compare the configuration data update count 331a in NVRAM 309a of the first CM 300a with the configuration data update count 331b in NVRAM 309b of the second CM 300b.

Because the configuration data update count 331a of the first CM 300a is greater than the configuration data update count 331b of the second CM 300b, the I/O access controllers 321a and 321b confirm the validity (up-to-dateness) of cache data stored in the first CM 300a and execute an initial setup process in preparation for access control in redundant operation mode (at time T68). The configuration data update count 331b in the second CM 300b is incremented at the start of this initial setup process, which renders the two configuration data update counts 331a and 331b in a synchronized state.

During the course of the initial setup process started at time T68, the I/O access controllers 321a and 321b execute a task of duplexing cache data held in the first CM 300a. More specifically, the I/O access controller 321a sends data from its own local cache area 341a and mirror cache area 342a in the RAM 302a to the peer I/O access controller 321b in the second CM 300b. The I/O access controller 321b discards data in its local cache area 341b and mirror cache area 342b of the RAM 302b, and loads the emptied mirror cache area 342b with new data sent from the local cache area 341a, as well as the emptied local cache area 341b with new data sent from the mirror cache area 342a. The I/O access controllers 321a and 321b start, upon completion of their respective initial setup processes, access control operations in redundant operation mode (at time T69).

As can be seen from the above operation, the I/O access controller 321b in the second CM 300b cannot establish a connection with its peer RoC device 301a in the first CM 300a at time T65, and finds that its own boot flag 332b has been set to one. In this case, the I/O access controller 321b makes the RoC device 301a in the first CM 300a reboot in restoration mode, instead of initiating a dual CM restoration process. This processing enables the I/O access controllers 321a and 321b to resume access control operations in a shorter time than in the second embodiment.

Figure 30:
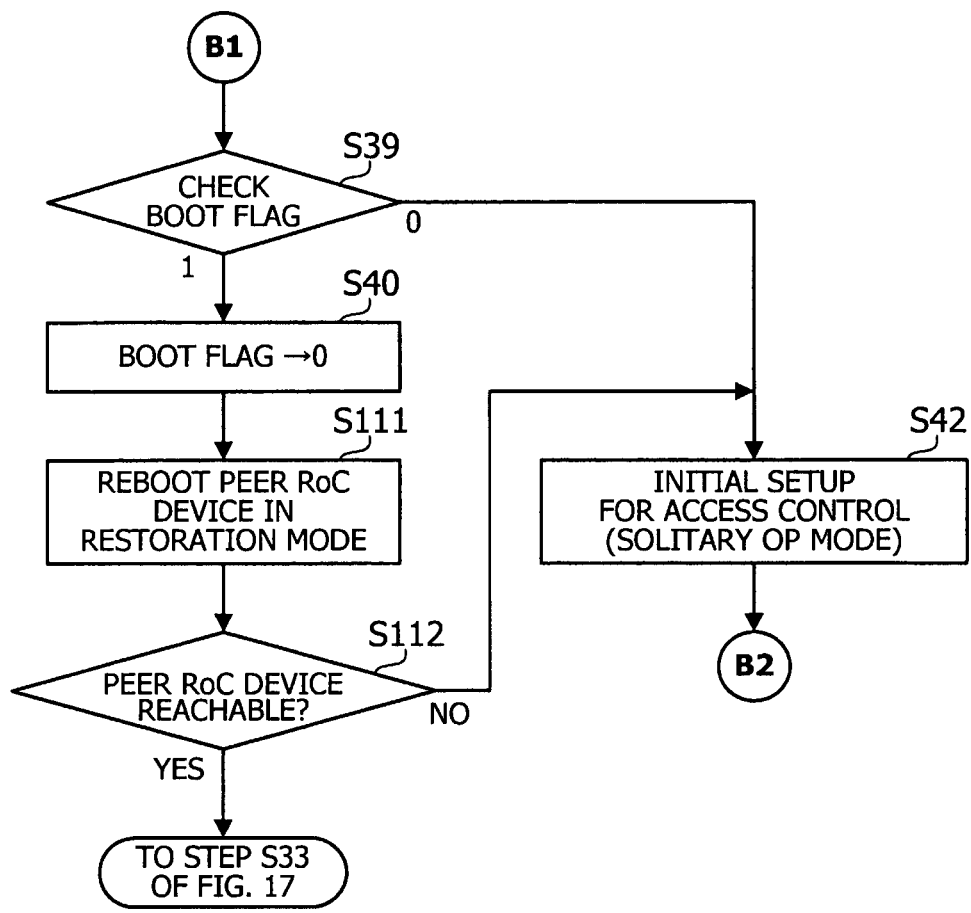
FIG. 30 is a flowchart illustrating what is executed when an RoC device starts up according to the sixth embodiment.

FIG. 30 is a flowchart illustrating what is executed when an RoC device starts up according to the sixth embodiment. The present embodiment executes, when an RoC device boots up, a process similar to that of FIGS. 17 and 18, except that step S41 is replaced with steps S111 and S112 as seen in FIG. 30. The following description of FIG. 24 will focus on those modified steps.

(Step S111) When the rebooted RoC device 301b in the second CM 300b is not reachable (Yes at step S32), and when the boot flag 332a of the first CM 300a has been set to one (step S39), the I/O access controller 321a first clears the boot flag 332a to zero (step S40) and then requests, through the boot controller 324a, the RoC device 301b in the second CM 300b to reboot in restoration mode. Steps S40 and S111 may, however, be executed in the opposite order.

(Step S112) The I/O access controller 321a watches for a predetermined time after step S111 whether the rebooted RoC device 301b in the second CM 300b can be reached. The duration of this watching may be equal to or somewhat longer than the time that the RoC device 301b requires to become reachable from the peer RoC device 301a after it is rebooted in restoration mode.

The I/O access controller 321a proceeds to step S33 of FIG. 17 to continue its operation from that point, if the RoC device 301b in the second CM 300b has become reachable within the predetermined period since the start of step S111. The series of steps S40, S111, S112, and S33 may correspond to, for example, the foregoing process after time T65 of FIG. 28.

The I/O access controller 321a, on the other hand, proceeds to step S42 if the RoC device 301b in the second CM 300b fails to recover its connectivity (i.e., if the RoC device 301b does not reboot properly) in the predetermined period since the start of step S111. This path from step S112 to step S42 may correspond to, for example, the foregoing process executed in the case where the I/O access controller 321b in the second CM 300b cannot reach the RoC device 301a in the first CM 300a at time T67 in FIG. 29. In this case, the I/O access controller 321b starts access control operations for both volumes Vol#0 and Vol#1 in solitary operation mode.

The above-described processing of FIG. 30 is a variation of the second embodiment. More particularly, it is another version of step S41 of FIG. 18. This variation is, however, not limited to the second embodiment, but may also be applied to any of the foregoing third, fourth, and fifth embodiments. More specifically, the I/O access controller 321a may proceed from step S112 of FIG. 30 to step S33 of FIG. 23, or step S61 of FIG. 24, or step S101 of FIG. 27, instead of going to step S33 of FIG. 17, when the RoC device 301b in the second CM 300b becomes reachable in the predetermined period.

Various embodiments of the proposed storage system, control apparatus, and control method have been described above. The described techniques prevent redundancy-protected control devices in a storage system from losing their cache data even when both of them are stopped successively.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A storage system comprising:
a storage apparatus to store data;
first and second control apparatuses each including:
a cache memory to cache the data in the storage apparatus,
an access controller to make access to the storage apparatus by using the cache data in the cache memory in response to an access request from a host device, while managing the respective cache memories of the first and second control apparatuses such that each other's cache data is mirrored therein;
a first reboot controller, disposed in the first control apparatus, which causes, upon detection that the access controller in the second control apparatus is stopped, the second control apparatus to reboot and places a boot event record in a non-volatile storage device of the second control apparatus to indicate that the rebooting of the second control apparatus has been caused by the first reboot controller; and
a second reboot controller, disposed in the second control apparatus, which causes the first control apparatus to reboot while keeping intact the cache data stored in the cache memory of the first control apparatus, when the access controller of the first control apparatus is stopped while the second control apparatus is rebooted, and when the non-volatile storage device of the second control apparatus stores the boot event record indicating that the rebooting of the second control apparatus has been caused by the first reboot controller.

2. The storage system according to claim 1, wherein:
the first reboot controller, when rebooting the second control apparatus, stores cache state information in the non-volatile storage device of the first control apparatus to indicate that the cache memory of the first control apparatus contains the latest cache data; and
the access controller of the first control apparatus, when rebooted, causes cache data in the cache memory of the second control apparatus to be equalized to cache data in the cache memory of the first control apparatus, when the non-volatile storage unit of the first control apparatus contains the cache state information indicating that the latest cache data is stored in the cache memory of the first control apparatus.

3. The storage system according to claim 1, wherein:
the first reboot controller, when rebooting the second control apparatus, stores cache state information in the non-volatile storage device of the first control apparatus to indicate that the cache memory of the first control apparatus contains the latest cache data; and
the access controller of the first control apparatus, when rebooted, resumes access to the storage apparatus by using the cache data stored in the cache memory of the first control apparatus when the non-volatile storage unit of the first control apparatus contains the cache state information indicating that the latest cache data is stored in the cache memory of the first control apparatus.

4. The storage system according to claim 1, wherein:
the first reboot controller causes the second control apparatus to reboot while keeping intact the cache data stored in the cache memory of the second control apparatus, upon detection that the access controller in the second control apparatus is stopped;
the first reboot controller stores cache state information in the non-volatile storage unit of the first control apparatus to indicate that the latest cache data is stored in the cache memory of the first control apparatus, when data stored in the cache memory of the first control apparatus is changed after the rebooting of the second control apparatus; and
the access controller of the first control apparatus, when rebooted, causes cache data in the cache memory of the second control apparatus to be equalized to cache data stored in the cache memory of the first control apparatus, when the non-volatile storage unit of the first control apparatus contains the cache state information indicating that the latest cache data is stored in the cache memory of the first control apparatus.

5. The storage system according to claim 4, wherein:
the cache state information in the non-volatile storage unit of the first control apparatus includes a change count record indicating how many times the cache data stored in the cache memory of the first control apparatus has been changed;
the cache state information in the non-volatile storage unit of the second control apparatus includes a change count record indicating how many times the cache data stored in the cache memory of the second control apparatus has been changed;
the access controller of the first control apparatus increments the change count record stored in the non-volatile storage device data of the first control apparatus, as well as causing the second control apparatus through the access controller thereof to equalize the change count record in the non-volatile storage device of the second control apparatus to the change count record in the non-volatile storage device of the first control apparatus, each time a change is made to the cache data stored in the cache memory of the first control apparatus;
the access controller of the second control apparatus increments the change count record stored in the non-volatile storage device data of the second control apparatus, as well as causing the first control apparatus through the access controller thereof to equalize the change count record in the non-volatile storage device of the first control apparatus to the change count record in the non-volatile storage device of the second control apparatus, each time a change is made to the cache data stored in the cache memory of the second control apparatus; and
the access controller of the first control apparatus, upon rebooting, compares the change count records in the non-volatile storage units of the first and second control apparatuses to determine whether the cache memory of the first control apparatus contains the latest cache data and, when it is so determined, causes the cache data in the cache memory of the second control apparatus to be equalized with the cache data in the cache memory of the first control apparatus.

6. The storage system according to claim 5, wherein:
the access controller of the first control apparatus, upon rebooting, compares the change count records stored in the non-volatile storage devices of the first and second control apparatuses; and the access controller of the first control apparatus resumes access to the storage apparatus, together with the access controller of the second control apparatus, when the change count records in the first and second control apparatuses are equal.

7. The storage system according to claim 4, wherein:

the first control apparatus stores an update event record as part of the cache state information in the non-volatile storage unit of the first control apparatus to indicate whether the cache data in the cache memory of the first control apparatus has been changed;

the access controller of the first control apparatus changes the update event record from an initial value thereof to another value when at least one change is made to the cache data in the cache memory of the first control apparatus after the first reboot controller in the first control apparatus detects that the access controller of the second control apparatus has stopped; and the access controller of the first control apparatus, upon rebooting, causes the cache data in the cache memory of the second control apparatus to be equalized with the cache data stored in the cache memory of the first control apparatus when the update event record is changed from the initial value.

8. The storage system according to claim 1, wherein:

the first reboot controller causes the second control apparatus to reboot while keeping intact the cache data stored in the cache memory of the second control apparatus, upon detection that the access controller in the second control apparatus is stopped;

the first reboot controller stores cache state information in the non-volatile storage unit of the first control apparatus to indicate that the latest cache data is stored in the cache memory of the first control apparatus, when the cache data stored in the cache memory of the first control apparatus is changed after the rebooting of the second control apparatus; and the access controller of the first control apparatus, upon rebooting, resumes access operations to the storage apparatus by using the cache data stored in the cache memory of the first control apparatus, when the non-volatile storage unit of the first control apparatus contains the cache state information indicating that the latest cache data is stored in the cache memory of the first control apparatus.

9. The storage system according to claim 1, further comprising:

each of the first and second control apparatuses further comprises a third reboot controller that causes both the first and second control apparatuses to reboot while keeping the cache data stored in the respective cache memories of the first and second control apparatuses, upon detection that the access controllers of both the first and second control apparatuses are stopped; and when the access controller of the first control apparatus is stopped while the second control apparatus is rebooted, and when the non-volatile storage device of the second control apparatus stores the boot event record indicating that the rebooting has been caused by a command from outside the second control apparatus, the second reboot controller stops the access controller of the second reboot controller so as to cause the third reboot controller in the first or second control apparatus to detect that the access controllers of both the first and second control apparatuses are stopped.

10. A control apparatus for controlling access to a storage apparatus storing data in conjunction with a peer control apparatus including a cache memory, a non-volatile storage device, and an access controller, the control apparatus comprising:

a cache memory to cache the data in the storage apparatus;

a non-volatile storage device;

an access controller to make access to the storage apparatus by using the cache data in the cache memory in response to an access request from a host device, while managing the respective cache memories of the control apparatus and the peer control apparatus such that each other's cache data is mirrored therein;

a first reboot controller, responsive to detection that the access controller of the peer control apparatus has stopped, to cause the peer control apparatus to reboot and place a boot event record in the non-volatile storage device of the peer control apparatus to indicate that the rebooting of the peer control apparatus has been caused by a command from outside the peer control apparatus; and a second reboot controller, activated upon rebooting of the control apparatus, to cause the peer control apparatus to reboot while keeping intact the cache data stored in the cache memory of the peer control apparatus, when the access controller of the peer control apparatus is stopped, and when the non-volatile storage device of the control apparatus stores the boot event record indicating that the rebooting of the control apparatus has been caused by a command from outside the control apparatus.

11. A method of controlling a storage system formed from a storage apparatus for storing data and first and second control apparatuses for controlling access thereto, the first and second control apparatuses having cache memories to cache data of the storage apparatus in a duplexed manner, the method comprising:

rebooting the second control apparatus upon command from the first control apparatus which has detected that access operation from the second control apparatus to the storage apparatus is stopped;

storing a boot event record in a non-volatile storage device of the second control apparatus to indicate that the rebooting of the second control apparatus has been caused by the first control apparatus; and rebooting the first control apparatus while keeping intact the data stored in the cache memory of the first control apparatus, upon command from the second control apparatus which is rebooted, when the second control apparatus detects that access operation from the first control apparatus to the storage apparatus is stopped, and when the non-volatile storage device of the second control apparatus stores the boot event record indicating that the rebooting of the second control apparatus has been caused by the first control apparatus.

* * * * *